(12) United States Patent
Kawamura et al.

(10) Patent No.: US 8,964,302 B2
(45) Date of Patent: Feb. 24, 2015

(54) IMAGE PICKUP APPARATUS HAVING ZOOM LENS

(71) Applicant: Olympus Imaging Corp., Tokyo (JP)

(72) Inventors: Kazuteru Kawamura, Tokyo (JP); Masaru Morooka, Tokyo (JP); Koji Nakagawa, Kanagawa (JP); Toshio Takahashi, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 110 days.

(21) Appl. No.: 13/867,418

(22) Filed: Apr. 22, 2013

(65) Prior Publication Data

US 2013/0286276 A1    Oct. 31, 2013

(30) Foreign Application Priority Data

Apr. 27, 2012    (JP) .................................. 2012-103345

(51) Int. Cl.
*G02B 15/14* (2006.01)
*G02B 15/16* (2006.01)
*G02B 27/64* (2006.01)
*G02B 15/173* (2006.01)

(52) U.S. Cl.
CPC .............. *G02B 15/14* (2013.01); *G02B 27/646* (2013.01); *G02B 15/173* (2013.01)
USPC .......................................... 359/683; 359/676

(58) Field of Classification Search
USPC .......................................... 359/676, 683, 690
See application file for complete search history.

(56) References Cited

U.S. PATENT DOCUMENTS 7,636,201 B2    12/2009  Sudoh et al.
2008/0198474 A1 *  8/2008  Morooka et al. .............. 359/684
2009/0122418 A1 *  5/2009  Atsuumi et al. .............. 359/684

FOREIGN PATENT DOCUMENTS

JP    2009-128620    6/2009
JP    2011017772     1/2011
JP    2011095505     5/2011

\* cited by examiner

*Primary Examiner* — Scott J Sugarman
(74) *Attorney, Agent, or Firm* — Kenyon & Kenyon LLP

(57) ABSTRACT

An image pickup apparatus includes a zoom lens and an image pickup element. The zoom lens includes a first positive lens unit, a first negative lens unit, a stop, and a second positive lens unit. For zooming, the first positive lens unit is stationary, the first negative lens unit moves, and the second positive lens unit moves. A position at a telephoto end of the first negative lens unit is on the image side of a position at the wide angle end. A position at a telephoto end of the second positive lens unit is on the object side of a position at the wide angle end. For focusing, the first positive lens unit is stationary. A first positive lens unit object-side system has a negative refractive power. A first positive lens unit image-side system has a positive refractive power. The image pickup apparatus satisfies predetermined conditional expressions.

36 Claims, 23 Drawing Sheets

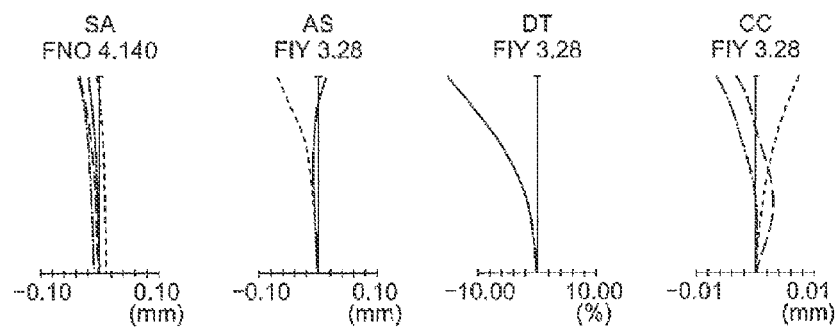
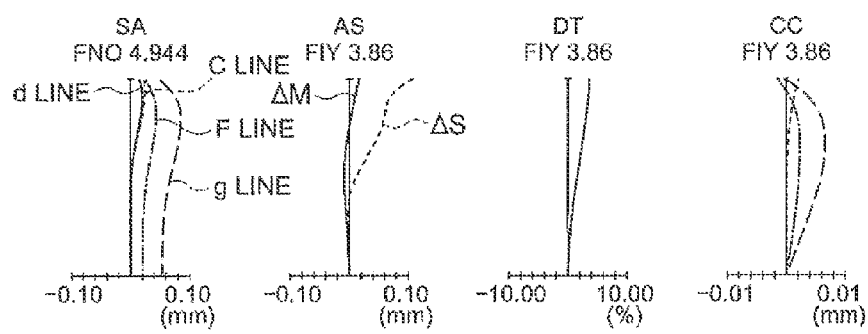
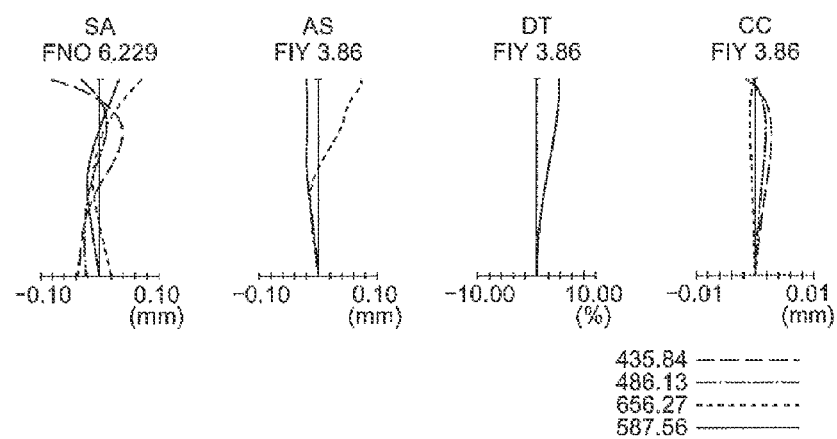

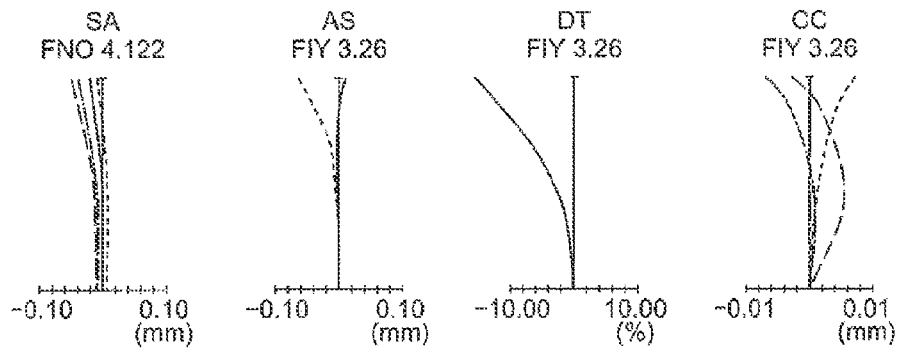
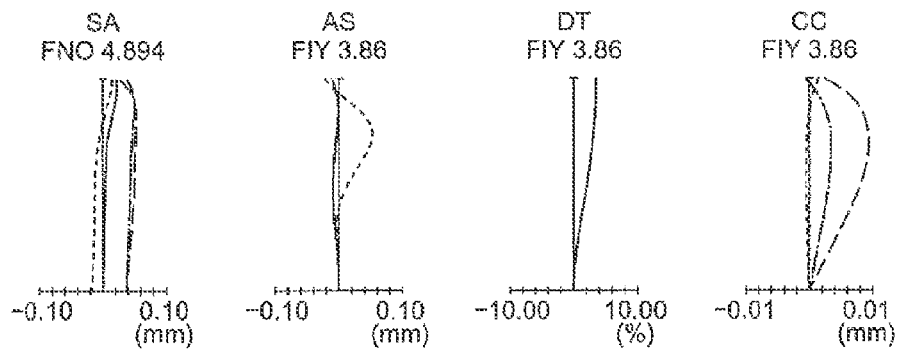
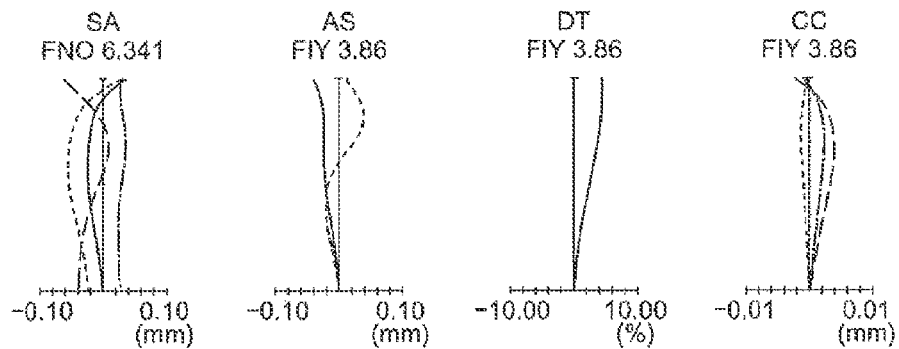

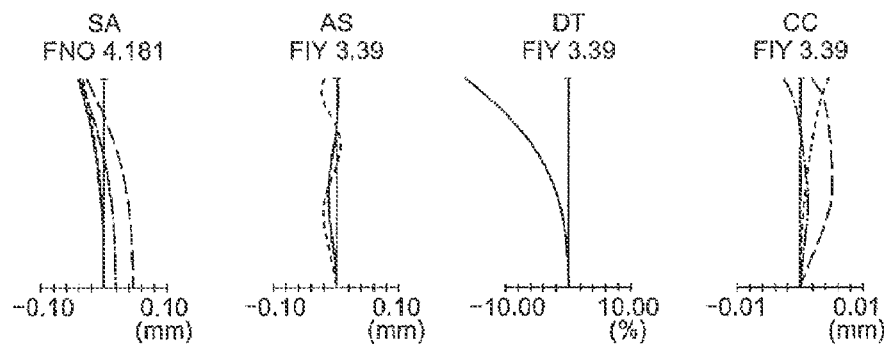
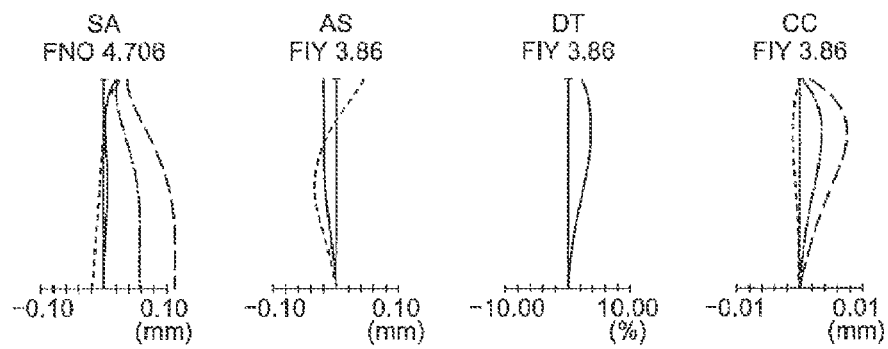
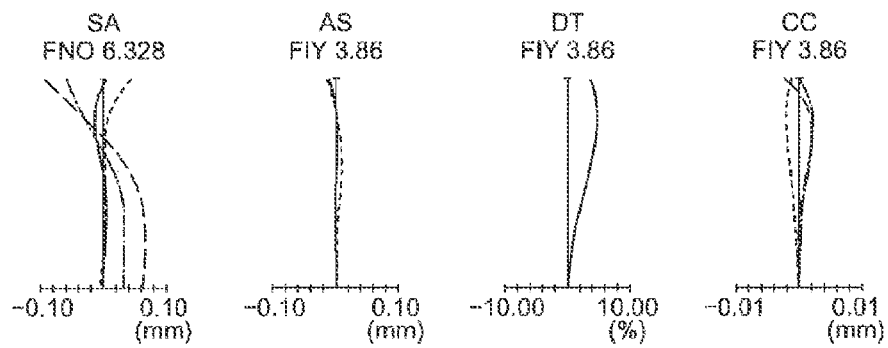

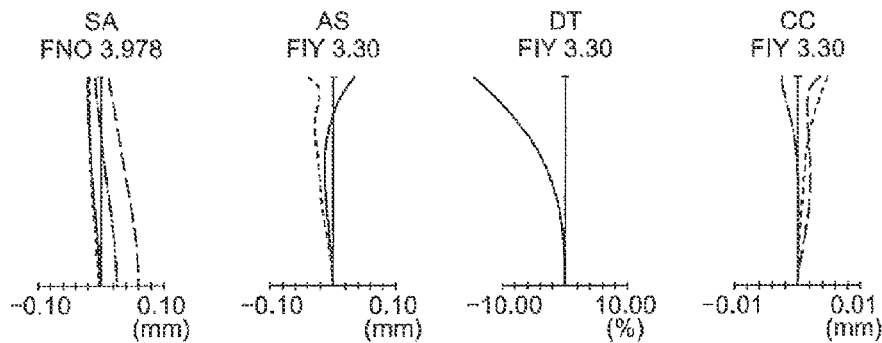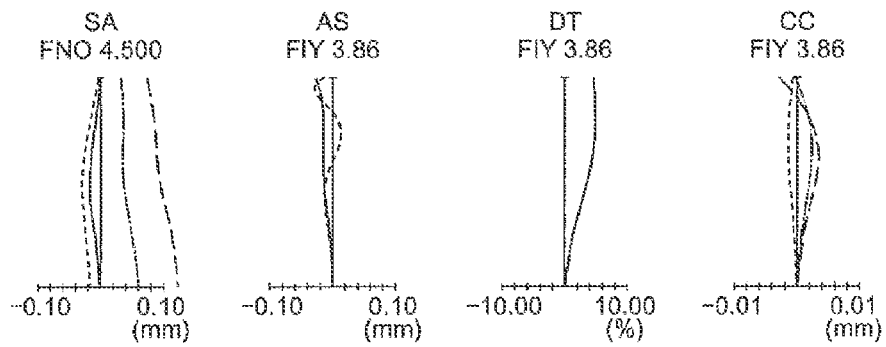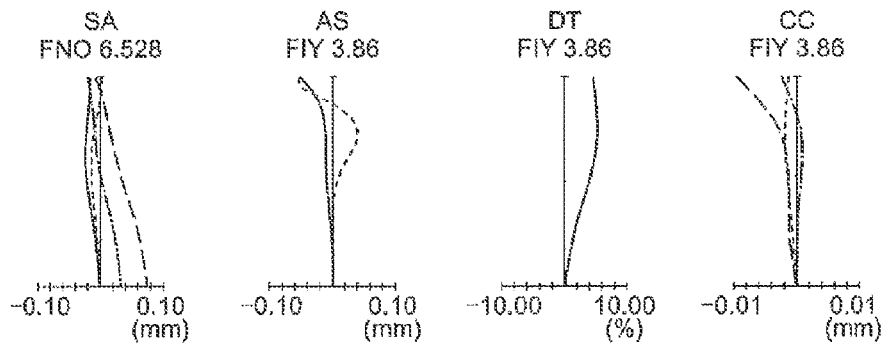

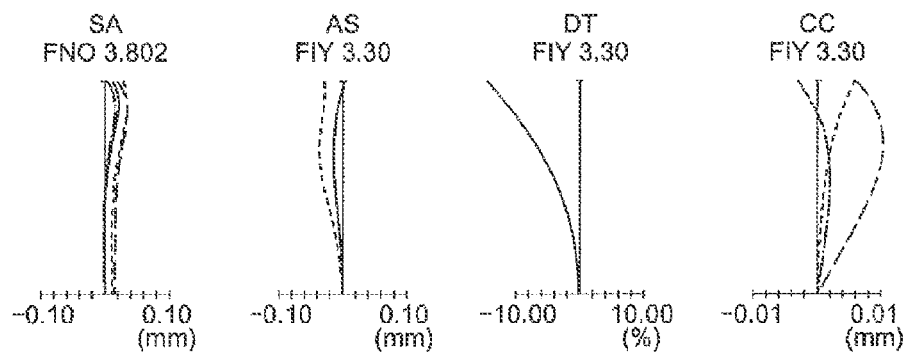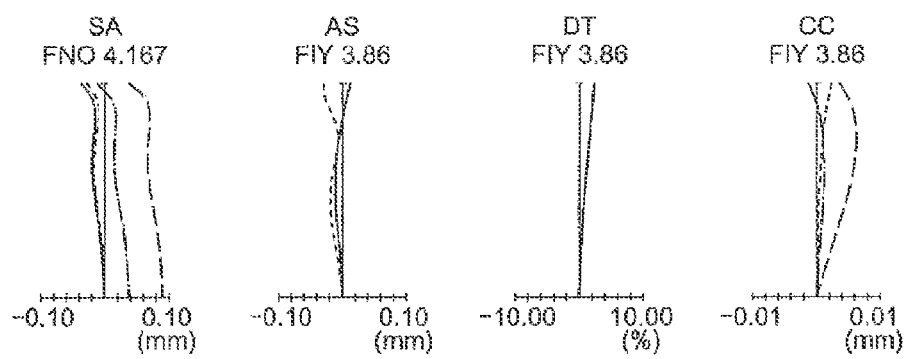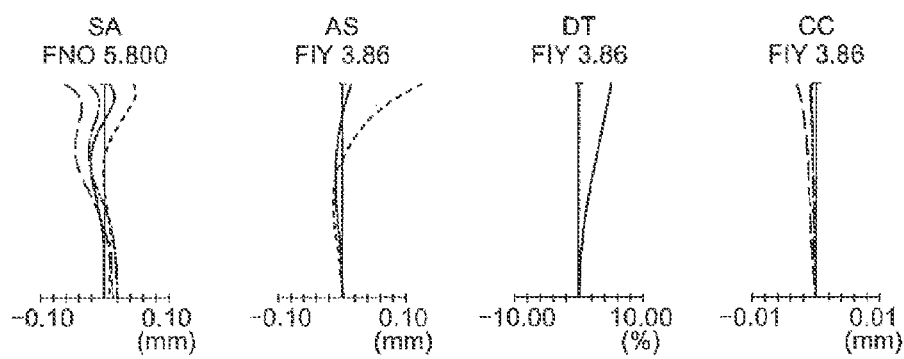

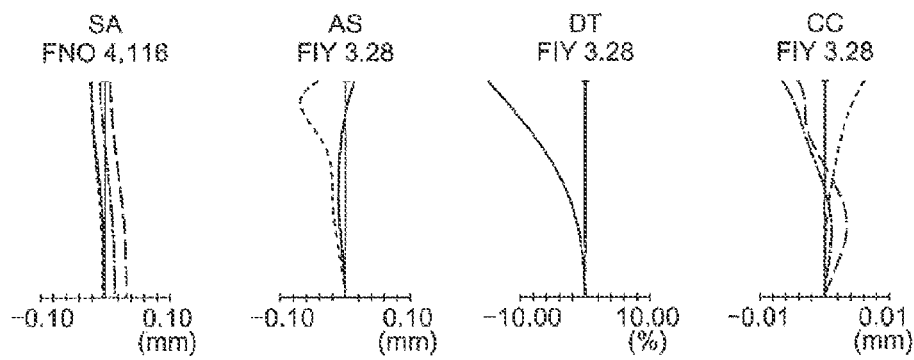
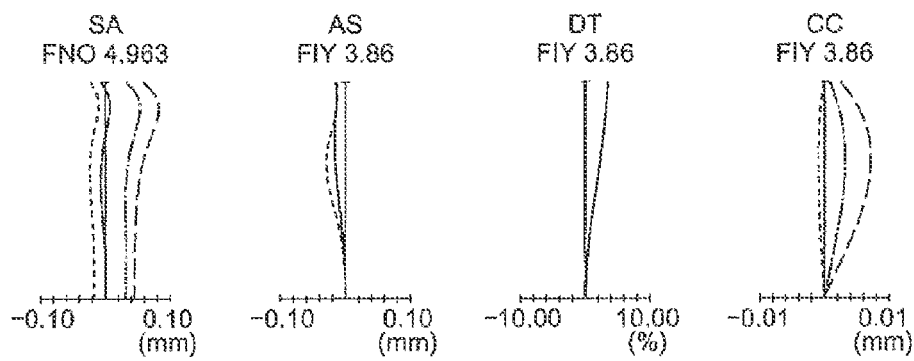
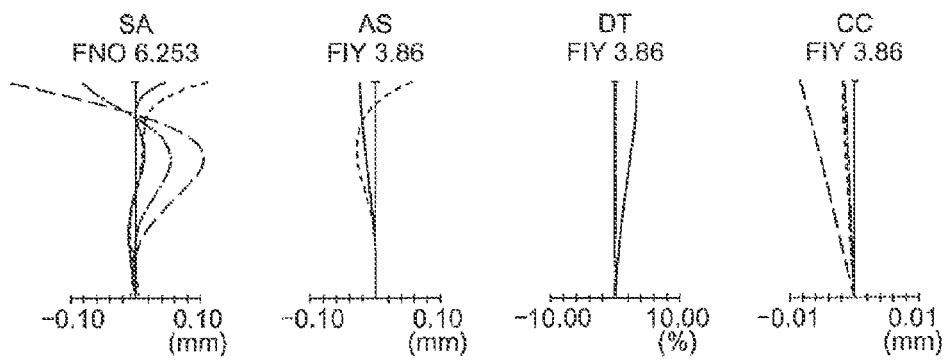

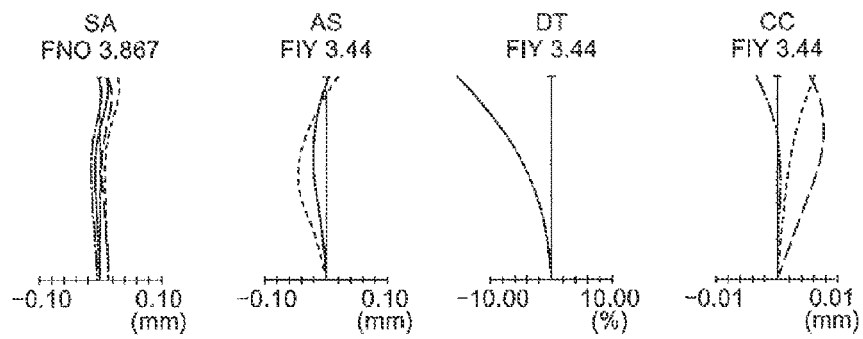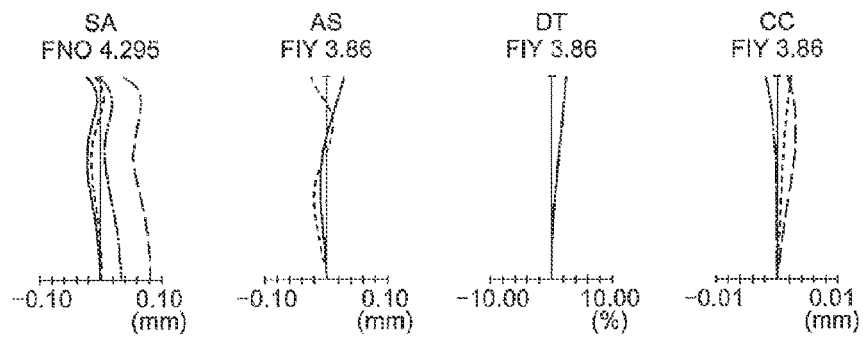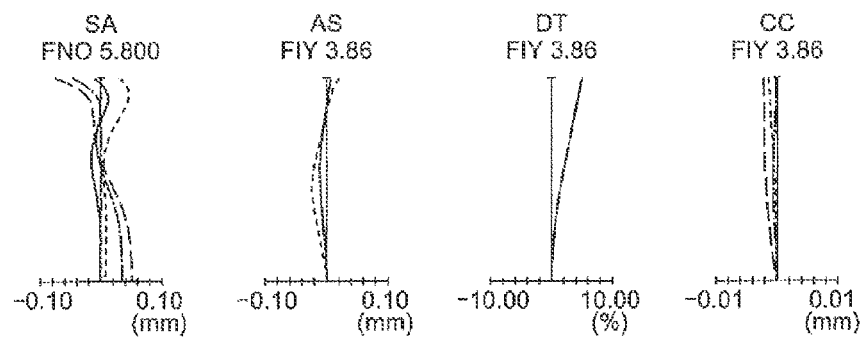

IMAGE PICKUP APPARATUS HAVING ZOOM LENS

CROSS-REFERENCE TO RELATED APPLICATION

The present application is based upon and claims the benefit of priority from the prior Japanese Patent Application No. 2012-103345 filed on Apr. 27, 2012; the entire contents of which are incorporated herein by reference.

BACKGROUND OF THE INVENTION

1. Field of the Invention

The present invention relates to an image pickup apparatus having a zoom lens, and particularly, to an image pickup apparatus having a zoom lens having a reflecting member.

2. Description of the Related Art

Size reduction, weight reduction, and cost reduction of an image pickup apparatus such as a digital camera in which, an electronic image pickup element is used, have been sought. As a zoom lens which deals with these expectations, a zoom lens in which, a reflecting surface is disposed in an optical path of an optical system, and the optical path is bent at the reflecting surface has hitherto been known. By an arrangement of bending the optical path of the optical system, slimming and small-sizing of not only the optical system, but also an image pickup apparatus are possible. Therefore, an image pickup apparatus in which, such zoom lens is used, is popular.

Moreover, for a zoom lens, a zoom lens having a large zooming ratio has been sought. This is because a zoom lens with a large zooming ratio is capable of coping with scenes of capturing of even wider range.

A zoom lens with an arrangement of bending an optical path, and having a comparatively wide angle of view, and an image pickup apparatus which includes such zoom lens are disclosed in Japanese Patent Application Laid-open Publication Nos. 2009-128620, 2011-095505, and 2011-017772.

The zoom lens disclosed in Japanese Patent Application Laid-open Publication No. 2009-128620 has a half angle of view at a wide angle end of about 40.4 degrees. Moreover, the zoom lens disclosed in Japanese Patent Application Laid-open Publication No. 2011-095505 has a half angle of view at a wide angle end of about 39.32 degrees. Furthermore, the zoom lens disclosed in Japanese Patent Application Laid-open Publication No. 2011-017772 has a half angle of view at a wide angle end of about 43.3 degrees, and a zooming ratio of about 3.76.

SUMMARY OF THE INVENTION

An image pickup apparatus according to the present invention comprises in order from an object side,
a zoom lens, and
an image pickup element, wherein
the zoom lens comprises
a first positive lens unit having a positive refractive power,
a first negative lens unit having a negative refractive power,
a stop, and
a second positive lens unit having a positive refractive power, and
the first positive lens unit and the first negative lens unit are disposed in order of the first positive lens unit and the first negative lens unit from the object side to an image side, and
the second positive lens unit is disposed on the image side of the first negative lens unit, and
the stop is disposed between the first negative lens unit and the second positive lens unit, and
at the time of zooming from a wide angle end to a telephoto end, a movement of each lens unit is as follows,
the first positive lens unit is stationary,
the first negative lens unit moves toward the image side, and
the second positive lens unit moves toward the object side, and
a position at the telephoto end of the first negative lens unit is on the image side of a position at the wide angle end of the first negative lens unit, and
a position at the telephoto end of the second positive lens unit is on the object side of a position at the wide angle end of the second positive lens unit, and
at the time of focusing, the first positive lens unit is stationary, and
the first positive lens unit comprises
a reflecting member having a reflecting surface which bends an optical path,
a first positive lens unit object-side system, and
a first positive lens unit image-side system, and
the first positive lens unit object-side system is positioned on the object side of the reflecting surface, and has a negative refractive power, and
the first positive lens unit image-side system is positioned on the image side of the reflecting surface, and has a positive refractive power, and
the zoom lens satisfies the following conditional expression (1) is satisfied.

$$4.5 \leq |f_{1Po}| \times f_{1Pi} / \mathrm{IH}_t^2 \leq 7.5 \quad (1)$$

where,
$f_{1Po}$ denotes a focal length of the first positive lens unit object-side system,
$f_{1Pi}$ denotes a focal length of the first positive lens unit image-side system, and
$\mathrm{IH}_t$ denotes the maximum image height when focused on an object at infinity at the telephoto end.

Moreover, another image pickup apparatus according to the present invention comprises in order from an object side,
a zoom lens, and
an image pickup element, wherein
the zoom lens comprises
a first positive lens unit having a positive refractive power,
a first negative lens unit having a negative refractive power,
a stop, and
a second positive lens unit having a positive refractive power, and
the first positive lens unit and the first negative lens unit are disposed in order of the first positive lens unit and the first negative lens unit from the object side to an image side, and
the second positive lens unit is disposed on the image side of the first negative lens unit, and
the stop is disposed between the first negative lens unit and the second positive lens unit, and
at the time of zooming from a wide angle end to a telephoto end, a movement of each lens unit is as follows,
the first positive lens unit is stationary,
the first negative lens unit moves toward the image side, and
the second positive lens unit moves toward the object side, and
a position at the telephoto end of the first negative lens unit is on the image side of a position at the wide angle end of the first negative lens unit, and a position at the telephoto end of the second positive lens unit is on the object side of a position at the wide angle end of the second positive lens unit, and at the time of focusing, the first positive lens unit is stationary, and the first positive lens unit comprises a reflecting member having a reflecting surface which bends an optical path, a first positive lens unit object-side system, and a first positive lens unit image-side system, and the first positive lens unit object-side system is positioned on the object side of the reflecting surface, and has a negative refractive power, and the first positive lens unit image-side system is positioned on the image side of the reflecting surface, and has a positive refractive power, and the reflecting member is a prism, and the following conditional expressions (2) and (3) are satisfied.

$$0.7 \leq \tan \omega_w - (L_{pri}/L_w) \leq 1.3 \quad (2)$$

$$3.5 \leq DT/(f_{1Po}/IH_t) \leq 16 \quad (3)$$

where, $\omega_w$ denotes the maximum half angle of view when focused to an object at infinity at the wide angle end, $L_{pri}$ denotes a total length along an optical axis of the prism, and the total length is a distance from an optical surface on the object side of the reflecting surface up to an optical surface on the image side of the reflecting surface, from among optical surfaces which form the prism, $L_w$ denotes a distance which is obtained by adding a back focus length which is converted in length in the air, to a total length along an optical axis of the overall zoom lens system, and the distance is a distance when focused to an object at infinity at the wide angle end, and the total length is a distance from a lens surface nearest to the object side of the zoom lens up to a lens surface nearest to the image side of the zoom lens, $f_{1Po}$ denotes a focal length of the first positive lens unit object-side system, $IH_t$ denotes the maximum image height when focused to an object at infinity at the telephoto end, $$DT \text{ is } DT = (IH_w - f_w \times \tan \omega_w)/(f_w \times \tan \omega_w) \times 100 \text{(unit is \%)},$$

$IH_w$ denotes the maximum image height when focused to an object at infinity at the wide angle end, and $f_w$ denotes a focal length of the overall zoom lens system when focused to an object at infinity at the wide angle end.

Moreover, another image pickup apparatus according to the present invention comprises in order from an object side, a zoom lens, and an image pickup element, wherein the zoom lens comprises a first positive lens unit having a positive refractive power, a first negative lens unit having a negative refractive power, a stop, and a second positive lens unit having a positive refractive power, and the first positive lens unit and the first negative lens unit are disposed in order of the first positive lens unit and the first negative lens unit from the object side to an image side, and the second positive lens unit is disposed on the image side of the first negative lens unit, and the stop is disposed between the first negative lens unit and the second positive lens unit, and at the time of zooming from a wide angle end to a telephoto end, a movement of each lens unit is as follows, the first positive lens unit is stationary, the first negative lens unit moves toward the image side, and the second positive lens unit moves toward the object side, and a position at the telephoto end of the first negative lens unit is on the image side of a position at the wide angle end of the first negative lens unit, and a position at the telephoto end of the second positive lens unit is on the object side of a position at the wide angle end of the second positive lens unit, and at the time of focusing, the first positive lens unit is stationary, and the first positive lens unit comprises a reflecting member having a reflecting surface which bends an optical path, a first positive lens unit object-side system, and a first positive lens unit image-side system, and the first positive lens unit object-side system is positioned on the object side of the reflecting surface, and has a negative refractive power, and the first positive lens unit image-side system is positioned on the image side of the reflecting surface, and has a positive refractive power, and the following conditional expressions (4) and (5-1) are satisfied.

$$4.2 \leq |(f_{1Po}/IH_t) \times (f_{1P}/IH_t)/\tan \omega_w| \leq 11.6 \quad (4)$$

$$5.6 \leq |(f_{1Po}/f_w) \times (f_{1P}/f_w)| \leq 11.0 \quad (5\text{-}1)$$

where, $f_{1Po}$ denotes a focal length of the first positive lens unit object-side system, $f_{1P}$ denotes a focal length of the first positive lens unit, $IH_t$ denotes the maximum image height when focused to an object at infinity at the telephoto end, $\omega_w$ denotes the maximum half angle of view when focused to an object at infinity at the wide angle end, and $f_w$ denotes a focal length of the overall zoom lens system when focused to an object at infinity at the wide angle end.

Moreover, another image pickup apparatus according to the present invention comprises in order from an object side, a zoom lens, and an image pickup element, wherein the zoom lens comprises a first positive lens unit having a positive refractive power, a first negative lens unit having a negative refractive power, a stop, and a second positive lens unit having a positive refractive power, and the first positive lens unit and the first negative lens unit are disposed in order of the first positive lens unit and the first negative lens unit from the object side to an image side, and the second positive lens unit is disposed on the image side of the first negative lens unit, and the stop is disposed between the first negative lens unit and the second positive lens unit, and at the time of zooming from a wide angle end to a telephoto end, a movement of each lens unit is as follows, the first positive lens unit is stationary, the first negative lens unit moves toward the image side, and the second positive lens unit moves toward the object side, and a position at the telephoto end of the first negative lens unit is on the image side of a position at the wide angle end of the first negative lens unit, and a position at the telephoto end of the second positive lens unit is on the object side of a position at the wide angle end of the second positive lens unit, and at the time of focusing, the first positive lens unit is stationary, and the first positive lens unit comprises a reflecting member having a reflecting surface which bends an optical path, a first positive lens unit object-side system, and a first positive lens unit image-side system, and the first positive lens unit object-side system is positioned on the object side of the reflecting surface, and has a negative refractive power, and the first positive lens unit image-side system is positioned on the image side of the reflecting surface, and has a positive refractive power, and the following conditional expression (6) is satisfied.

$$1.0 \leq |(f_{1Po}/IH_t)/(\tan \omega_w)^2| \leq 3.7 \quad (6)$$

where, $f_{1Po}$ denotes a focal length of the first positive lens unit object-side system, $IH_t$ denotes the maximum image height when focused to an object at infinity at the telephoto end, and $\omega_w$ denotes the maximum half angle of view when focused to an object at infinity at the wide angle end.

Moreover, another image pickup apparatus according to the present invention comprises in order from an object side, a zoom lens, and an image pickup element, wherein the zoom lens comprises a first positive lens unit having a positive refractive power, a first negative lens unit having a negative refractive power, a stop, and a second positive lens unit having a positive refractive power, and the first positive lens unit and the first negative lens unit are disposed in order of the first positive lens unit and the first negative lens unit from the object side to an image side, and the second positive lens unit is disposed on the image side of the first negative lens unit, and the stop is disposed between the first negative lens unit and the second positive lens unit, and at the time of zooming from a wide angle end to a telephoto end, a movement of each lens unit is as follows, the first positive lens unit is stationary, the first negative lens unit moves toward the image side, and the second positive lens unit moves toward the object side, and a position at the telephoto end of the first negative lens unit is on the image side of a position at the wide angle end of the first negative lens unit, and a position at the telephoto end of the second positive lens unit is on the object side of a position at the wide angle end of the second positive lens unit, and at the time of focusing, the first positive lens unit is stationary, and the first positive lens unit comprises a reflecting member having a reflecting surface which bends an optical path, a first positive lens unit object-side system, and a first positive lens unit image-side system, and the first positive lens unit object-side system is positioned on the object side of the reflecting surface, and has a negative refractive power, and the first positive lens unit image-side system is positioned on the image side of the reflecting surface, and has a positive refractive power, and the reflecting member is a prism, and the following conditional expressions (5) and (7) are satisfied.

$$5.6 \leq |(f_{1Po}/f_w) \times (f_{1P}/f_w)| \leq 11.5 \quad (5)$$

$$1.5 \leq (L_{pri}/IH_t) \times (f_w/IH_t)/\tan \omega_w \leq 2.8 \quad (7)$$

where, $f_{1Po}$ denotes a focal length of the first positive lens unit object-side system, $f_{1P}$ denotes a focal length of the first positive lens unit, $f_w$ denotes a focal length of the overall zoom lens system when focused to an object at infinity at the wide angle end, $L_{pri}$ denotes a total length along an optical axis of the prism, and the total length is a distance from an optical surface on the object side of the reflecting surface up to an optical surface on the image side of the reflecting surface, from among optical surfaces which form the prism, $IH_t$ denotes the maximum image height when focused to an object at infinity at the telephoto end, and $\omega_w$ denotes the maximum half angle of view when focused to an object at infinity at the wide angle end.

Moreover, another image pickup apparatus according to the present invention comprises in order from an object side, a zoom lens, and an image pickup element, wherein the zoom lens comprises a first positive lens unit having a positive refractive power, a first negative lens unit having a negative refractive power, a stop, and a second positive lens unit having a positive refractive power, and the first positive lens unit and the first negative lens unit are disposed in order of the first positive lens unit and the first negative lens unit from the object side to an image side, and the second positive lens unit is disposed on the image side of the first negative lens unit, and the stop is disposed between the first negative lens unit and the second positive lens unit, and at the time of zooming from a wide angle end to a telephoto end, a movement of each lens unit is as follows, the first positive lens unit is stationary, the first negative lens unit moves toward the image side, and the second positive lens unit moves toward the object side, and a position at the telephoto end of the first negative lens unit is on the image side of a position at the wide angle end of the first negative lens unit, and a position at the telephoto end of the second positive lens unit is on the object side of a position at the wide angle end of the second positive lens unit, and at the time of focusing, the first positive lens unit is stationary, and the first positive lens unit comprises a reflecting member having a reflecting surface which bends an optical path, a first positive lens unit object-side system, and a first positive lens unit image-side system, and the first positive lens unit object-side system is positioned on the object side of the reflecting surface, and has a negative refractive power, and the first positive lens unit image-side system is positioned on the image side of the reflecting surface, and has a positive refractive power, and the following conditional expressions (5-1), (8), and (9) are satisfied.

$$5.6 \leq |(f_{1Po}/f_w) \times (f_{1P}/f_w)| \leq 11.0 \quad (5\text{-}1)$$

$$0.7 \leq |f_n/\mathrm{IH}_t| \leq 4.0 \quad (8)$$

$$1.2 \leq |f_{1Po}/\mathrm{IH}_t| \leq 3.6 \quad (9)$$

where, $f_{1Po}$ denotes a focal length of the first positive lens unit object-side system, $f_{1P}$ denotes a focal length of the first positive lens unit, $f_w$ denotes a focal length of the overall zoom lens system when focused to an object at infinity at the wide angle end, $f_n$ denotes a focal length of each lens unit in the zoom lens, and is specified for each lens unit by a movement or by being stationary at the time of zooming, and $\mathrm{IH}_t$ denotes the maximum image height when focused to an object at infinity at the telephoto end.

Moreover, another image pickup apparatus according to the present invention comprises in order from an object side, a zoom lens, and an image pickup element, wherein the zoom lens comprises a first positive lens unit having a positive refractive power, a first negative lens unit having a negative refractive power, a stop, and a second positive lens unit having a positive refractive power, and the first positive lens unit and the first negative lens unit are disposed in order of the first positive lens unit and the first negative lens unit from the object side to an image side, and the second positive lens unit is disposed on the image side of the first negative lens unit, and the stop is disposed between the first negative lens unit and the second positive lens unit, and at the time of zooming from a wide angle end to a telephoto end, a movement of each lens unit is as follows, the first positive lens unit is stationary, the first negative lens unit moves toward the image side, and the second positive lens unit moves toward the object side, and a position at the telephoto end of the first negative lens unit is on the image side of a position at the wide angle end of the first negative lens unit, and a position at the telephoto end of the second positive lens unit is on the object side of a position at the wide angle end of the second positive lens unit, and at the time of focusing, the first positive lens unit is stationary, and the first positive lens unit comprises a reflecting member having a reflecting surface which bends an optical path, a first positive lens unit object-side system, and a first positive lens unit image-side system, and the first positive lens unit object-side system is positioned on the object side of the reflecting surface, and has a negative refractive power, and the first positive lens unit image-side system is positioned on the image side of the reflecting surface, and has a positive refractive power, and the reflecting member is a prism, and the following conditional expressions (2) and (10) are satisfied.

$$0.7 \leq \tan \omega_w - (L_{prt}/L_w) \leq 1.3 \quad (2)$$

$$1.2 \leq |f_{1Po}/f_w| \leq 2.9 \quad (10)$$

where, $\omega_w$ denotes the maximum half angle of view when focused to an object at infinity at the wide angle end, $L_{prt}$ denotes a total length along an optical axis of the prism, and the total length is a distance from an optical surface on the object side of the reflecting surface up to an optical surface on the image side of the reflecting surface, from among optical surfaces which form the prism, $L_w$ denotes a distance which is obtained by adding a back focus length which is converted in length in the air, to a total length along an optical axis of the overall zoom lens system, and the distance is a distance when focused to an object at infinity at the wide angle end, and the total length is a distance from a lens surface nearest to the object side of the zoom lens up to a lens surface nearest to the image side of the zoom lens, $f_{1Po}$ denotes a focal length of the first positive lens unit object-side system, and $f_w$ denotes a focal length of the overall zoom lens system when focused to an object at infinity at the wide angle end.

Moreover, another image pickup apparatus according to the present invention comprises in order from an object side, a zoom lens, and an image pickup element, wherein the zoom lens comprises a first positive lens unit having a positive refractive power, a first negative lens unit having a negative refractive power, a stop, and a second positive lens unit having a positive refractive power, and the first positive lens unit and the first negative lens unit are disposed in order of the first positive lens unit and the first negative lens unit from the object side to an image side, and the second positive lens unit is disposed on the image side of the first negative lens unit, and the stop is disposed between the first negative lens unit and the second positive lens unit, and at the time of zooming from a wide angle end to a telephoto end, a movement of each lens unit is as follows, the first positive lens unit is stationary, the first negative lens unit moves toward the image side, and the second positive lens unit moves toward the object side, and a position at the telephoto end of the first negative lens unit is on the image side of a position at the wide angle end of the first negative lens unit, and a position at the telephoto end of the second positive lens unit is on the object side of a position at the wide angle end of the second positive lens unit, and at the time of focusing, the first positive lens unit is stationary, and the first positive lens unit comprises a reflecting member having a reflecting surface which bends an optical path, a first positive lens unit object-side system, and a first positive lens unit image-side system, and the first positive lens unit object-side system is positioned on the object side of the reflecting surface, and has a negative refractive power, and the first positive lens unit image-side system is positioned on the image side of the reflecting surface, and has a positive refractive power, and $\omega_w \geq 42$, and the following conditional expression (3) is satisfied.

$$3.5 \leq DT/(f_{1Po}/IH_t) \leq 16 \quad (3)$$

where, $\omega_w$ denotes the maximum half angle of view when focused to an object at infinity at the wide angle end, $f_{1Po}$ denotes a focal length of the first positive lens unit object-side system, $IH_t$ denotes the maximum image height when focused to an object at infinity at the telephoto end, $DT$ is $DT=(IH_w-f_w\times\tan\omega_w)/(f_w\times\tan\omega_w)\times 100$(unit is %), $IH_w$ denotes the maximum image height when focused to an object at infinity at the wide angle end, and $f_w$ denotes a focal length of the overall zoom lens system when focused to an object at infinity at the wide angle end.

BRIEF DESCRIPTION OF THE DRAWINGS

FIG. 9A, FIG. 9B, FIG. 9C, FIG. 9D, FIG. 9E, FIG. 9F, FIG. 9G, FIG. 9H, FIG. 9I, FIG. 9J, and FIG. 9K, and FIG. 9L are aberration diagrams at the time of infinite object point focusing of the example 1;

FIG. 10A, FIG. 10B, FIG. 10C, FIG. 10D, FIG. 10E, FIG. 10F, FIG. 10G, FIG. 10H, FIG. 10I, FIG. 10J, and FIG. 10K, and FIG. 10L are aberration diagrams at the time of infinite object point focusing of the example 2;

FIG. 11A, FIG. 11B, FIG. 11C, FIG. 11D, FIG. 11E, FIG. 11F, FIG. 11G, FIG. 11H, FIG. 11I, FIG. 11J, and FIG. 11K, and FIG. 11L are aberration diagrams at the time of infinite object point focusing of the example 3;

FIG. 12A, FIG. 12B, FIG. 12C, FIG. 12D, FIG. 12E, FIG. 12F, FIG. 12G, FIG. 12H, FIG. 12I, FIG. 12J, and FIG. 12K, and FIG. 12L are aberration diagrams at the time of infinite object point focusing of the example 4;

FIG. 13A, FIG. 13B, FIG. 13C, FIG. 13D, FIG. 13E, FIG. 13F, FIG. 13G, FIG. 13H, FIG. 13I, FIG. 13J, and FIG. 13K, and FIG. 13L are aberration diagrams at the time of infinite object point focusing of the example 5;

FIG. 14A, FIG. 14B, FIG. 14C, FIG. 14D, FIG. 14E, FIG. 14F, FIG. 14G, FIG. 14H, FIG. 14I, FIG. 14J, and FIG. 14K, and FIG. 14L are aberration diagrams at the time of infinite object point focusing of the example 6;

FIG. 15A, FIG. 15B, FIG. 15C, FIG. 15D, FIG. 15E, FIG. 15F, FIG. 15G, FIG. 15H, FIG. 15I, FIG. 15J, and FIG. 15K, and FIG. 15L are aberration diagrams at the time of infinite object point focusing of the example 7;

DETAILED DESCRIPTION OF THE INVENTION

Figure 1A:
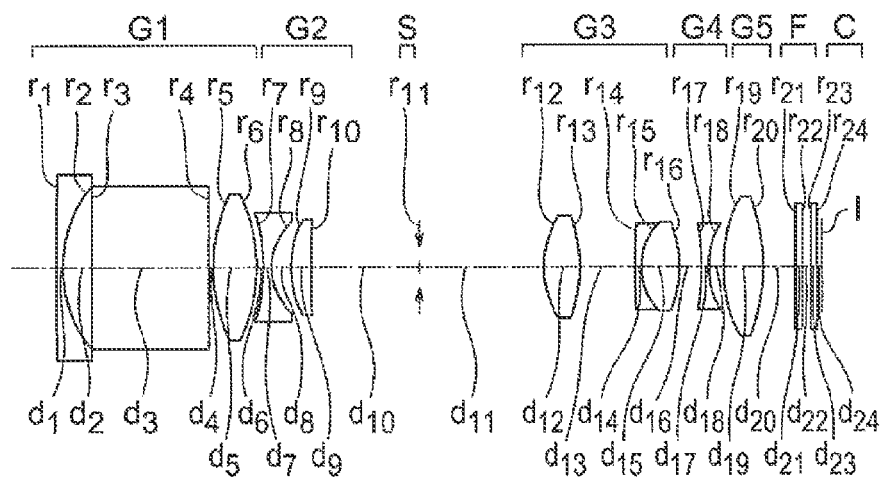
FIG. 1A, FIG. 1B, and FIG. 1C are lens cross-sectional views at a wide angle end (FIG. 1A), in an intermediate focal length state (FIG. 1B), and at a telephoto end (FIG. 1C), at the time of infinite object point focusing of a zoom lens according to an example 1 of the present invention.

An exemplary embodiments and examples of an image pickup apparatus according to the present invention, and a zoom lens used in the image pickup apparatus will be described below in detail by referring to the accompanying diagrams. However, the present invention is not restricted to the embodiments and the examples described below.

Moreover in the following description, regarding a wide angle of view, it is preferable that a half angle of view is not less than 42 degrees, and regarding a high zooming ratio, it is preferable that the zooming ratio is not less than four times, for instance. However, numerical values for the half angle of view and the zooming ratio are not restricted to the above-mentioned values. Moreover, in the following description, a bending thickness of an optical path is a distance from a surface of a first positive lens unit nearest to an object side (refracting surface on the object side) up to a reflecting member.

A first image pickup apparatus of the present embodiment is an image pickup apparatus which includes a zoom lens and an image pickup element, and the zoom lens includes a first positive lens unit having a positive refractive power, a first negative lens unit having a negative refractive power, a stop, and a second positive lens unit having a positive refractive power, and the first positive lens unit and the first negative lens unit are disposed in order of the first positive lens unit and the first negative lens unit from the object side to an image side, and the second positive lens unit is disposed on the image side of the first negative lens unit, and the stop is disposed between the first negative lens unit and the second positive lens unit, and at the time of zooming from a wide angle end to a telephoto end, the first positive lens unit is stationary, the first negative lens unit moves toward the image side, and the second positive lens unit moves toward the object side, and a position at the telephoto end of the first negative lens unit is on the image side of a position at the wide angle end of the first negative lens unit, and a position at the telephoto end of the second positive lens unit is on the object side of a position at the wide angle end of the second positive lens unit, and at the time of focusing, the first positive lens unit is stationary, and the first positive lens unit includes a reflecting member having a reflecting surface which bends an optical path, a first positive lens unit object-side system, and a first positive lens unit image-side system, and the first positive lens unit object-side system is positioned on the object side of the reflecting surface, and has a negative refractive power, and the first positive lens unit image-side system is positioned on the image side of the reflecting surface, and has a positive refractive power, and the following conditional expression (1) is satisfied.

$$4.5 \le |f_{1Po}| \times f_{1Pi}/\mathrm{IH}_t^2 \le 7.5 \qquad (1)$$

where, $f_{1Po}$ denotes a focal length of the first positive lens unit object-side system, $f_{1Pi}$ denotes a focal length of the first positive lens unit image-side system, and $\mathrm{IH}_t$ denotes the maximum image height when focused to an object at infinity at the telephoto end.

The zoom lens to be used in the first image pickup apparatus of the present embodiment has the following basic arrangement. Zoom lenses to be used in image pickup apparatuses in embodiments from an embodiment 1 to an embodiment 8 which will be described later, also have the following basic arrangement.

The first image pickup apparatus of the present embodiment is an image pickup apparatus which includes the zoom lens and the image pickup element which is disposed on an image plane of the zoom lens. The zoom lens includes the first positive lens unit having a positive refractive power, a first negative lens unit having a negative refractive power, a stop, and a second positive lens unit having a positive refractive power. The first positive lens unit and the first negative lens unit are disposed in order of the first positive lens unit and the first negative lens unit from the object side to an image side, the second positive lens unit is disposed on the image side of the first negative lens unit, and the stop is disposed between the first negative lens unit and the second positive lens unit. At the time of zooming from a wide angle end to a telephoto end, the first positive lens unit is stationary, the first negative lens unit moves toward the image side, and the second positive lens unit moves toward the object side.

By making such arrangement, it is advantageous for shortening a total length of the zoom lens, and securing a high zooming ratio. Moreover, since an arrangement of a refractive power of lenses is a positive refractive power, a negative refractive power, and a positive refractive power, it becomes easy to make an arrangement which improves symmetry of the arrangement of refractive power. Moreover, such an arrangement is suitable for suppressing a fluctuation in an off-axis aberration at the time of zooming. Accordingly, regarding an astigmatism and a coma in particular, at the time of zooming, it becomes easy to maintain a state in which these aberrations are corrected favorably.

Moreover, the position at the telephoto end of the first negative lens unit is on the image side of the position at the wide angle end of the first negative lens unit, and the position at the telephoto end of the second positive lens unit is on the object side of the position at the wide angle end of the second positive lens unit.

In this case, each of the first negative lens unit and the second positive lens unit moves such that, a distance with respect to the stop becomes wide at the wide angle end and narrow at the telephoto end. By making such arrangement, since it is possible to make a refractive power of the first negative lens unit and a refractive power of the second positive lens unit large, it is possible to bring an entrance pupil closer to the object side. Moreover, a zooming action in each of the first negative lens unit and the second positive lens unit is improved. As a result, it is possible to make small a diameter of the first positive lens unit and also it becomes easier to secure a high zooming ratio even when an angle of view of an optical system is widened.

Moreover, the first positive lens unit is stationary not only at the time of zooming but also at the time of focusing. By making such an arrangement, it is possible to simplify further a layout of the optical system (lens units) in the zoom lens. As a result, it is possible to realize even smaller image pickup apparatus.

Moreover, the first positive lens unit includes the reflecting member having the reflecting surface which bends an optical path, the first positive lens unit object-side system, and the first positive lens unit image-side system, and the first positive lens unit object-side system is positioned on the object side of the reflecting surface, and has a negative refractive power, and the first positive lens unit image-side system is positioned on the image side of the reflecting surface, and has a positive refractive power.

By forming the first positive lens unit by the first positive lens unit object-side system and the first positive lens unit image-side system, and by letting the refractive power of the first positive lens unit image-side system to be positive, it is possible to secure a positive refractive power of an appropriate magnitude in the first positive lens unit. Moreover, it is possible to make small a space for disposing the reflecting member.

Moreover, a frontward side of the reflecting surface of the reflecting member, or in other words, from a position nearest to the object side of the first lens unit up to the reflecting surface is let to be the first positive lens unit object-side system, and by letting a refractive power of the first positive lens unit object-side system to be a negative refractive power, it is advantageous for securing a wide angle of view at the wide angle end. It is preferable that a lens (unit) is not disposed on the object side of the first positive lens unit object-side system. By disposing the reflecting surface in the first positive lens unit upon making the abovementioned arrangement, it is possible to reduce further the bending thickness of the optical path.

Moreover, in addition to the abovementioned basic arrangement, it is characterized that the following conditional expression (1) is satisfied.

$$4.5 \le |f_{1Po}| \times f_{1Pi}/\mathrm{IH}_t^2 \le 7.5 \qquad (1)$$

where, $f_{1Po}$ denotes a focal length of the first positive lens unit object-side system, $f_{1Pi}$ denotes a focal length of the first positive lens unit image-side system, and $IH_t$ denotes the maximum image height when focused on an object at infinity at the telephoto end.

For securing a wide angle of view at the wide angle end, it is necessary to secure an incidence of light with a large angle of incidence on the zoom lens. Moreover, shortening the total length of the zoom lens while maintaining a high zooming ratio, is desirable for the zoom lens. Furthermore, shortening the total length of the zoom lens is preferable also for slimming the image pickup apparatus in a direction of thickness.

For realizing the widening of the angle of view, achieving high zooming ratio, and shortening of the total length of such zoom lens, it is preferable to make large the negative refractive power of the first positive lens unit object-side system, as well as to make large the positive refractive power of the first positive lens unit. Here, when the positive refractive power of the first lens unit is made large, at the telephoto end, an optical arrangement of the overall zoom lens becomes an arrangement of a telephoto type. As a result, an effect of shortening the total length of the zoom lens is improved. Accordingly, it is preferable to improve further an effect of shortening the total length of the zoom lens by making the positive refractive power of the first positive lens unit large. Conditional expression (1) is an expression which is preferable for maintaining favorable optical performance while improving the effect of shortening the total length of the zoom lens.

By making so as not to fall below a lower limit value of conditional expression (1), it becomes easy to reduce an occurrence of astigmatism and a chromatic aberration of magnification in each of the first positive lens unit object-side system and the first positive lens unit image-side system, even when the total length of the zoom lens is shortened. Particularly, it is advantageous for reduction of the astigmatism and the chromatic aberration of magnification near the wide angle end. Moreover, since the chromatic aberration of magnification is suppressed from becoming large rapidly in a peripheral portion of an image screen, it becomes easy to achieve an image in which, spreading of colors is reduced.

Moreover, by making so as not to fall below a lower limit value of conditional expression (1), it becomes easy to suppress correction of various aberrations which occur in the first positive lens unit image-side system near the telephoto end, or concretely, each of a negative spherical aberration, a negative astigmatism and a positive distortion, from becoming excessive. Moreover, since a spherical aberration is suppressed from becoming substantially negative near the telephoto end, it becomes advantageous for performance improvement near a center of an image. Moreover, it becomes easy to reduce an occurrence of the positive distortion.

By making so as not to exceed an upper limit value of conditional expression (1), it is advantageous for securing the positive refractive power of an appropriate magnitude in the first positive lens unit, and for shortening the total length of the zoom lens upon securing high zooming ratio. Moreover, since it is possible to make the negative refractive power of the first positive lens unit object-side system large, it is advantageous for securing a wide angle of view at the wide angle end, and for small-sizing of the space for disposing the reflecting member, and small-sizing of the overall image pickup apparatus resulting from the small-sizing of the space for disposing the reflecting member.

Moreover, a second image pickup apparatus of the present embodiment has the abovementioned basic arrangement, and the reflecting member is a prism, and the following conditional expressions (2) and (3) are satisfied.

$$0.7 \leq \tan \omega_w - (L_{pri}/L_w) \leq 1.3 \quad (2)$$

$$3.5 \leq DT/(f_{1Po}/IH_t) \leq 16 \quad (3)$$

where, $\omega_w$ denotes the maximum half angle of view when focused to an object at infinity at the wide angle end, $L_{pri}$ denotes a total length along an optical axis of the prism, and the total length is a distance from an optical surface on the object side of the reflecting surface up to an optical surface on the image side of the reflecting surface, from among optical surfaces which form the prism, $L_w$ denotes a distance which is obtained by adding a back focus length which is converted in length in the air, to a total length along an optical axis of the overall zoom lens system, and the distance is a distance when focused to an object at infinity at the wide angle end, and the total length is a distance from a lens surface nearest to the object side of the zoom lens up to a lens surface nearest to the image side of the zoom lens, $f_{1Po}$ denotes a focal length of the first positive lens unit object-side system, $IH_t$ denotes the maximum image height when focused to an object at infinity at the telephoto end, $DT$ is $DT=(IH_w-f_w \times \tan \omega_w)/(f_w \times \tan \omega_w) \times 100$(unit is %), $IH_w$ denotes the maximum image height when focused to an object at infinity at the wide angle end, and $f_w$ denotes a focal length of the overall zoom lens system when focused to an object at infinity at the wide angle end.

The image pickup apparatus according to the present embodiment is an image pickup apparatus for which, one of the preferable arrangements when the reflecting member is let to be a prism, is specified, in addition to the abovementioned basic arrangement.

For widening the angle of view of the optical system and for bending the optical path in the first positive lens unit, it is necessary to secure an optical path length which is required for bending the optical path, between the first positive lens unit object-side system and the first positive lens unit image-side system. For this, it is preferable to make the negative refractive power of the first positive lens unit object-side system large, as well as to make the positive refractive power of the first positive lens unit image-side system large.

Here, as the reflecting surface, a reflecting surface in a state of making a contact with air and a reflecting surface provided to the prism are there. In a state of the reflecting surface making a contact with air, as compared to a state of the reflecting surface provided to the prism, a gap between the first positive lens unit object-side system and the first positive lens unit image-side system becomes wide. Therefore, in the state of the reflecting surface making a contact with air, as compared to the state of the reflecting surface provided to the prism, it necessary to make each of a refractive power of the first positive lens unit object-side system and a refractive power of the first positive lens unit image-side system even larger.

As it has been mentioned above, making the negative refractive power of the first positive lens unit object-side system large is preferable for widening the angle of view, and making the positive refractive power of the first positive lens unit image-side system large is preferable for securing an appropriate positive refractive power in the first lens unit. However, when each of the refractive power of the first positive lens unit object-side system and the refractive power of the first positive lens unit image-side system becomes large, the astigmatism and the chromatic aberration of magnification become substantial in each of the first positive lens unit object-side system and the first positive lens unit image-side system. In this case, it is possible to cancel (to correct) an aberration in each of the first positive lens unit object-side system and the first positive lens unit image-side system.

However, as each of the refractive power of the first positive lens unit object-side system and the first positive lens unit image-side system becomes further larger, it becomes difficult to cancel each of the astigmatism and the chromatic aberration of magnification in the first positive lens unit object-side system and the first positive lens unit image-side system. Therefore, the astigmatism and the chromatic aberration of magnification are susceptible to remain near the wide angle end. Moreover, when the negative refractive power of the first positive lens unit object-side system is made large, the chromatic aberration of magnification of the first positive lens unit object-side system becomes substantial near the telephoto end. Here, since the chromatic aberration of magnification has an effect on an amount of a longitudinal chromatic aberration which occurs, it is preferable to carry out aberration correction upon taking into consideration the effect on the longitudinal chromatic aberration (balance with the longitudinal chromatic aberration). However, in a state of the reflecting surface making a contact with air, correction of these aberrations becomes difficult.

Therefore, in the image pickup apparatus according to the second embodiment, the reflecting member is disposed between the first positive lens unit object-side system and the first positive lens unit image-side system, and this reflecting member is let to be the prism. By making such arrangement, it is possible to reduce occurrence of the astigmatism and the chromatic aberration of magnification near the wide angle end, in the first positive lens unit object-side system while securing the optical path length necessary for bending the optical path.

Moreover, by using the prism, it is possible to make the longitudinal chromatic aberration occur on a negative side, near the telephoto end. Therefore, even when the longitudinal chromatic aberration remains when the correction of the chromatic aberration of magnification is carried out in the first positive lens unit object-side system and the first positive lens unit image-side system, it is possible to correct the longitudinal chromatic aberration which has remained, by using a negative longitudinal chromatic aberration which occurs in the prism.

Conditional expression (2) is a conditional expression which is preferable for containing an amount of occurrence of the negative longitudinal chromatic aberration near the telephoto end which is made to occur in the prism, an amount of occurrence of the astigmatism and the chromatic aberration of magnification near the wide angle end, and a distortion, in an acceptable range.

By suppressing a total length of the prism with respect to an angle of view from becoming long so as not to fall below a lower limit value of conditional expression (2), it is possible to make the longitudinal chromatic aberration of an appropriate amount occur in the prism, and therefore, it is advantageous for reducing the longitudinal chromatic aberration near the telephoto end. Moreover, since it is possible to make the gap between the first positive lens unit object-side system and the first positive lens unit image-side system to be appropriate, and the refractive index of each of the first positive lens unit object-side system and the first positive lens unit image-side system to be appropriate, it is advantageous from a point of view of aberration correction. By making so as not to exceed an upper limit value of conditional expression (2), it is advantageous for reduction of distortion.

Moreover, the distortion has a characteristic of increasing in proportion to the cube of the angle of view and the astigmatism has a characteristic of increasing in proportion to the square of the angle of view. Making the negative distortion near the wide angle end large, or in other words, allowing the occurrence of the negative distortion to certain extent is advantageous for securing flatness of an image plane at the time of widening the angle of view. In this case, by making an amount of distortion which occurs in the first positive lens unit object-side system to be an appropriate amount (within an acceptable range), it is possible to make an amount of negative aberration of the longitudinal chromatic aberration near the telephoto end to be appropriate, and moreover, it is possible to correct favorably the astigmatism and the chromatic aberration of magnification near the wide angle end. Moreover, making the negative refractive power of the first positive lens unit object-side system larger leads to widening of the angle of view and small-sizing of the reflecting member. Conditional expression (3) is a conditional expression in which, the abovementioned point is specified, and by satisfying conditional expression (3), it is advantageous for both, the small-sizing and realization of an improved optical performance.

By making so as not to fall below a lower limit value of conditional expression (3), it is possible to secure an amount of the negative distortion which occurs in the first positive lens unit object-side system to an appropriate amount (within an acceptable range), and this is advantageous for small-sizing of the reflecting member.

By making so as not to exceed an upper limit value of conditional expression (3), the amount of the negative distortion which occurs in the first positive lens unit object-side system is suppressed from becoming excessive, and moreover, it becomes easy to correct favorably the astigmatism which occurs in the first positive lens unit object-side system. Moreover, even in a case in which, an electrical distortion correction has been carried out; it becomes easy to suppress degradation of resolution.

A third image pickup apparatus according to the present invention has the abovementioned basic arrangement, and the following conditional expressions (4) and (5-1) are satisfied.

$$4.2 \leq |(f_{1Po}/\text{IH}_t) \times (f_{1P}/\text{IH}_t)/\tan \omega_w| \leq 11.6 \quad (4)$$

$$5.6 \leq |(f_{1Po}/f_w) \times (f_{1P}/f_w)| \leq 11.0 \quad (5\text{-}1)$$

where, $f_{1Po}$ denotes a focal length of the first positive lens unit object-side system, $f_{1P}$ denotes a focal length of the first positive lens unit, $\text{IH}_t$ denotes the maximum image height when focused to an object at infinity at the telephoto end, $\omega_w$ denotes the maximum half angle of view when focused to an object at infinity at the wide angle end, and $f_w$ denotes a focal length of the overall zoom lens system when focused to an object at infinity at the wide angle end.

The image pickup apparatus according to the present embodiment is an image pickup apparatus for which, preferable conditional expressions (4) and (5-1) are specified, in addition to the aforementioned basic arrangement.

As it has been mentioned above, for realizing the widening of the angle of view, it is preferable to make the negative refractive power of the first positive lens unit object-side system large. Moreover, for achieving high zooming ratio and shortening the total length, it is preferable to make the positive refractive power of the first positive lens unit large, and to make an arrangement such that, the optical arrangement of the overall zoom lens system is of a telephoto type, at the telephoto end.

Moreover, with the widening of the angle of view, the negative refractive power of the first positive lens unit object-side system becomes large. Therefore, it is preferable to carry out correction of the astigmatism and the chromatic aberration of magnification which occur in the first positive lens unit object-side system. Therefore, setting appropriately a balance of the refractive power of the first positive lens unit object-side system and the refractive power of the first positive lens system image-side system with respect to the angle of view is advantageous for achieving both, the small-sizing and realization of improved optical performance.

Conditional expressions (4) and (5-1) signify that both the refractive power of the first positive lens unit object-side system and the refractive power of the first positive lens unit are to be made large.

By making so as not to fall below a lower limit value of both conditional expressions (4) and (5-1), the refractive power of the first lens unit is suppressed from becoming excessively large, and it becomes easy to reduce the occurrence of the astigmatism and the chromatic aberration of magnification in each of the first positive lens unit object-side system and the first positive lens unit image-side system. Particularly, it is advantageous for reduction of the astigmatism and the chromatic aberration of magnification near the wide angle end. Moreover, since the chromatic aberration of magnification is suppressed from becoming large rapidly in a peripheral portion of the image screen, it becomes easy to achieve an image in which, spreading of colors is reduced.

Moreover, by making so as not to fall below a lower limit value of both conditional expressions (4) and (5-1), it becomes easy to suppress correction of various aberrations which occur in the first positive lens unit image-side system near the telephoto end, or concretely, each of the negative spherical aberration, the negative astigmatism and the positive distortion, from becoming excessive. Moreover, since the spherical aberration is suppressed from becoming substantially negative near the telephoto end, it becomes advantageous for performance improvement near the center of the image. Moreover, it becomes easy to reduce the occurrence of the positive distortion.

By making so as not to exceed an upper limit value of both conditional expressions (4) and (5-1), it is advantageous for securing the positive refractive power of an appropriate magnitude in the first positive lens unit, and for shortening the total length of the zoom lens upon securing high zooming ratio. Moreover, since it is possible to make the negative refractive power of the first positive lens unit object-side system large, it is advantageous for securing a wide angle of view at the wide angle end, and for small-sizing of the space for disposing the reflecting member, and small-sizing of the overall image pickup apparatus resulting from the small-sizing of the space for disposing the reflecting member.

A fourth image pickup apparatus according to the present invention has the basic arrangement described above, and the following conditional expression (6) is satisfied.

$$1.0 \leq |(f_{1Po}/\text{IH}_t)/(\tan \omega_w)^2| \leq 3.7 \quad (6)$$

where, $f_{1Po}$ denotes a focal length of the first positive lens unit object-side system, $\text{IH}_t$ denotes the maximum image height when focused to an object at infinity at the telephoto end, and $\omega_w$ denotes the maximum half angle of view when focused to an object at infinity at the wide angle end.

The image pickup apparatus according to the present embodiment is an image pickup apparatus for which, preferable conditional expression (6) is specified, in addition to the aforementioned basic arrangement.

Conditional expression (6) is a conditional expression which is preferable for securing a wide angle of view, and for achieving a favorable optical performance with a high zooming ratio and small size, in the zoom lens.

By making so as not to fall below a lower limit value of conditional expression (6), the negative refractive power of the first positive lens unit object-side system is suppressed from becoming excessively large. In this case, since a large negative distortion is suppressed from occurring in the first positive lens unit object-side system, it becomes easy to carry out correction of distortion by another lens. Moreover, by making small the distortion which is remained, even in a case in which, an electrical distortion correction has been carried out; it becomes easy to suppress the degradation of resolution.

By making so as not to exceed an upper limit value of conditional expression (6), it is possible to secure the negative refractive power of an appropriate magnitude for the first positive lens unit object-side system. Therefore, it becomes easy to widen the angle of view. Moreover, the negative refractive power of the overall zoom lens is also shared by the first negative lens unit. Therefore, when it is possible to make the negative refractive power having the appropriate magnitude for the first positive lens unit object-side system, an increase in the negative refractive power (becoming of the negative refractive power excessively large) shared by the first negative lens unit due to the widening of the angle of view is suppressed, and this is advantageous for shortening the total length of the zoom lens as well as for achieving high zooming ratio. By reducing the share of the negative refractive power of the first negative lens unit, it becomes easy to reduce an inclination of an image plane due to decentering of the first negative lens unit. Therefore, it is easy to achieve stable optical performance.

A fifth image pickup apparatus according to the present embodiment has the aforementioned basic arrangement, and the reflecting member is a prism, and the following conditional expressions (5) and (7) are satisfied.

$$5.6 \leq |(f_{1Po}/f_w) \times (f_{1P}/f_w)| \leq 11.5 \quad (5)$$

$$1.5 \leq (L_{pri}/\text{IH}_t) \times (f_w/\text{IH}_t)/\tan \omega_w \leq 2.8 \quad (7)$$

where, $f_{1Po}$ denotes a focal length of the first positive lens unit object-side system, $f_{1P}$ denotes a focal length of the first positive lens unit, $f_w$ denotes a focal length of the overall zoom lens system when focused to an object at infinity at the wide angle end, $L_{pri}$ denotes a total length along an optical axis of the prism, and the total length is a distance from an optical surface on the object side of the reflecting surface up to an optical surface on the image side of the reflecting surface, from among optical surfaces which form the prism, $\text{IH}_t$ denotes the maximum image height when focused to an object at infinity at the telephoto end, and $\omega_w$ denotes the maximum half angle of view when focused to an object at infinity at the wide angle end.

The image pickup apparatus according to the present embodiment is an image pickup apparatus for which, one of the preferable arrangements when the reflecting member is let to be the prism, is specified, in addition to the aforementioned basic arrangement.

For widening the angle of view of the optical system and for bending the optical path in the first positive lens unit, it is necessary to secure an optical path length which is required for bending the optical path, between the first positive lens unit object-side system and the first positive lens unit image-side system. For this, it is preferable to make the negative refractive power of the first positive lens unit object-side system large, as well as to make the positive refractive power of the first positive lens unit image-side system large. In that case, it is preferable to reduce mainly the distortion and the astigmatism near the wide angle end, and to reduce mainly the spherical aberration and the coma near the telephoto end.

Therefore, even when an arrangement is made such that the negative refractive power of the first positive lens unit object-side system does not become excessively large by letting the reflecting member to be a prism, it is possible to secure the space for disposing the reflecting member (prism), in the first positive lens unit. In such manner, as the negative refractive power of the first positive lens unit object-side system dose not become excessively large, letting the reflecting member to be a prism shows an effect for achieving a favorable aberration correction.

A technical significance of conditional expression (5) is same as a technical significance of conditional expression (5-1).

By making so as not to fall below a lower limit value of conditional expression (7), it is advantageous for suppressing the negative refractive power of a lens system on the object side of the aperture stop (the refractive power of the first positive lens unit object-side system and the refractive power of the first negative lens unit), from becoming excessively large at the wide angle end, and for reduction of negative distortion and shortening of the total length of the zoom lens. Moreover, due to the reduction of the negative distortion, it becomes easy to suppress the degradation of resolution in a case in which, the electrical correction of distortion has been carried out.

By making so as not to exceed an upper limit value of conditional expression (7), it is advantageous for shortening an optical path length inside the prism, and to make thin a bending thickness of the optical path.

A sixth image pickup apparatus according to the present embodiment has the aforementioned basic arrangement, and the following conditional expressions (5-1), (8), and (9) are satisfied.

$$5.6 \leq |(f_{1Po}/f_w) \times (f_{1P}/f_w)| \leq 11.0 \quad (5\text{-}1)$$

$$0.7 \leq |f_n/\text{IH}_t| \leq 4.0 \quad (8)$$

$$1.2 \leq |f_{1Po}/\text{IH}_t| \leq 3.6 \quad (9)$$

where, $f_{1Po}$ denotes a focal length of the first positive lens unit object-side system, $f_{1P}$ denotes a focal length of the first positive lens unit, $f_w$ denotes a focal length of the overall zoom lens system when focused to an object at infinity at the wide angle end, $f_n$ denotes a focal length of each lens unit in the zoom lens, and is specified for each lens unit by a movement or by being stationary at the time of zooming, and $\text{IH}_t$ denotes the maximum image height when focused to an object at infinity at the telephoto end.

The image pickup apparatus according to the present embodiment is an image pickup apparatus for which, preferable conditional expressions (5-1), (8), and (9) are specified, in addition to the aforementioned basic arrangement.

The technical significance of conditional expression (5-1) is as already been described.

By setting appropriately the refractive power of each lens unit in the zoom lens, it is possible to make small a lens diameter of the overall zoom lens, and to shorten the total length of the zoom lens, and furthermore, it is possible to secure high zooming ratio efficiently in a state of being shortened further. It is preferable that all the lens units in the zoom lens satisfy conditional expression (8).

By making so as not to fall below a lower limit value of conditional expression (8), it is possible to form a zoom lens with lens units not having an excessively large refractive power. As a result, since it becomes easy to reduce the spherical aberration in each lens unit, it becomes advantageous for reduction of the spherical aberration mainly at the telephoto end side. Moreover, it becomes easy to achieve favorable optical performance in the total zoom range, while securing high zooming ratio, for instance.

By making so as not to exceed an upper limit value of conditional expression (8), since it is possible to secure a refractive power of an appropriate magnitude in each lens unit, it is advantageous for having an efficient high zooming ratio, and for shortening the total length of the zoom lens.

Furthermore, by setting appropriately the magnitude of the refractive power of the first positive lens unit object-side system, it is advantageous for widening the angle of view. Conditional expression (9) is a conditional expression for setting appropriately the magnitude of the refractive power of the first positive lens unit object-side system.

By making so as not to fall below a lower limit value of conditional expression (9), it becomes easy to suppress the negative distortion from occurring substantially when the angle of view of the optical system is widened.

By making so as not to exceed an upper limit value of conditional expression (9), it is advantageous for securing a wide angle of view. Or, since it becomes easy to suppress the negative refractive power of the first negative lens unit to a moderate magnitude, it becomes easy to correct favorably a curvature of field in the total zoom range even when a high zooming ratio is achieved.

A seventh image pickup apparatus according to the present embodiment has the aforementioned basic arrangement, and the reflecting member is a prism, and the following conditional expressions (2) and (10) are satisfied.

$$0.7 \leq \tan \omega_w - (L_{pri}/L_w) \leq 1.3 \quad (2)$$

$$1.2 \leq |f_{1Po}/f_w| \leq 2.9 \quad (10)$$

where, $\omega_w$ denotes the maximum half angle of view when focused to an object at infinity at the wide angle end, $L_{pri}$ denotes a total length along an optical axis of the prism, and the total length is a distance from an optical surface on the object side of the reflecting surface up to an optical surface on the image side of the reflecting surface, from among optical surfaces which form the prism, $L_w$ denotes a distance which is obtained by adding a back focus length which is converted in length in the air, to a total length along an optical axis of the overall zoom lens system, and the distance is a distance when focused to an object at infinity at the wide angle end, and the total length is a distance from a lens surface nearest to the object side of the zoom lens up to a lens surface nearest to the image side of the zoom lens, $f_{1Po}$ denotes a focal length of the first positive lens unit object-side system, and $f_w$ denotes a focal length of the overall zoom lens system when focused to an object at infinity at the wide angle end.

The image pickup apparatus according to the present embodiment is an image pickup apparatus for which, one of the preferable arrangements when the reflecting member is let to be a prism, is specified, in addition to the aforementioned basic arrangement.

An effect of providing a reflecting surface to a prism, or in other words, a capability of securing an optical path length required for bending the optical path and an advantage of aberration correction are as mentioned above.

Conditional expressions (2) and (10) are conditional expressions which specify conditions advantageous for maintaining a thickness of the prism to be thin and the total length of the zoom lens to be short even when the angle of view of the optical system is widened.

By making so as not to fall below a lower limit value of conditional expression (10) in a lower limit value of conditional expression (2), it is possible to prevent the negative refractive power of the first positive lens unit object-side system with respect to the angle of view from becoming excessively large. Therefore, it becomes easy to prevent the total length of the zoom lens from becoming long.

By making so as not to exceed an upper limit value of conditional expression (10) in the lower limit value of conditional expression (2), the occurrence of the curvature of field and the spherical aberration near the telephoto end is suppressed. Therefore, it is advantageous for achieving high zooming ratio.

By making so as not to fall below a lower limit value of conditional expression (10) in an upper limit value of conditional expression, an occurrence of the curvature of field and the spherical aberration near the telephoto end is suppressed, and therefore it is advantageous for achieving high zooming ratio.

By making so as not to exceed an upper limit value of conditional expression (10) in the upper limit value of conditional expression (2), an increase in the thickness of the prism is suppressed even when a sufficiently wide angle of view is secured. Therefore, it becomes easy to suppress the total length of the zoom lens from becoming long.

An eighth image pickup apparatus according to the present embodiment has the aforementioned basic arrangement, and $\omega_w \geq 42$, and the following conditional expression (3) is satisfied.

$$3.5 \leq DT/(f_{1Po}/IH_t) \leq 16 \quad (3)$$

where, $\omega_w$ denotes the maximum half angle of view when focused to an object at infinity at the wide angle end, $f_{1Po}$ denotes a focal length of the first positive lens unit object-side system, $IH_t$ denotes the maximum image height when focused to an object at infinity at the telephoto end, $$DT \text{ is } DT = (IH_w - f_w \times \tan \omega_w)/(f_w \times \tan \omega_w) \times 100 \text{(unit is \%)},$$

$IH_w$ denotes the maximum image height when focused to an object at infinity at the wide angle end, and $f_w$ denotes a focal length of the overall zoom lens system when focused to an object at infinity at the wide angle end.

The image pickup apparatus according to the present embodiment is an image pickup apparatus for which, preferable conditional expression (3) is specified, in addition to the aforementioned basic arrangement.

When the angle of view of the optical system is widened, the curvature and the distortion become substantial. Therefore, it is preferable to carry out reduction of the curvature of field as well as reduction of the distortion. Here, it is preferable to allow the occurrence of distortion to some extent, and to correct the distortion electrically in an image which has been captured by the image pickup element. By making such an arrangement, it is possible to correct the curvature of field favorably, which is advantageous for securing a final quality of an image including the correction of these aberrations.

Here, the distortion occurs mainly in the first positive lens unit object-side system. Therefore, for allowing the occurrence of distortion to certain extent, it is preferable to set an amount of occurrence of distortion in the first positive lens unit object-side system, and accordingly, to facilitate both, the small-sizing of the reflecting surface and securing an image quality including the electrical distortion correction.

Technical significance of conditional expression (3) is same as it has already been described.

It is preferable to satisfy the plurality of conditions simultaneously in the image pickup apparatuses according to the aforementioned embodiments from the first embodiment to the eighth embodiment. Furthermore, it is preferable to satisfy one or a plurality of following arrangements simultaneously.

In any one of the image pickup apparatuses according to the embodiments from the first embodiment to the eighth embodiment (hereinafter, called appropriately as 'the image pickup apparatus according to the present embodiment'), it is preferable that a second negative lens unit having a negative refractive power is disposed on the image side of the second positive lens unit, and a third positive lens unit having a positive refractive power is disposed on the image side of the second negative lens unit, and the first negative lens unit and the second positive lens unit, at the telephoto end, are positioned near the stop, and at the time of zooming, each distance between the adjacent lens units changes.

In the zoom lens of the image pickup apparatus according to the present embodiment, the first positive lens unit and the first negative lens unit are disposed on the object side of the stop, and the second positive lens unit, and the second negative lens unit and the third positive lens unit are disposed on the image side of the stop. Moreover, near the wide angle end, the first positive lens unit and the first negative lens unit are disposed to be away from the stop, and the second positive lens unit, the second negative lens unit, and the third positive lens unit are also disposed to be away from the stop.

By making such arrangement, symmetry of an arrangement of refractive power in the zoom lens is improved. As a result, it is possible to suppress a fluctuation in an off-axis aberration at the time of zooming. Moreover, it is possible to maintain a state in which, the astigmatism, the coma, and the distortion are corrected favorably, at the time of zooming. Therefore, it is all the more advantageous for widening of the angle of view. Moreover, since the arrangement of refractive power by the aforementioned arrangement of the lens units enhances an effect such as of the telephoto type near the telephoto end, it is advantageous for shortening the total length of the zoom lens.

Moreover, a superior zooming effect is imparted to the second positive lens unit, similarly as the first negative lens unit. Therefore, an effect of reducing a strong beam converging effect due to the second positive lens unit over the total zoom range, and an effect of relaying an image to an image-side surface are imparted to the second negative lens unit. Moreover, since it is possible secure appropriately the zooming effect by the second positive lens unit and the second negative lens unit, it is advantageous for achieving high zooming ratio and for making small the diameter of lenses on the image side from the second positive lens unit including the second lens unit.

Moreover, when the negative refractive power of the first positive lens unit object-side system becomes large, since the negative distortion which occurs at the first positive lens unit object-side system becomes substantial, it is preferable to reduce this negative distortion. Therefore, by disposing the second negative lens unit having a negative refractive on the image side of the stop and securing the negative refractive power of an appropriate magnitude in the second negative lens unit, it is advantageous for the reduction of the negative distortion which occurs in the first positive lens unit object-side system.

Moreover, the third positive lens unit is positioned on the image-surface side of the second negative lens unit. Since the third positive lens unit has a positive refractive power, it is possible to make the third positive lens unit contribute to securing a favorable flatness of an image plane.

Moreover, by the second negative lens unit having a negative refractive power being disposed on the image side of the second positive lens unit, and the third positive lens unit having a positive refractive power being disposed on the further image side thereof, it is possible to reduce an angle of incidence of a light ray which is incident on an image pickup surface of the image pickup element (to make small an angle between the optical axis and the light ray).

Moreover, by an effect of the second negative lens unit and the third positive lens unit, it is possible to secure flatness of the image plane, stabilized over the total zoom range while having a high zooming ratio. Moreover, the second negative lens unit and the third positive lens unit being away from the stop with respect to the second positive lens unit, the second negative lens unit and the third positive lens unit are positioned near the image plane. Therefore, degradation of the spherical aberration and the coma is almost not there.

Due to an effect which each of the second negative lens unit and the third positive lens unit has, it is possible to form the second negative lens unit and the third positive lens unit by a small number of lenses. In this case, since it is possible to make the lens units to be light-weight, a high-velocity and stable movement of lens units (or lenses) becomes possible.

Moreover, in the image pickup apparatus according to the present embodiment, it is preferable that at the time of focusing, any lens in the second negative lens unit and the third positive lens unit moves in a direction along an optical axis.

As it has been mentioned above, the second negative lens unit and the third positive lens unit have the characteristics of being capable of securing the flatness of the image plane, stabilized over the total zoom range even with the high zooming ratio, and of not degrading the spherical aberration and the coma even when moved, and of forming the lens unit by the small number of lenses. Therefore, in a case of moving the lens units with a purpose other than zooming, when an effect which the lens unit has, and an effect on the fluctuation of aberration are taken into consideration, it is preferable to move any lens in the second negative lens unit or the third positive lens unit.

Because of this, at the time of focusing, it is preferable to move any lens in the second negative lens unit and the third positive lens unit in the direction along the optical axis. By making such an arrangement, it is possible to secure an optical performance with less aberration fluctuation. It becomes easy to secure a performance at a close distance in particular, such as a performance with less fluctuation in the spherical aberration and the astigmatism.

Moreover, in the image pickup apparatus according to the present embodiment, it is preferable that at the time of correcting blur, any lens in the second negative lens unit and the third positive lens unit undergoes decentered movement in a direction of cancelling an image blur.

As it has been mentioned above, in the case of moving the lens unit with a purpose other than zooming, it is preferable to move any lens in the second negative lens unit or the third positive lens unit.

Given the abovementioned situation, at the time of correcting blur, it is preferable to make any lens in the second negative lens unit and the third positive lens unit, undergo decentered movement in the direction of negation of the image blur. By doing so, the correction of blur with less aberration fluctuation becomes possible. The decentered movement at the time of correcting blur may be a movement (shift) in a direction orthogonal to the optical axis, or a rotation (tilt) with an axis orthogonal to the optical axis as a center, or a combination of shift and tilt.

Moreover, in the image pickup apparatus according to the present embodiment, it is preferable that the second negative lens unit includes one negative lens, and the following conditional expression (12) is satisfied.

$$35 \leq vd_{2N} \leq 96 \qquad (12)$$

where, $vd_{2N}$ denotes Abbe's number with reference to a d-line of the negative lens in the second negative lens unit.

Even in a case of securing functions such as a relay of an image, small-sizing, and aberration correction in the second negative lens unit, it is possible to form the second negative lens unit by one negative lens. In this case, it is desirable to reduce a chromatic aberration which occurs in the second negative lens unit.

By making so as not to fall below a lower limit value of conditional expression (12), since it is possible to suppress dispersion from becoming excessively substantial even when the second negative lens unit is formed by one negative lens, it is possible to make small the chromatic aberration which occurs in the second negative lens unit. Moreover, in each lens unit other than the second negative lens unit, correction of the chromatic aberration is carried out independently. Therefore, when the chromatic aberration in the second negative lens unit alone is small, it becomes easy to suppress degradation of performance due to the chromatic aberration in the zoom lens as a whole, even in a case in which, the decentering has occurred in each lens unit due to a manufacturing error.

By making so as not to exceed an upper limit value of conditional expression (12), since it is possible to secure moderately a dispersion of the second negative lens unit, it becomes easy to impart an effect of correcting the chromatic aberration by a combination with the second positive lens unit or the third positive lens unit. As a result, it becomes easy to secure a favorable chromatic aberration over the total zoom range.

Moreover, in the image pickup apparatus according to the present embodiment, it is preferable that the first negative lens unit and the second positive lens unit are disposed such that no lens is sandwiched between the first negative lens unit and the second positive lens unit.

Disposing the second positive lens unit without disposing a lens, on the image side of the first negative lens unit is advantageous for cost reduction.

Moreover, it is preferable that the image pickup apparatus according to the present embodiment includes a lens unit apart from the first negative lens unit and the second positive lens unit, which moves at the time of zooming.

In a case in which, the widening of the angle of view and high zooming ratio of the optical system are desired, the curvature of field is susceptible to occur throughout the total zoom range by widening the angle of view. Therefore, it is preferable to correct this curvature of field. For this, it is preferable to let the second negative lens unit or the third positive lens unit to be a lens unit which moves at the time of zooming, in addition to the first negative lens unit and the second positive lens unit. By making such arrangement, it becomes possible to correct the curvature of field favorably over the total zoom range.

Moreover, in the image pickup apparatus according to the present embodiment, it is preferable that a third positive lens unit having a positive refractive power is disposed on the image side of the second positive lens unit, and the third positive lens unit includes an object-side sub unit having a negative refractive power and an image-side sub unit having a positive refractive power, and the object-side sub unit and the image-side sub unit are disposed to be sandwiching the longest airspace in the third positive lens unit, and the first negative lens unit and the second negative lens unit, at the telephoto end, are positioned near the stop, and at the time of zooming, each distance between the adjacent lens units changes.

In the zoom lens of the image pickup apparatus according to the present embodiment, the first positive lens unit and the first negative lens unit are disposed on the object side of the stop, and the second positive lens unit and the third positive lens unit are disposed on the image side of the stop, and furthermore, the third positive lens unit includes in order from the object side, the object-side sub unit having a negative refractive power and the image-side sub unit having a positive refractive power. Moreover, near the wide angle end, the first positive lens unit and the first negative lens unit are disposed to be away from the stop, and both the second positive lens unit and the third positive lens unit are disposed to be away from the stop.

By making such arrangement, symmetry of an arrangement of refractive power in the zoom lens is improved. As a result, it is possible to suppress a fluctuation in an off-axis aberration at the time of zooming. Moreover, it is possible to maintain a state in which, the astigmatism, the coma, and the distortion are corrected favorably, at the time of zooming. Therefore, it is all the more advantageous for widening the angle of view. Moreover, since the arrangement of refractive power by the aforementioned arrangement of the lens units enhances an effect such as of the telephoto type near the telephoto end, it is advantageous for shortening the total length of the zoom lens.

Moreover, since it is possible to secure appropriately the zooming effect by the second positive lens unit, it is advantageous for achieving high zooming ratio and for making small the diameter of the lenses on the image side from the second positive lens unit including the second lens unit.

Moreover, when the negative refractive power of the first positive lens unit object-side system becomes large, since the negative distortion which occurs at the first positive lens unit object-side system becomes substantial, it is preferable to reduce this negative distortion. Therefore, by disposing the object-side sub unit having a negative refractive power on the image side of the stop and securing the negative refractive power of an appropriate magnitude in this object-side sub unit, it is advantageous for reduction of the negative distortion which occurs in the first positive lens unit object-side system.

Moreover, by the object-side sub unit having a negative refractive power being disposed on the image side of the second positive lens unit, and the image-side sub unit having a positive refractive power being disposed on the further image side thereof, it is possible to reduce an angle of incidence of a light ray which is incident on the image pickup surface of the image pickup element (to make small an angle between an optical axis and the light ray).

In the image pickup apparatus according to the present embodiment, it is preferable that, at the time of focusing, any lens in the third positive lens unit moves in a direction along an optical axis.

The third positive lens unit has the characteristics of being capable of securing the flatness of the image plane, stabilized over the total zoom range even with the high zooming ratio, and of not degrading the spherical aberration and the coma.

Therefore, at the time of focusing, it is preferable to move any lens in the third positive lens unit along the optical axis. By doing so, it is possible to secure an optical performance with lesser aberration fluctuation at the time of focusing. It becomes easy to secure a performance at an extreme close distance in particular, such as a performance with less fluctuation in the spherical aberration and the astigmatism.

Moreover, in the image pickup apparatus according to the present embodiment, it is preferable that at the time of correcting blur, any lens in the third positive lens unit undergoes decentered movement in a direction of cancelling an image blur.

As it has been mentioned above, in a case of moving a lens unit with a purpose other than zooming, when an effect of the lens unit or an effect on the aberration fluctuation is taken into consideration, it is preferable to move any lens in the third positive lens unit.

Given the abovementioned situation, at the time of correcting blur, it is preferable to make any lens in the third positive lens unit undergo decentered movement in a direction of cancelling an image blur. By making such an arrangement, correction of blur with lesser aberration fluctuation becomes possible. The decentered movement at the time of correcting blur may be a movement (shift) in a direction orthogonal to the optical axis, or a rotation (tilt) with an axis orthogonal to the optical axis as a center, or a combination of shift and tilt.

Moreover, in the image pickup apparatus according to the present embodiment, it is preferable that at the time of focusing, the second positive lens unit moves in a direction along an optical axis.

At the time of zooming and at the time of focusing, by moving the second positive lens unit, it is possible to simplify a moving mechanism.

Moreover, in the image pickup apparatus according to the present embodiment, it is preferable that the first negative lens unit includes a first negative lens having a negative refractive power, and a first positive lens having a positive refractive power, and the first negative lens is disposed nearest to the object side, and the first positive lens is disposed to be separated by a predetermined distance, on the image side of the first negative lens, and each of the first negative lens and the first positive lens has an aspheric surface, and each of the first negative lens and the first positive lens satisfies the following conditional expression (11).

$$-0.45 \leq ASP_{1NP} \leq -0.08 \tag{11}$$

where, $$ASP_{1NP} = ASP_{1NPo} + ASP_{1NPi},$$

$ASP_{1NPo}$ denotes an amount of aspherical deviation of a lens surface on the object side of the first positive lens, $ASP_{1NPi}$ denotes an amount of aspherical deviation of a lens surface on the image side of the first positive lens, and the amount of aspherical deviation is a distance from a reference spherical surface up to the lens surface, at a height from an optical axis, same as the maximum height of incidence of a light ray of an aperture stop at the telephoto end, with a direction toward the image side let to have a positive sign, and the reference surface is a spherical surface having a same vertex as a vertex of the lens surface, and a paraxial radius of curvature of the lens surface as a radius of curvature.

For securing a high zooming ratio, it is preferable to make the negative refractive power of the first negative lens unit large. Moreover, as it has been mentioned above, for securing a wide angle of view and shortening the total length of the zoom lens, it is preferable to make the negative refractive power of the first positive lens unit object-side system large, as well as to make the positive refractive power of the first positive lens unit large.

As each of the negative refractive power of the first positive lens unit object-side system and the positive refractive power of the first positive lens unit is made large, and accordingly, the angle of view of the optical system is widened, light with a large angle of incidence is incident on the zoom lens. As the light with a large angle of incident is incident on the zoom lens, near the wide angle end, when the light with a large angle of incidence emerges from the first positive lens unit, an angle with respect to an optical axis of the light emerged becomes extremely large. Therefore, it is preferable to dispose the negative lens nearest to the object side in the first negative lens unit. By making such arrangement, since it is possible make small an angle of emergence of the light emerged, it is advantageous for making small a diameter in the lens unit on the image side of the first negative lens unit.

On the other hand, for making light with even larger angle of incidence incident on the zoom lens, it is preferable to make the negative refractive power of the negative lens large. However, as the negative refractive power of the negative lens is made large, mainly, a positive spherical aberration near the telephoto end and the curvature of field near the wide angle end are susceptible to occur. Therefore, by using the aspheric surface of the negative lens, it is possible to suppress the occurrence of the spherical aberration.

Furthermore, by disposing a positive lens leaving a space, on the image side of the negative lens, it is possible to show even superior correction effect by the aspheric surface. Moreover, for facilitating to achieve both of a favorable correction of the spherical aberration and a flatness of the image plane even upon widening the angle of view of the optical system, it is preferable to use an aspheric surface for the positive lens as well. By using the aspheric surface for the negative lens and moreover, by using the aspheric surface for the positive lens, and in addition, by securing an appropriate aspheric-surface amount, it is possible to maintain favorably the flatness of the image plane, and a favorable correction of the spherical aberration even while securing the wide angle of view. Furthermore, by using the aspheric surface, it is possible to form the first negative lens unit by the lesser number of lenses not more than three.

By making so as not to fall below a lower limit value of conditional expression (11), it is possible to control the amount of the spherical aberration which occurs in the positive lens to be not excessively large. Therefore, it becomes easy to correct in the negative lens, the spherical aberration which occurs in the positive lens. Moreover, by reducing the spherical aberration which occurs mainly near the telephoto end, it is advantageous for achieving a high zooming ratio.

By making so as not to exceed an upper limit value of conditional expression (11), it is advantageous for favorable correction of the spherical aberration which occurs in the positive lens. Moreover, since it is possible to use the aspheric surface in the negative lens for correction of aberrations other than the spherical aberration which occurs in the positive lens, for correction of the astigmatism for instance, it is advantageous for improvement of flatness of the image plane.

Moreover, in the image pickup apparatus according to the present embodiment, it is preferable that the following conditional expression (13) is satisfied.

$$4.0 \leq L_w/|f_{1Po}| \leq 7.5 \quad (13)$$

where, $f_{1Po}$ denotes the focal length of the first positive lens unit object-side system, and $L_w$ denotes a distance which is obtained by adding a back focus length which is converted in length in the air, to a total length along an optical axis of the overall zoom lens system, and the distance is a distance when focused to an object at infinity at the wide angle end, and the total length is a distance from a lens surface nearest to the object side of the zoom lens up to a lens surface nearest to the image side of the zoom lens.

By making so as not to fall below a lower limit value of conditional expression (13), it is possible to make the negative refractive power of the first positive lens unit object-side system large, which leads to securing of the angle of view of sufficient width. Moreover, it is advantageous for securing high zooming ratio. By making so as not to exceed an upper limit value of conditional expression (13), it is possible to shorten the total length of the zoom lens and to make small the size of the image pickup apparatus, and therefore it is preferable.

Moreover, in the image pickup apparatus according to the present embodiment, it is preferable that at the time of zooming and at the time of focusing, a distance from the first positive lens unit up to the image pickup element is constant all the time.

At the time of zooming and at the time of focusing, by fixing the first positive lens unit and furthermore, by fixing an image forming position, it is possible to simplify further a layout of the optical system.

Moreover, in the image pickup apparatus according to the present embodiment, it is preferable that the first negative lens unit includes a first negative lens having a negative refractive power, and a second lens, and the first negative lens is disposed nearest to the object side, and the second lens is disposed at a predetermined distance, on the image side of the first negative lens, and the following conditional expression (14) is satisfied.

$$0.15 \leq L_{1Nair}/IH_t \leq 0.7 \quad (14)$$

where, $L_{1Nair}$ denotes an air space along an optical axis from the first negative lens up to the second lens, and $IH_t$ denotes the maximum image height when focused to an object at infinity at the telephoto end.

By making so as not to fall below a lower limit value of conditional expression (14), it is possible to secure a necessary air space between the first negative lens and the second lens. Accordingly, it becomes easy to correct the curvature of field which occurs due to the first negative lens near the wide angle end, in the second lens. Moreover, at the time of zooming it is possible to make small the fluctuation in the curvature of field near the wide angle end. Since it becomes easy to reduce mainly the negative spherical aberration and the coma near the telephoto end, it becomes easy to secure favorable performance throughout the entire zoom range.

By making so as not to exceed an upper limit value of conditional expression (14), it becomes easy to suppress the negative refractive power of the first negative lens from becoming excessively large. In this case, it becomes easy to suppress a tendency of occurrence of the curvature of field in a positive direction. Moreover, it is advantageous for reducing the positive spherical aberration near the telephoto end.

Moreover, in the image pickup apparatus according to the present embodiment, it is preferable that the following conditional expression (15) is satisfied.

$$0.75 \leq |f_{1P}/f_{1Po}| \leq 1.8 \quad (15)$$

where, $f_{1P}$ denotes a focal length of the first positive lens unit, and
$f_{1Po}$ denotes the focal length of the first positive lens unit object-side system.

By making so as not to fall below a lower limit value of conditional expression (15) does not fall below, it leads to widening of the angle of view at the wide angle end. By making so as not to exceed an upper limit value of conditional expression (15), it leads to both of securing a high zooming ratio and shortening the total length of the zoom lens.

Moreover, in the image pickup apparatus according to the present embodiment, it is preferable that the following conditional expression (9-1) is satisfied.

$$1.5 \leq |f_{1Po}/IH_t| \leq 3.6 \quad (9\text{-}1)$$

where, $f_{1Po}$ denotes the focal length of the first positive lens unit object-side system, and $IH_t$ denotes the maximum height when focused to an object at infinity at the telephoto end.

Technical significance of conditional expression (9-1) is same as the technical significance of conditional expression (9).

Moreover, in the image pickup apparatus according to the present embodiment, it is preferable that the following conditional expression (16) is satisfied.

$$0.37 \leq f_{1N}/f_{1Po} \leq 0.9 \quad (16)$$

where, $f_{1N}$ denotes a focal length of the first negative lens unit, and
$f_{1Po}$ denotes the focal length of the first positive lens unit object-side system.

Conditional expression (16) is a conditional expression which is advantageous for improvement of the aberration correction of the curvature of field and the distortion even in a case in which, a wide angle of view is secured.

By making so as not to fall below a lower limit value of conditional expression (16), since it becomes easy to suppress occurrence of the astigmatism in the first negative lens unit, it becomes easy to reduce a fluctuation in the curvature of field in the zoom range. By making so as not to exceed an upper limit value of conditional expression (16), since the negative refractive power of the first positive lens unit object-side system is suppressed to a moderate magnitude, it is advantageous for reduction of distortion, and for securing high zooming ratio and for shortening the total length of the zoom lens.

Moreover, in the image pickup apparatus according to the present embodiment, it is preferable that the following conditional expression (17) is satisfied.

$$-28 \leq DT \leq -13 \quad (17)$$

where, $DT$ is $DT=(IH_w-f_w\times\tan\omega_w)/(f_w\times\tan\omega_w)\times 100$(unit is %), $IH_w$ denotes the maximum image height when focused to an object at infinity at the wide angle end, $f_w$ denotes a focal length of the overall zoom lens system when focused to an object at infinity at the wide angle end, and $\omega_w$ denotes the maximum half angle of view when focused to an object at infinity at the wide angle end.

For making the reflecting member small, it is necessary to position the entrance pupil further on the object side. However, when the entrance pupil is positioned further on the object side, there is a tendency of substantial occurrence of the negative distortion. Therefore, it is preferable to optimize the amount of distortion.

When falling below a lower limit value of conditional expression (17), it becomes easy to make the reflecting member small. However, by making so as not to fall below the lower limit value of conditional expression (17), it becomes easy to suppress the amount of occurrence of the negative distortion from becoming large, and to suppress degradation of resolution in a case in which, the distortion is corrected electrically.

By making so as not to exceed an upper limit value of conditional expression (17), it is possible to make the reflecting member small even in a case in which, an attempt is made to secure a wide angle of view, and therefore it is advantageous for small-sizing. Moreover, since it becomes easy to suppress the negative refractive power of the first negative lens unit from becoming large, it is possible to reduce the astigmatism. Accordingly, it becomes easy to secure the flatness of the image plane even when high zooming ratio is achieved.

Moreover, in the image pickup apparatus according to the present embodiment, it is preferable that the following conditional expression (18) is satisfied.

$$-0.05 \leq f_w/r_{1F} \leq 0.085 \quad (18)$$

where, $f_w$ denotes a focal length of the overall zoom lens system when focused to an object at infinity at the wide angle end, and $r_{1F}$ denotes a paraxial radius of curvature of an object-side surface of the lens nearest to the object side in the first positive lens unit object-side system.

By making so as not to fall below a lower limit value of conditional expression (18), it becomes easy to reduce the negative distortion which occurs in the first positive lens unit object-side system, and to suppress substantial degradation of resolution in a case in which, the distortion is corrected electrically. By making so as not to exceed an upper limit value of conditional expression (18), since it becomes easy to impart sufficiently large negative refractive power to the first positive lens unit object-side system, it becomes easy to achieve a wide angle of view.

Moreover, in the image pickup apparatus according to the present embodiment, it is preferable that the first positive lens unit includes one negative lens on the object side of the reflecting member, and the total number of lenses on the object side of the reflecting member is one.

Since it is possible to reduce the bending thickness of the optical path, it is advantageous for thinning of a bending portion.

Moreover, in the image pickup apparatus according to the present embodiment, it is preferable that the first positive lens unit includes a negative lens made of glass, on the object side of the reflecting member, and the negative lens satisfies the following conditional expression (19).

$$1.9 \leq nd_{1PN} \leq 2.4 \quad (19)$$

where, $nd_{1PN}$ denotes a refractive index for a d-line of the negative lens made of glass.

A distance from a surface of the first positive lens unit nearest to the object side up to the reflecting member is a significant distance which determined the bending thickness of the optical path. Therefore, by satisfying conditional expression (19), it is possible to make short the distance of the surface of the first positive lens unit nearest to the object side up to the reflecting surface, while making large the negative refractive power of the negative lens made of glass.

By making so as not to fall below a lower limit value of conditional expression (19), it is possible make large a radius of curvature of an image-surface side of the negative lens made of glass. Accordingly, since it is possible to shorten a distance from the negative lens made of glass up to the reflecting surface, it is advantageous for thinning of the image pickup apparatus.

An optical glass has a property that as the refractive index becomes high, the transmittance is degraded toward a short wavelength (closer to the short wavelength side, higher is the absorptivity). Near a blue color, such as a wavelength range of 400 nm to 450 nm, is a wavelength range which is important for color reproduction. By making so as not to exceed an upper limit value of conditional expression (19), a remarkable degradation of transmittance of light on the short wavelength side which is important for color reproduction, such as transmittance of light in the wavelength range of 400 nm to 450 nm, is suppressed. As a result, it is possible to achieve an image with a favorable color reproduction.

Moreover, in the image pickup apparatus according to the present embodiment, it is preferable that the reflecting member is a prism.

For bending the optical path in the first positive lens unit upon widening the angle of view of the optical system, by letting the reflecting member to be a prism made of glass, it is advantageous for securing the refractive power of an appropriate magnitude in the first positive lens unit object-side system, and a space necessary for bending the optical path.

Moreover, in the image pickup apparatus according to the present embodiment, it is preferable that the following conditional expressions (20) and (21) are satisfied.

$$15 \leq vd_{pri} \leq 30 \quad (20)$$

$$1.8 \leq nd_{pri} \leq 2.3 \quad (21)$$

where, $vd_{pri}$ denotes Abbe's number with reference to a d-line, of the prism, and $nd_{pri}$ denotes a refractive index for the d-line, of the prism.

In the first positive lens unit object-side system, for securing a wide angle of view, the negative refractive power is susceptible to become large. Furthermore, for correcting the chromatic aberration efficiently by combining with the first positive lens unit object-side system, it is preferable that the dispersion in the first positive lens unit object-side system is substantial. By doing so, the chromatic aberration of magnification of the first positive lens unit object-side system near the telephoto end becomes substantial. Therefore, it is preferable to carryout aberration correction upon taking into consideration an effect on the longitudinal chromatic aberration (balance with the longitudinal chromatic aberration). Here, since the chromatic aberration of magnification has an effect on an amount of longitudinal chromatic aberration which occurs, it is preferable to carry out aberration correction upon taking into consideration the effect on the longitudinal chromatic aberration (balance with the longitudinal chromatic aberration).

By using the prism, it is possible to make the longitudinal chromatic aberration occur on the negative side, near the telephoto end. Therefore, even when the longitudinal chromatic aberration remains when the correction of the chromatic aberration of magnification is carried out in the first positive lens unit object-side system and the first positive lens unit image-side system, it is possible to correct the longitudinal chromatic aberration which has remained, by using the negative longitudinal chromatic aberration which occurs in the prism.

By making so as not to fall below a lower limit value of conditional expression (20), it is possible to prevent the longitudinal chromatic aberration from being corrected excessively. Therefore, it becomes easy to achieve a favorable image in which, spreading of colors is suppressed. By making so as not to exceed an upper limit value of conditional expression (20), it is possible to prevent the longitudinal chromatic aberration being corrected insufficiently. Therefore, it becomes easy to achieve a favorable image in which, spreading of colors is reduced.

Conditional expression (21) is a conditional expression which is preferable for securing the space which is necessary for bending the optical path, while widening the angle of view of the optical system.

By making so as not to fall below a lower limit value of conditional expression (21), it is possible to secure a sufficient optical path length in the prism, and therefore, it is advantageous for small sizing.

By making so as not to exceed an upper limit value of conditional expression (21), the remarkable degradation of transmittance of light of short wavelength side which is significant for color reproduction, such as the transmittance of light in the wavelength range of 400 nm to 450 nm, is suppressed. As a result, it is possible to achieve an image with a favorable color reproduction.

Moreover, in the image pickup apparatus according to the present embodiment, it is preferable that at the time of zooming and at the time of focusing, the stop is stationary.

By letting the stop to be fixed (stationary) at the time of zooming and at the time of focusing, it is possible to reduce an increase in weight of a lens unit which moves, and accordingly, it is possible to reduce load on a driving mechanism.

Moreover, in the image pickup apparatus according to the present embodiment it is preferable that a positive lens is disposed between the first negative lens unit and the second positive lens unit, and at the time of zooming and at the time of focusing, the stop and the positive lens are stationary.

By making such arrangement, since it is possible to make small an effective diameter of the second positive lens unit, it is advantageous for thinning the image pickup apparatus.

Moreover, in the image pickup apparatus according to the present embodiment, it is preferable that the reflecting member is a powerless prism, and the following conditional expression (22) is satisfied.

$$5.6 \leq \tan \omega_w / (L_{pri}/L_w) \leq 9.5 \quad (22)$$

where, $\omega_w$ denotes the maximum half angle of view when focused to an object at infinity at the wide angle end, $L_{pri}$ denotes a total length along an optical axis of the prism, and the total length is a distance from an optical surface on the object side of the reflecting surface up to an optical surface on the image side of the reflecting surface, from among optical surfaces which form the prism, and $L_w$ denotes a distance which is obtained by adding a back focus length which is converted in length in the air, to a total length along an optical axis of the overall zoom lens system, and the distance is a distance when focused to an object at infinity at the wide angle end, and the total length is a distance from a lens surface nearest to the object side of the zoom lens up to a lens surface nearest to the image side of the zoom lens.

For widening the angle of view of the optical system, and for bending the optical path in the first positive lens unit, it is necessary to secure an optical path length which is required for bending the optical path, between the first positive lens unit object-side system and the first positive lens unit image-side system. For this, it is preferable to make the negative refractive power of the first positive lens unit object-side system large, as well as to make the positive refractive power of the first positive lens unit image-side system large. In that case, it is preferable to reduce mainly the distortion and the astigmatism near the wide angle end, and to reduce mainly the spherical aberration and the coma near the telephoto end.

Therefore, even when an arrangement is made such that the negative refractive power of the first positive lens unit object-side system does not become excessively large by letting the reflecting member to be a prism, it is possible to secure the space for disposing the reflecting member (prism) in the first positive lens unit. In such manner, as the negative refractive power of the first positive lens unit object-side system does not become excessively large, letting the reflecting member to be a prism shows an effect in achieving a favorable aberration correction.

Moreover, various aberrations are corrected by the negative refractive power of the first positive lens unit object-side system and the positive refractive power of the first positive lens unit image-side system. Therefore, as a prism, by using a prism with no power, or in other words, a prism of which, all surfaces namely, a surface of incidence (an optical surface on the object side of the reflecting surface), the reflecting surface, and a surface of emergence (an optical surface on the image side of the reflecting surface), are plane surfaces, it is possible to dispose the reflecting surface without disturbing the balance of various aberrations. Accordingly, it is advantageous for suppressing the degradation of optical performance due to a manufacturing error.

By making so as not to fall below a lower limit value of conditional expression (22), it is advantageous for reducing a thickness of the prism, and for small-sizing. By making so as not to exceed an upper limit value of conditional expression (22), since it is possible to reduce load of the negative refractive power in the first positive lens unit object-side system, it is advantageous for reducing the distortion and the astigmatism.

Moreover, in the image pickup apparatus according to the present embodiment, it is preferable that $\omega_w \geq 42$ degrees, and the reflecting member is a prism, and the following conditional expressions (23) and (24) are satisfied.

$$0.55 \leq (\tau 420)^A \quad (23)$$

$$0.47 \geq (\tau 400)^A \quad (24)$$

where,

τ420 denotes an internal transmittance of light of wavelength 420 nm through 10 mm thickness of a material forming the prism, τ400 denotes an internal transmittance of light of wavelength 400 through 10 mm thickness of a material forming the prism, $A = Pd/10$ mm, and $L_{pri}$ denotes a total length along an optical axis of the prism, and the total length is a distance from an optical surface on the object side of the reflecting surface up to an optical surface on the image side of the reflecting surface from among optical surfaces which form the prism.

In a peripheral portion of an image, or in other words, in an area where the angle of view is large, the chromatic aberration of magnification is susceptible to become substantial. For correcting the chromatic aberration, it is preferable to use a negative lens with a small Abbe's number in the first positive lens unit object-side system. However, even in such case, it is preferable to reduce an effect of spreading of colors on a short-wavelength side.

Here, by letting the reflecting member to be a prism made of glass, it is possible to secure the optical path length which is required for bending the optical path while suppressing the negative refractive power of the first positive lens unit object-side system from becoming excessively large, and it is advantageous for achieving a favorable image. Moreover, by letting the reflecting member to be a prism made of glass and by setting appropriately a transmittance on the short-wavelength side in the prism, it is possible to reduce occurrence of spreading of colors, and therefore it is advantageous for achieving a favorable image.

Here, it is easy to carry out correction of the chromatic aberration for light of a wavelength near 420 nm, and the chromatic aberration is susceptible to remain for light of wavelength near 400 nm. By satisfying conditional expression (23) and conditional expression (24), by improving the transmittance in a wavelength region where the correction of the chromatic aberration can be carried out favorably, and by reducing the transmittance in a wavelength region where the effect on the spreading of colors is susceptible to occur, it becomes easy to achieve a favorable image.

Moreover, in the image pickup apparatus according to the present embodiment, it is preferable that the following conditional expression (25) is satisfied.

$$2.0 \leq f_{1Pi} \times f_w / IH_t^2 \leq 3.0 \quad (25)$$

where, $f_{1Pi}$ denotes the focal length of the first positive lens unit image-side system, $f_w$ denotes a focal length of the overall zoom lens system when focused on an object at infinity at the wide angle end, and $IH_t$ denotes the maximum image height when focused on an object at infinity at the telephoto end.

By making the positive refractive power of the first positive lens unit image-side system large, it is advantageous for making both the negative refractive power of the first positive lens unit object-side system and the positive refractive power of the first positive lens unit image-side system large simultaneously. When the negative refractive power of the first positive lens unit object-side system is made large, it is possible to position the entrance pupil on the object side. Therefore, making the negative refractive power of the first positive lens unit object-side system large is advantageous for securing a wide angle of view and for small-sizing of the first positive lens unit. Making the positive refractive power of the first positive lens unit large is advantageous for achieving high zooming ratio and shortening the total length of the zoom lens.

By making so as not to fall below a lower limit value of conditional expression (25), the refractive power of the first positive lens unit image-side system is suppressed from becoming excessively large. Accordingly, it becomes easy to reduce occurrence of the off-axis aberration which is susceptible to be remarkable at the wide angle end side. Moreover, it becomes easy to reduce the occurrence of the negative spherical aberration and the positive distortion at the telephoto end side.

By making so as not to exceed an upper limit value of conditional expression (25), it is advantageous for securing sufficiently the positive refractive power of the first positive lens unit, and is also advantageous for achieving both, the shortening of the total length of the zoom lens and securing high zooming ratio.

It is preferable that a plurality of the abovementioned arrangements is satisfied simultaneously.

Moreover, it is preferable to make that function more assured by restricting one or both of the upper limit value and the lower limit value for each conditional expression.

For conditional expression (1), it is more preferable to let the lower limit value to be 5.0, and 5.5 is even more preferable. Moreover, for conditional expression (1), it is more preferable to let the upper limit value to be 7.35, and 7.22 is even more preferable.

For conditional expression (2), it is more preferable to let the lower limit value to be 0.73. Moreover, for conditional expression (2), it is more preferable to let the upper limit value to be 1.1.

For conditional expression (3), it is more preferable to let the lower limit value to be 5.0, and 7.0 is even more preferable. Moreover, for conditional expression (3), it is more preferable to let the upper limit value to be 13, and 10 is even more preferable.

For conditional expression (4), it is more preferable to let the lower limit value to be 5.0. Moreover, for conditional expression (4), it is more preferable to let the upper limit value to be 8.5.

For conditional expressions (5) and (5-1), it is more preferable to let the lower limit value to be 5.9. Moreover, for conditional expressions (5) and (5-1), it is more preferable to let the upper limit value to be 9.5, and 8.5 is even more preferable.

For conditional expression (6), it is more preferable to let the lower limit value to be 1.4. Moreover, for conditional expression (6), it is more preferable to let the upper limit value to be 3.4.

For conditional expression (7), it is more preferable to let the lower limit value to be 1.8. Moreover, for conditional expression (7), it is more preferable to let the upper limit value to be 2.55.

For conditional expression (8), it is more preferable to let the lower limit value to be 1.0. Moreover, for conditional expression (8), it is more preferable to let the upper limit value to be 3.4.

For conditional expressions (9) and (9-1), it is more preferable to let the lower limit value to be 1.5, and 1.8 is even more preferable. Moreover, for conditional expressions (9) and (9-1), it is more preferable to let the upper limit value to be 3.3, and 3.1 is even more preferable.

For conditional expression (10), it is more preferable to let the lower limit value to be 1.5. Moreover, for conditional expression (10), it is more preferable to let the upper limit value to be 2.7.

For conditional expression (11), it is more preferable to let the lower limit value to be −0.4. Moreover, for conditional expression (11), it is more preferable to let the upper limit value to be −0.1.

For conditional expression (12), it is more preferable to let the lower limit value to be 42. Moreover, for conditional expression (12), it is more preferable to let the upper limit value to be 70.

For conditional expression (13), it is more preferable to let the lower limit value to be 4.5. Moreover, for conditional expression (13), it is more preferable to let the upper limit value to be 6.5.

For conditional expression (14), it is more preferable to let the lower limit value to be 0.2. Moreover, for conditional expression (14), it is more preferable to let the upper limit value to be 0.55.

For conditional expression (15), it is more preferable to let the lower limit value to be 0.9. Moreover, for conditional expression (15), it is more preferable to let the upper limit value to be 1.5.

For conditional expression (16), it is more preferable to let the lower limit value to be 0.4. Moreover, for conditional expression (16), it is more preferable to let the lower limit value to be 0.82.

For conditional expression (17), it is more preferable to let the lower limit value to be −25. Moreover, for conditional expression (17), it is more preferable to let the upper limit value to be −16.

For conditional expression (18), it is more preferable to let the lower limit value to be 0.02, and 0.0 is even more preferable. Moreover, for conditional expression (18), it is more preferable to let the upper limit value to be 0.08.

For conditional expression (19), it is more preferable to let the lower limit value to be 2.0. Moreover, for conditional expression (19), it is more preferable to let the upper limit value to be 2.2.

For conditional expression (20), it is more preferable to let the lower limit value to be 17.

For conditional expression (21), it is more preferable to let the lower limit value to be 1.9. Moreover, for conditional expression (21), it is more preferable to let the upper limit value to be 2.2.

For conditional expression (22), it is more preferable to let the lower limit value to be 6.0, and 6.2 is even more preferable. Moreover, for conditional expression (22), it is more preferable to let the upper limit value to be 8.5, and 7.5 is even more preferable.

For conditional expression (23), it is more preferable to let the lower limit value to be 0.565. Moreover, for conditional expression (23), it is preferable that the upper limit value is 1.0.

For conditional expression (24), it is preferable that the lower limit value is 0. Moreover, for conditional expression (24), it is more preferable that the upper limit value is 0.45.

For conditional expression (25), it is more preferable to let the lower limit value to be 2.1, and 2.2 is even more preferable. Moreover, for conditional expression (25), it is more preferable to let the upper limit value to be 2.9, and 2.8 is even more preferable.

The aforementioned image pickup apparatus may satisfy the plurality of arrangements simultaneously. Doing so is preferable for achieving a favorable optical image pickup apparatus. Moreover, a combination of preferable arrangements is arbitrary. For each conditional expression, only an upper limit value or a lower limit value of a further limited numerical range of the conditional expression may be restricted.

Figure 17:
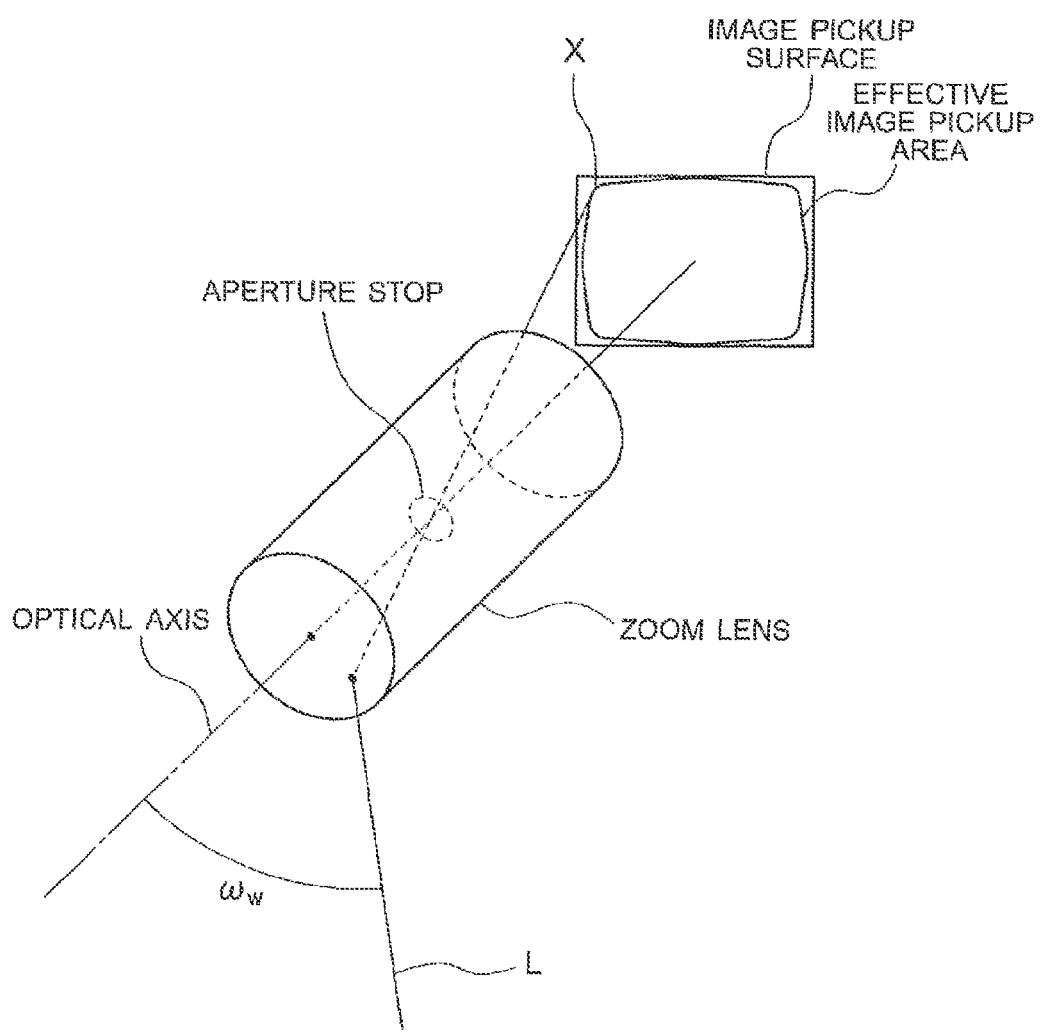
FIG. 17 is a diagram for explaining $\omega_w$.

$\omega_w$ (the maximum half angle of view when focused to an object at infinity at the wide angle end) will be described by using FIG. 17. In FIG. 17, as to how, a zoom lens, an aperture stop, and an image pickup surface are arranged on an optical axis is shown. A light ray which is incident on the zoom lens, upon passing through the aperture stop, is emerged from the zoom lens, and reaches the image pickup surface.

In FIG. 17, a light ray L shown by a solid line indicates a light ray which reaches a point X on an effective image pickup area, from among light rays which pass through the center of the aperture stop. The point X is a position farthest from the optical axis in the effective image pickup area. Here, the effective image pickup area being an area, in which an object image is formed, the point X becomes the maximum image-height position. In such manner, the light ray L is a light ray which passes through the aperture stop, and which is incident on the maximum image-height position. Moreover, ωw is a half angle of view with respect to an optical axis of light ray L, at the wide angle end.

Examples of a zoom lens which is to be used in the image pickup apparatus according to the present invention will be described below in detail by referring to the accompanying diagrams. However, the present invention is not restricted to the examples described below.

Examples from an example 1 to an example 8 of the zoom lens will be described below. Lens cross-sectional views of the examples from the example 1 to the example 8 are shown in diagrams from FIG. 1A, FIG. 1B, and FIG. 1C to FIG. 8A, FIG. 8B, and FIG. 8C. FIG. 1A, FIG. 2A, FIG. 3A, FIG. 4A, FIG. 5A, FIG. 6A, FIG. 7A, and FIG. 8A (hereinafter, 'FIG. 1A to FIG. 8A') are lens cross-sectional views at the wide angle end. FIG. 1B, FIG. 2B, FIG. 3B, FIG. 4B, FIG. 5B, FIG. 6B, FIG. 7B, and FIG. 8B (hereinafter, 'FIG. 1B to FIG. 8B') are lens cross-sectional views in an intermediate focal length state. FIG. 1C, FIG. 2C, FIG. 3C, FIG. 4C, FIG. 5C, FIG. 6C, FIG. 7C, and FIG. 8C (hereinafter, 'FIG. 1C to FIG. 8C') are lens cross-sectional views at the telephoto end. All the diagrams from FIG. 1A, FIG. 1B, and FIG. 1C to FIG. 8A, FIG. 8B, and FIG. 8C are lens cross-sectional views at the time of focusing at an object at infinity.

Moreover, a first lens unit is denoted by G1, a second lens unit is denoted by G2, an aperture stop is denoted by S, a third lens unit is denoted by G3, a fourth lens unit is denoted by G4, a fifth lens unit is denoted by G5, a sixth lens unit is denoted by G6, a flat parallel plate which forms a low-pass filter is denoted by F, a flat parallel plate of cover glass is denoted by C, and an image plane is denoted by I. A wavelength region restricting coating, which restricts infrared light, may be applied to a surface of the flat parallel plate F. Moreover, a multi-layer film for restricting wavelength region may be applied to a surface of the cover glass C. Furthermore, an arrangement may be made to impart an effect of a low-pass filter to the cover glass C.

In the examples from the example 1 to the example 8, a reflecting surface is provided to a prism. The reflecting surface is a plane surface, and in between an object-side refracting surface and an image-side refracting surface of the prism on an optical axis, the reflecting surface is disposed to be inclined by about 45 degrees with respect to the optical axis. Moreover, since the reflecting surface reflects light which passes through an interior of the prism, it is a rear-surface reflecting surface. Therefore, the prism is a rear-surface reflecting prism. The reflecting surface is not shown in the diagram, and is omitted in numerical data. The object-side refracting surface and the image-side refracting surface of the prism are shown in the diagram, and mentioned in the numerical data.

Moreover, an image pickup element is disposed on the image plane I. It is preferable to dispose the image pickup element such that, in a case in which, an image pickup area on the image pickup element is substantially rectangular-shaped, a direction of a short side of the image pickup area and an optical axis of light incident on the zoom lens, are almost parallel. When the image pickup element is disposed in such manner, it is advantageous for small-sizing of the zoom lens in a direction of optical axis of light which is incident, and leads to thinning of the image pickup apparatus.

In zoom lenses of examples from the example 1 to the example 8, the image height is same in the intermediate focal length state and at the telephoto end, and is small at the wide angle end, as compared to the image height in the intermediate focal length state and the image height at the telephoto end. The reason being that, an image at the wide angle end is let to be barrel-shaped, and the distortion is corrected by converting the barrel-shaped image to a rectangular image electrically. Details of the electrical distortion correction will be described later.

The zoom lenses of examples from the example 1 to the example 8 include a first positive lens unit having a positive refractive power, a first negative lens unit having a negative refractive power, a stop, and a second positive lens unit having a positive refractive power, and the first positive lens unit and the first negative lens unit are disposed in order of the first positive lens unit and the first negative lens unit from an object side to an image side, and the second positive lens unit is disposed on the image side of the first negative lens unit, and the stop is disposed between the first negative lens unit and the second positive lens unit, and at the time of zooming from the wide angle end to the telephoto end, the first positive lens unit is stationary, the first negative lens unit moves toward the image side, and the second positive lens unit moves toward the object side.

For the zoom lenses in examples from the example 1 to the example 5, an arrangement of refractive power (including the stop S) is a positive refractive power, a negative refractive power, S, a positive refractive power, a negative refractive power, and a positive refractive power. Here, the first positive lens unit is a first lens unit G1, the first negative lens unit is a second lens unit G2, and a second positive lens unit is a third lens unit G3. Moreover, in zoom lenses of the example 6 and the example 7, an arrangement of refractive power (including the stop S) is a positive refractive power, a negative refractive power, a positive refractive power, S, a positive refractive power, and a positive refractive power. Here, the first positive lens unit is a first lens unit G1, the first negative lens unit is a second lens unit G2, the second positive lens unit is a fourth lens unit G4 or a fifth lens unit G5. Moreover, in the zoom lens of the example 8, an arrangement of refractive power (including the stop S) is a positive refractive power, a negative refractive power, S, a positive refractive power, a positive refractive power, a negative refractive power, a positive refractive power. Here, the first positive lens unit is a first lens unit G1, the first negative lens unit is a second lens unit G2, the second positive lens unit is any one of a third lens unit G3, a fourth lens unit G4, and a sixth lens unit G6.

By making such arrangement, in the example from the example 1 to the example 8, it is advantageous for shortening the total length of the zoom lens, and for securing a high zooming ratio. Moreover, since the arrangement is an arrangement which improves symmetry of arrangement of refractive power, it becomes easy to maintain a state in which, the fluctuation in off-axis aberration at the time of zooming, particularly, an off-axis aberration such as astigmatism and coma is corrected favorably.

Moreover, a position at the telephoto end of the first negative lens unit (first lens unit G1) is on the image side of a position at the wide angle end of the first negative lens unit, and a position at the telephoto end of the second positive lens unit (second lens unit G2) is on the object side of a position at the wide angle end of the second positive lens unit. As a result, even when the angle of view of the optical system is widened, it is possible to make small a diameter of the first positive lens unit (first lens unit G1), and also securing of a high zooming ratio becomes easy.

Moreover, the first positive lens unit (first lens unit G1) is stationary not only at the time of zooming but also at the time of focusing. By making such arrangement, it is possible to simplify a layout of the optical system (lens units) in the zoom lens. As a result, it is possible to realize a small-size image pickup apparatus.

Moreover, the first positive lens unit (first lens unit G1) includes a reflecting member which has a reflecting surface which bends an optical path, a first positive lens unit object-side system, and a first positive lens unit image-side system, and the first positive lens unit object-side system is positioned on the object side of the reflecting surface and has a negative refractive power, and the first positive lens unit image-side system is positioned on the image side of the reflecting surface and has a positive refractive power. By making such arrangement, it is possible to secure an appropriate positive refractive power in the first positive lens unit (first lens unit G1). Moreover, it is possible to make small a space for disposing the reflecting member.

Figure 1B:
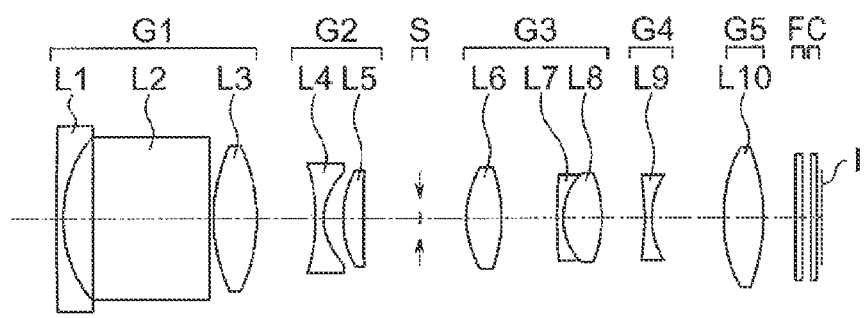
Figure 1C:
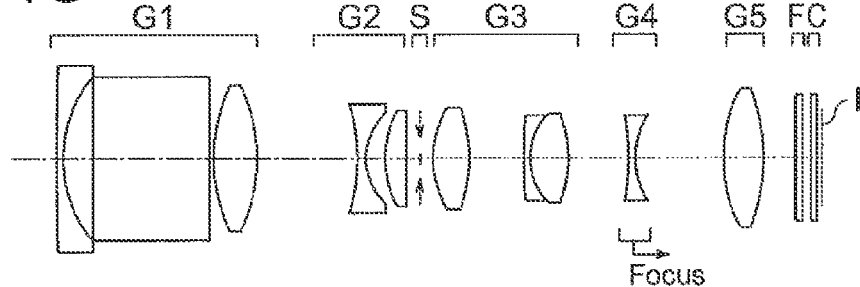

The zoom lens of the example 1, as shown in FIG. 1A, FIG. 1B, and FIG. 1C, includes in order from an object side, a first lens unit G1 (the first positive lens unit) having a positive refractive power, a second lens unit G2 (the first negative lens unit) having a negative refractive power, a third lens unit G3 (the second positive lens unit) having a positive refractive power, a fourth lens unit G4 (the second negative lens unit) having a negative refractive power, and a fifth lens unit G5 (the third positive lens unit) having a positive refractive power. An aperture stop (the stop) S is disposed between the second lens unit G2 (the first negative lens unit) and the third lens unit G3 (the second positive lens unit).

The first lens unit G1 includes a negative meniscus lens L1 having a convex surface directed toward the object side, a prism L2, and a biconvex positive lens L3. The second lens unit G2 includes a biconcave negative lens L4 and a positive meniscus lens L5 having a convex surface directed toward the object side. The third lens unit G3 includes a biconvex positive lens L6, a negative meniscus lens L7 having a convex surface directed toward the object side, and a biconvex positive lens L8. Here, the negative meniscus lens L7 and the biconvex positive lens L8 are cemented. The fourth lens unit G4 includes a biconcave negative lens L9. The fifth lens unit G5 includes a biconvex positive lens L10.

At the time of zooming from a wide angle end to a telephoto end, the first lens unit G1 is fixed (stationary), the second lens unit G2 moves toward an image side, the aperture stop S is fixed (stationary), the third lens unit G3 moves toward the object side, the fourth lens unit G4 moves toward the object side, and the fifth lens unit G5 is fixed (stationary).

An aspheric surface is provided to a total of 12 surfaces namely, both surfaces of the biconvex positive lens L3, both surfaces of the biconcave negative lens L4, both surfaces of the positive meniscus lens L5, both surfaces of the biconvex positive lens L6, both surfaces of the biconcave negative lens L9, and both surfaces of the biconvex positive lens L10.

At the time of focusing from an object at infinity to an object at an extreme close distance, the fourth lens unit G4 moves toward the image side along an optical axis.

Figure 2A:
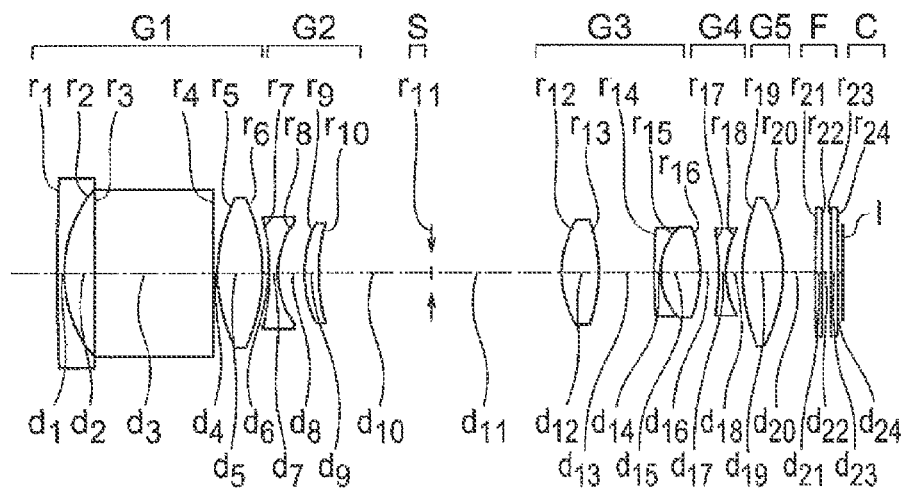
FIG. 2A, FIG. 2B, and FIG. 2C are lens cross-sectional views at a wide angle end (FIG. 2A), in an intermediate focal length state (FIG. 2B), and at a telephoto end (FIG. 2C), at the time of infinite object point focusing of a zoom lens according to an example 2 of the present invention.
Figure 2B:
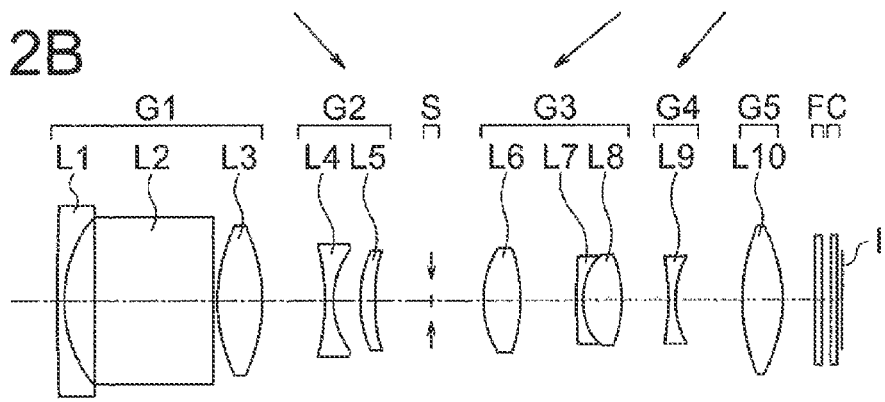
Figure 2C:
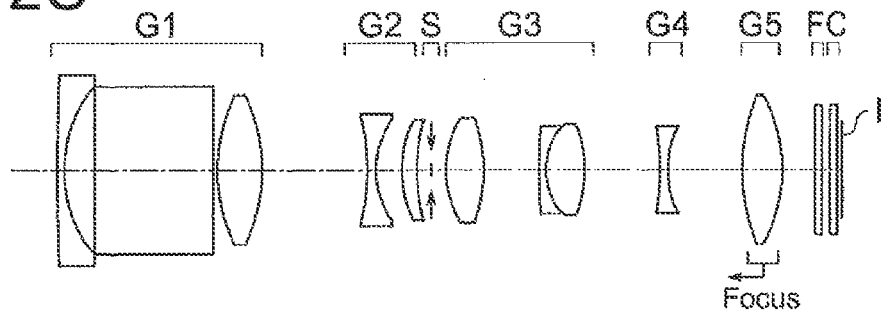

A zoom lens of the example 2, as shown in FIG. 2A, FIG. 2B, and FIG. 2C, includes in order from an object side, a first lens unit G1 (the first positive lens unit) having a positive refractive power, a second lens unit G2 (the first negative lens unit) having a negative refractive power, a third lens unit G3 (the second positive lens unit) having a positive refractive power, a fourth lens unit G4 (the second negative lens unit) having a negative refractive power, and a fifth lens unit G5 (the third positive lens unit) having a positive refractive power. An aperture stop (the stop) S is disposed between the second lens unit G2 (the first negative lens unit) and the third lens unit G3 (the second positive lens unit).

The first lens unit G1 includes a negative meniscus lens L1 having a convex surface directed toward the object side, a prism L2, and a biconvex positive lens L3. The second lens unit G2 includes a biconcave negative lens L4 and a positive meniscus lens L5 having a convex surface directed toward the object side. The third lens unit G3 includes a biconvex positive lens L6, a negative meniscus lens L7 having a convex surface directed toward the object side, and a biconvex positive lens L8. Here, the negative meniscus lens L7 and the biconvex positive lens L8 are cemented. The fourth lens unit G4 includes a biconcave negative lens L9. The fifth lens unit G5 includes a biconvex positive lens L10.

At the time of zooming from a wide angle end to a telephoto end, the first lens unit G1 is fixed (stationary), the second lens unit G2 moves toward an image side, the aperture stop (stop) S is fixed (stationary), the third lens unit G3 moves toward the object side, the fourth lens unit G4 moves toward the object side, and the fifth lens unit G5 is fixed (stationary).

An aspheric surface is provided to a total of 12 surfaces namely, both surfaces of the biconvex positive lens L3, both surfaces of the biconcave negative lens L4, both surfaces of the positive meniscus lens L5, both surfaces of the biconvex positive lens L6, both surfaces of the biconcave negative lens L9, and both surfaces of the biconvex positive lens L10.

At the time of focusing from an object at infinity to an object at an extreme close distance, the fifth lens unit G5 moves toward the object side along an optical axis.

Figure 3A:
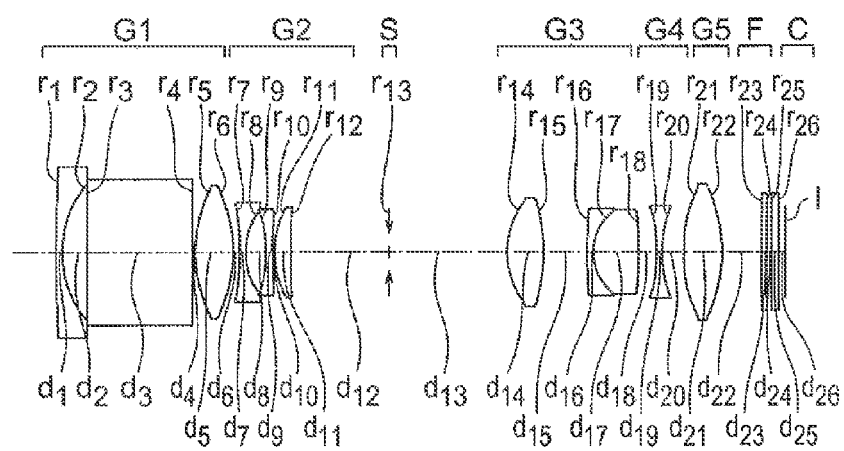
FIG. 3A, FIG. 3B, and FIG. 3C are lens cross-sectional views at a wide angle end (FIG. 3A), in an intermediate focal length state (FIG. 3B), and at a telephoto end (FIG. 3C), at the time of infinite object point focusing of a zoom lens according to an example 3 of the present invention.
Figure 3B:
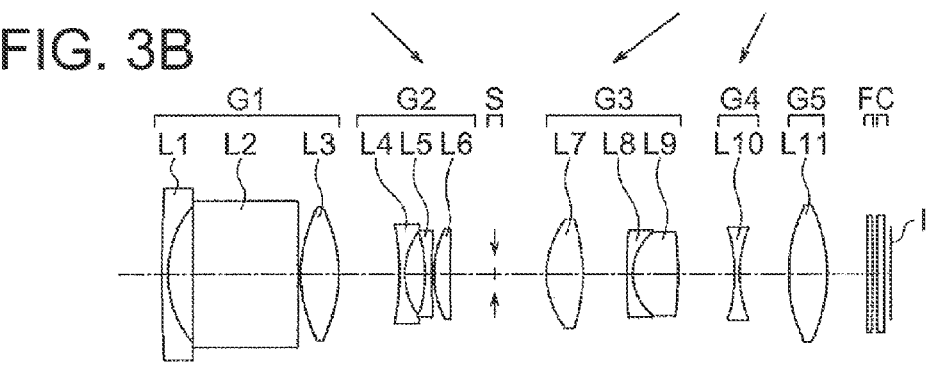
Figure 3C:
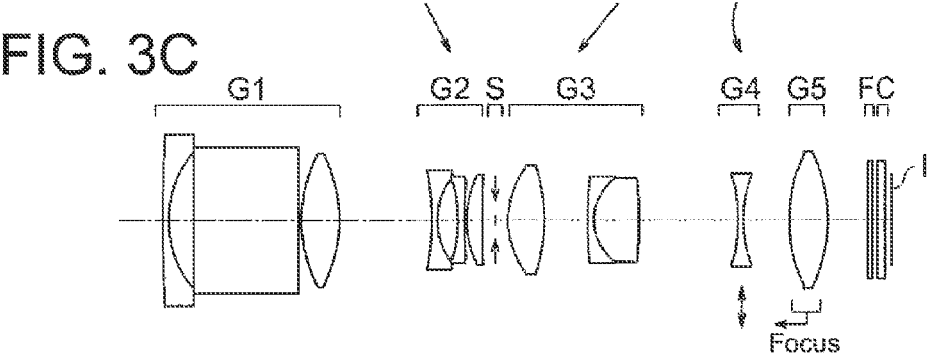

The zoom lens of the example 3, as shown in FIG. 3A, FIG. 3B, and FIG. 3C, includes in order from an object side, a first lens unit G1 (the first positive lens unit) having a positive refractive power, a second lens unit G2 (the first negative lens unit) having a negative refractive power, a third lens unit G3 (the second positive lens unit) having a positive refractive power, a fourth lens unit G4 (the second negative lens unit) having a negative refractive power, and a fifth lens unit G5 (the third positive lens unit) having a positive refractive power. An aperture stop (the stop) S is disposed between the second lens unit G2 (the first negative lens unit) and the third lens unit G3 (the second positive lens unit).

The first lens unit G1 includes a negative meniscus lens L1 having a convex surface directed toward the object side, a prism L2, and a biconvex positive lens L3. The second lens unit G2 includes a biconcave negative lens L4, a biconcave negative lens L5, and a positive meniscus lens L6 having a convex surface directed toward the object side. The third lens unit G3 includes a biconvex positive lens L7, a negative meniscus lens L8 having a convex surface directed toward the object side, and a biconvex positive lens L9. Here, the negative meniscus lens L8 and the biconvex positive lens L9 are cemented. The fourth lens unit G4 includes a biconcave negative lens L10. The fifth lens unit G5 includes a biconvex positive lens L11.

At the time of zooming from a wide angle end to a telephoto end, the first lens unit G1 is fixed (stationary), the second lens unit G2 moves toward an image side, the aperture stop S is fixed (stationary), the third lens unit G3 moves toward the object side, the fourth lens unit G4, after moving toward the object side, moves toward the image side, and the fifth lens unit G5 is fixed (stationary).

An aspheric surface is provided to a total of 14 surfaces namely, both surface of the biconvex positive lens L3, both surfaces of the biconcave negative lens L4, both surfaces of the biconcave negative lens L5, both surfaces of the positive meniscus lens L6, both surfaces of the biconvex positive lens L7, both surfaces of the biconcave negative lens L10, and both surfaces of the biconvex positive lens L11.

At the time of focusing from an object at infinity to an object at an extreme close distance, the fifth lens unit G5 moves toward the object side along an optical axis. Moreover, at the time of correcting blur, the fourth lens unit G4 moves in a direction orthogonal to the optical axis.

Figure 4A:
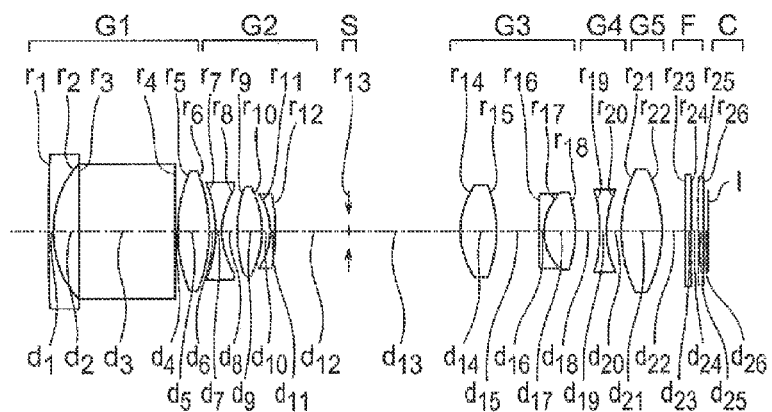
FIG. 4A, FIG. 4B, and FIG. 4C are lens cross-sectional views at a wide angle end (FIG. 4A), in an intermediate focal length state (FIG. 4B), and at a telephoto end (FIG. 4C), at the time of infinite object point focusing of a zoom lens according to an example 4 of the present invention.
Figure 4B:
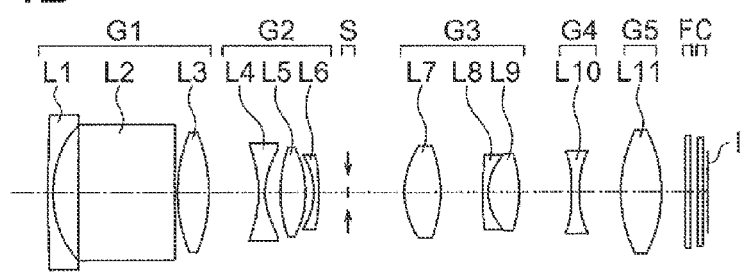
Figure 4C:
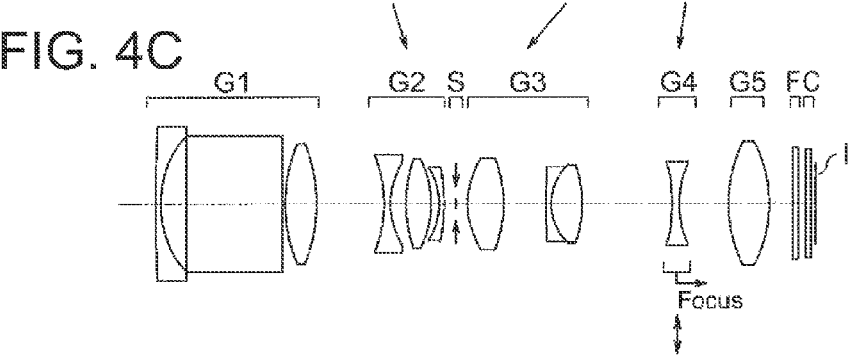

The zoom lens of the example 4, as shown in FIG. 4A, FIG. 4B, and FIG. 4C, includes in order from an object side, a first lens unit G1 (the first positive lens unit) having a positive refractive power, a second lens unit G2 (the first negative lens unit) having a negative refractive power, a third lens unit G3 (the second positive lens unit) having a positive refractive power, a fourth lens unit G4 (the second negative lens unit) having a negative refractive power, and a fifth lens unit G5 (the third positive lens unit) having a positive refractive power. An aperture stop (the stop) S is disposed between the second lens unit G2 (the first negative lens unit) and the third lens unit G3 (the second positive lens unit).

The first lens unit G1 includes a negative meniscus lens L1 having a convex surface directed toward the object side, a prism L2, and a biconvex positive lens L3. The second lens unit G2 includes a biconcave negative lens L4, a biconvex positive lens L5, and a negative meniscus lens L6 having a convex surface directed toward an image side. The third lens unit G3 includes a biconvex positive lens L7, a negative meniscus lens L8 having a convex surface directed toward the object side, and a biconvex positive lens L9. Here, the negative meniscus lens L8 and the biconvex positive lens L9 are cemented. The fourth lens unit G4 includes a biconcave negative lens L10. The fifth lens unit G5 includes a biconvex positive lens L11.

At the time of zooming from a wide angle end to a telephoto end, the first lens unit G1 is fixed (stationary), the second lens unit G2 moves toward the image side, the aperture stop S is fixed (stationary), the third lens unit G3 moves toward the object side, the fourth lens unit G4 moves toward the object side, and the fifth lens unit G5 is fixed (stationary).

An aspheric surface is provided to a total of 11 surfaces namely, both surfaces of the biconvex positive lens L3, both surface of the biconcave negative lens L4, both surfaces of the biconvex positive lens L7, an image-side surface of the biconvex positive lens L9, both surfaces of the biconcave negative lens L10, and both surfaces of the biconvex positive lens L11.

At the time of focusing from an object at infinity to an object at an extreme close distance, the fourth lens unit G4 moves toward the image side along an optical axis. Moreover, at the time of correcting blur, the fourth lens unit G4 moves in a direction orthogonal to the optical axis.

Figure 5A:
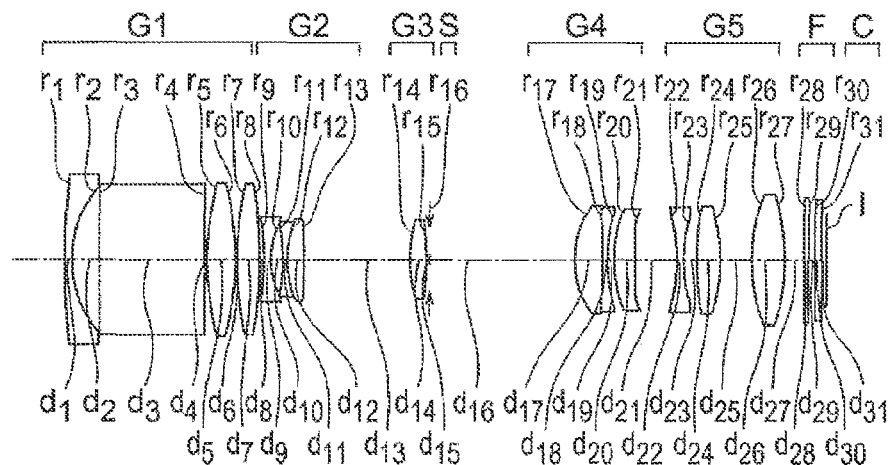
FIG. 5A, FIG. 5B, and FIG. 5C are lens cross-sectional views at a wide angle end (FIG. 5A), in an intermediate focal length state (FIG. 5B), and at a telephoto end (FIG. 5C), at the time of infinite object point focusing of a zoom lens according to an example 5 of the present invention.
Figure 5B:
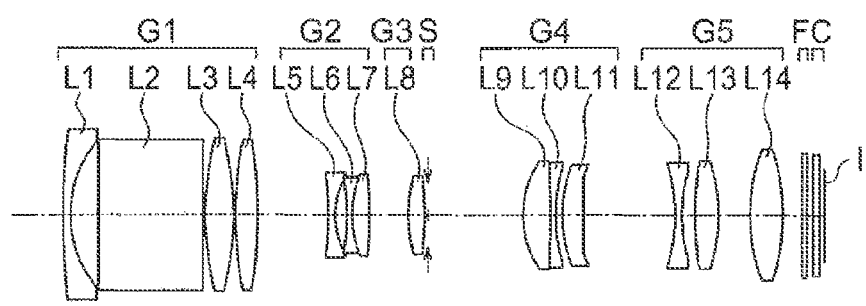
Figure 5C:
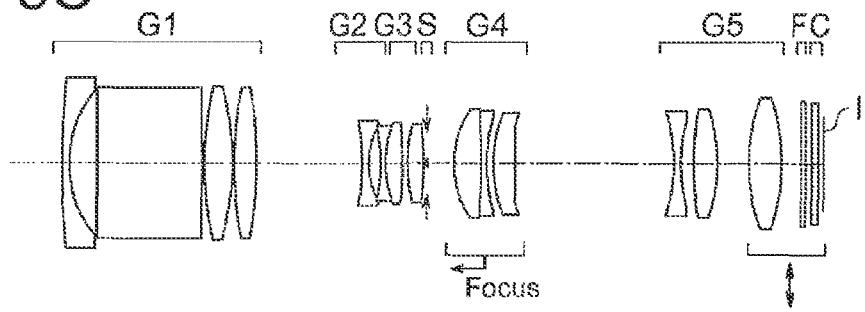

The zoom lens of the example 5, as shown in FIG. 5A, FIG. 5B, and FIG. 5C, includes in order from an object side, a first lens unit G1 (the first positive lens unit) having a positive refractive power, a second lens unit G2 (the first negative lens unit) having a negative refractive power, a third lens unit G3 having a positive refractive power, a fourth lens unit G4 (the second positive lens unit) having a positive refractive power, and a fifth lens unit G5 (the third positive lens unit) having a positive refractive power. An aperture stop (the stop) S is disposed between the second lens unit G2 (the first negative lens unit) and the fourth lens unit G4 (the second positive lens unit).

The first lens unit G1 includes a negative meniscus lens L1 having a convex surface directed toward the object side, a prism 2, a biconvex positive lens L3, and a biconvex positive lens L4. The second lens unit G2 includes a biconcave negative lens L5, a biconcave negative lens L6, and a biconvex positive lens L7. Here, the biconcave negative lens L6 and the biconvex positive lens L7 are cemented. The third lens unit G3 includes a biconvex positive lens L8. The fourth lens unit G4 includes a biconvex positive lens L9, a biconcave negative lens L10, and a biconvex positive lens L11. Here, the biconvex positive lens L9 and the biconcave negative lens L10 are cemented. The fifth lens unit G5 includes a biconcave negative lens L12, a biconvex positive lens L13, and a biconvex positive lens L14.

At the time of zooming from a wide angle end to a telephoto end, the first lens unit G1 is fixed (stationary), the second lens unit G2 moves toward an image side, the third lens unit G3 is fixed (stationary), the aperture stop S is fixed (stationary), the fourth lens unit G4 moves toward the object side, and the fifth lens unit G5 is fixed (stationary).

An aspheric surface is provided to a total of 10 surfaces namely, an object-side surface of the biconvex positive lens L3, an image-side surface of the biconvex positive lens L4, both surfaces of the biconcave negative lens L5, both surfaces of the biconvex positive lens L8, an object-side surface of the biconvex positive lens L9, an image-side surface of the biconvex positive lens L11, an object-side surface of the biconvex positive lens L13, and an image-side surface of the biconvex positive lens L14.

At the time of focusing from an object at infinity to an object at an extreme close distance, the fourth lens unit G4 moves toward the object side along an optical axis. Moreover, at the time of correcting blur, the biconvex positive lens L14 in the fifth lens unit G5, the filter F, the cover glass C, and the image pickup element move in a direction orthogonal to the optical axis.

Figure 6A:
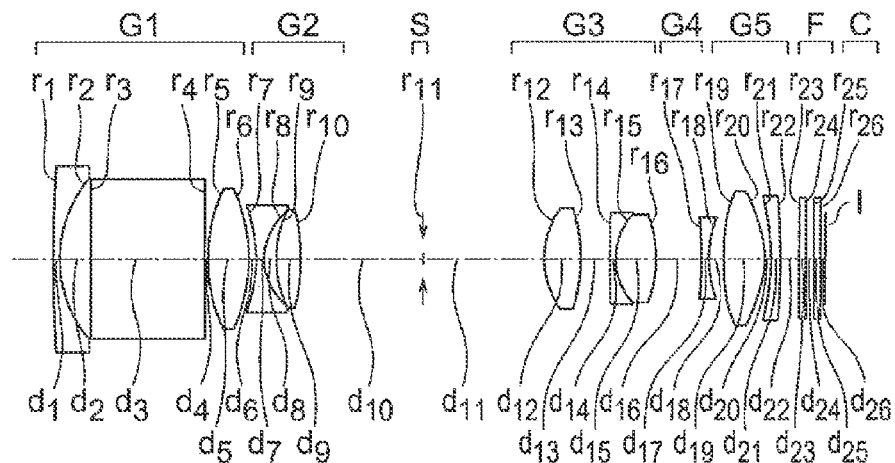
FIG. 6A, FIG. 6B, and FIG. 6C are lens cross-sectional views at a wide angle end (FIG. 6A), in an intermediate focal length state (FIG. 6B), and at a telephoto end (FIG. 6C), at the time of infinite object point focusing of a zoom lens according to an example 6 of the present invention.
Figure 6B:
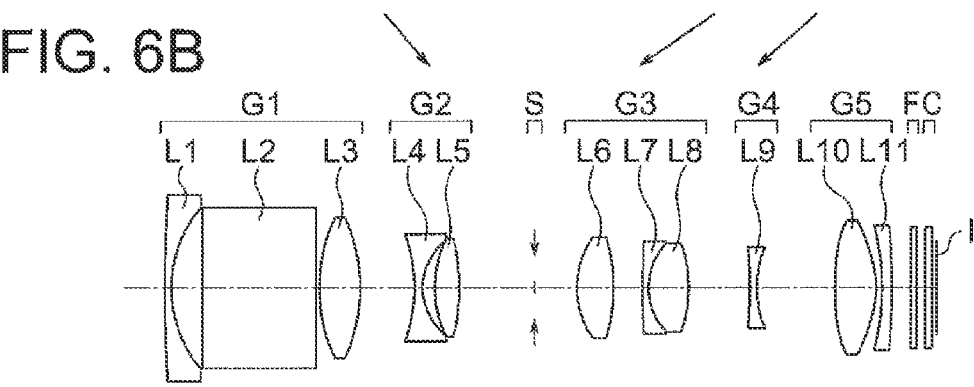
Figure 6C:
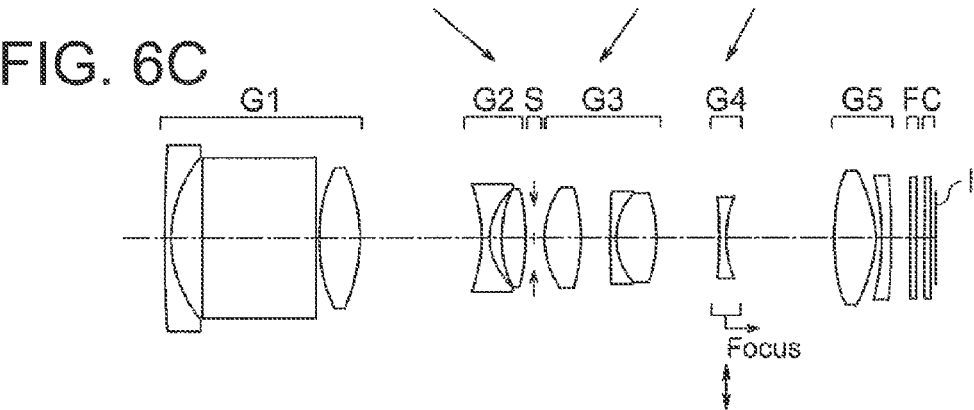

The zoom lens in the example 6, as shown in FIG. 6A, FIG. 6B, and FIG. 6C, includes in order from an object side, a first lens unit G1 (the first positive lens unit) having a positive refractive power, a second lens unit G2 (the first negative lens unit) having a negative refractive power, a third lens unit G3 (the second positive lens unit) having a positive refractive power, fourth lens unit G4 (the second negative lens unit) having a negative refractive power, and a fifth lens unit G5 (the third positive lens unit) having a positive refractive power. An aperture stop (the stop) S is disposed between the second lens unit G2 (the first negative lens unit) and the third lens unit G3 (the second positive lens unit).

The first lens unit G1 includes a negative meniscus lens L1 having a convex surface directed toward the object side, a prism L2, and a biconvex positive lens L3. The second lens unit G2 includes a biconcave negative lens L4 and a biconvex positive lens L5. The third lens unit G3 includes a biconvex positive lens L6, a negative meniscus lens L7 having a convex surface directed toward the object side, and a biconvex positive lens L8. Here, the negative meniscus lens L7 and the biconvex positive lens L8 are cemented. The fourth lens unit G4 includes a biconcave negative lens L9. The fifth lens unit G5 includes a biconvex positive lens L10 and a negative meniscus lens L11 having a convex surface directed toward an image side.

At the time of zooming from a wide angle end to a telephoto end, the first lens unit G1 is fixed (stationary), the second lens unit G2 moves toward the image side, the aperture stop S is fixed (stationary), the third lens unit G3 moves toward the object side, the fourth lens unit G4 moves toward the object side, and the fifth lens unit G5 is fixed (stationary).

An aspheric surface is provided to a total of 12 surfaces namely, both surfaces of the biconvex positive lens L3, both surfaces of the biconcave negative lens L4, both surfaces of the biconvex positive lens L5, both surfaces of the biconvex positive lens L6, both surfaces of the biconcave negative lens L9, and both surfaces of the biconvex positive lens L10.

At the time of focusing from an object at infinity to an object at an extreme close distance, the fourth lens unit G4 moves toward the image side along an optical axis. Moreover, at the time of correcting blur, the fourth lens unit G4 moves in a direction orthogonal to the optical axis.

Figure 7A:
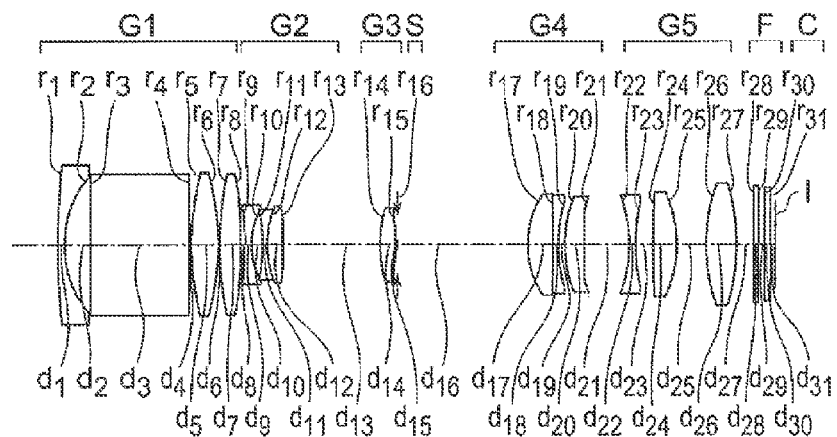
FIG. 7A, FIG. 7B, and FIG. 7C are lens cross-sectional views at a wide angle end (FIG. 7A), in an intermediate focal length state (FIG. 7B), and at a telephoto end (FIG. 7C), at the time of infinite object point focusing of a zoom lens according to an example 7 of the present invention.
Figure 7B:
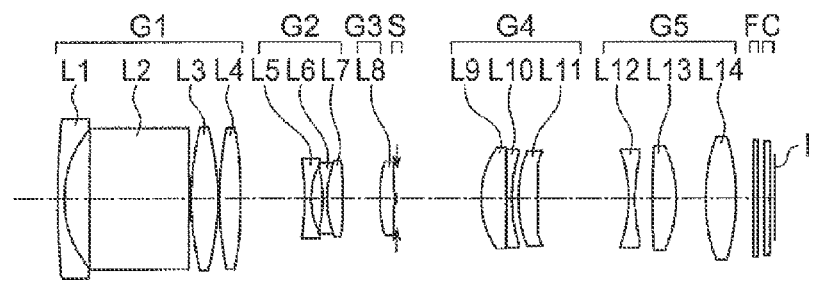
Figure 7C:
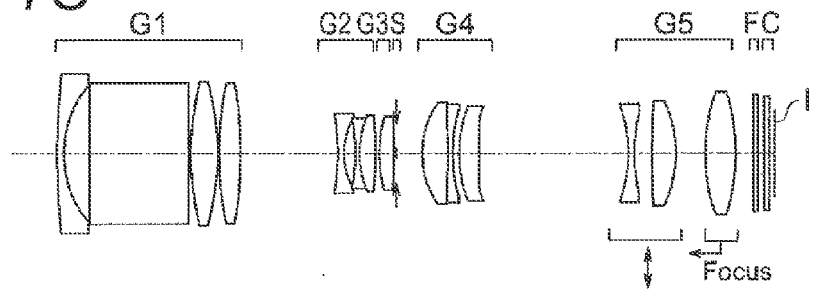

The zoom lens in the example 7, as shown in FIG. 7A, FIG. 7B, and FIG. 7C, includes in order from an object side, a first lens unit G1 (the first positive lens unit) having a positive refractive power, a second lens unit G2 (the first negative lens unit) having a negative refractive power, a third lens unit G3 having a positive refractive power, a fourth lens unit G4 (the second positive lens unit) having a positive refractive power, and a fifth lens unit G5 (the third positive lens unit) having a positive refractive power. An aperture stop (the stop) S is disposed between the second lens unit G2 (the first negative lens unit) and the fourth lens unit G4 (the second positive lens unit).

The first lens unit G1 includes a negative meniscus lens L1 having a convex surface directed toward the object side, a prism L2, a biconvex positive lens L3, and a biconvex positive lens L4. The second lens unit G2 includes a biconcave negative lens L5, a biconcave negative lens L6, and a biconvex positive lens L7. Here, the biconcave negative lens L6 and the biconvex positive lens L7 are cemented. The third lens unit G3 includes a biconvex positive lens L8. The fourth lens unit G4 includes a biconvex positive lens L9, a biconcave negative lens L10, and a biconvex positive lens L11. Here, the biconvex positive lens L9 and the biconcave negative lens L10 are cemented. The fifth lens unit G5 includes a biconcave negative lens L12, a biconvex positive lens L13, and a biconvex positive lens L14.

At the time of zooming from a wide angle end to a telephoto end, the first lens unit G1 is fixed (stationary), the second lens unit G2 moves toward an image side, the third lens unit G3 is fixed (stationary), the aperture stop S is fixed (stationary), the fourth lens unit G4 moves toward the object side, and the fifth lens unit G5 is fixed (stationary).

An aspheric surface is provided to a total of 10 surfaces namely, an object-side surface of the biconvex positive lens L3, an image-side surface of the biconvex positive lens L4, both surfaces of the biconcave negative lens L5, both surfaces of the biconvex positive lens L8, an object-side surface of the biconvex positive lens L9, an image-side surface of the biconvex positive lens L11, an object-side surface of the biconvex positive lens L13, and an image-side surface of the biconvex positive lens L14.

At the time of focusing from an object at infinity to an object at an extreme close distance, the biconvex positive lens L14 in the fifth lens unit G5 moves toward the object side along an optical axis. Moreover, at the time of correcting blur, the biconcave negative lens L12 and the biconvex positive lens L13 in the fifth lens unit G5 move in a direction orthogonal to the optical axis.

Figure 8A:
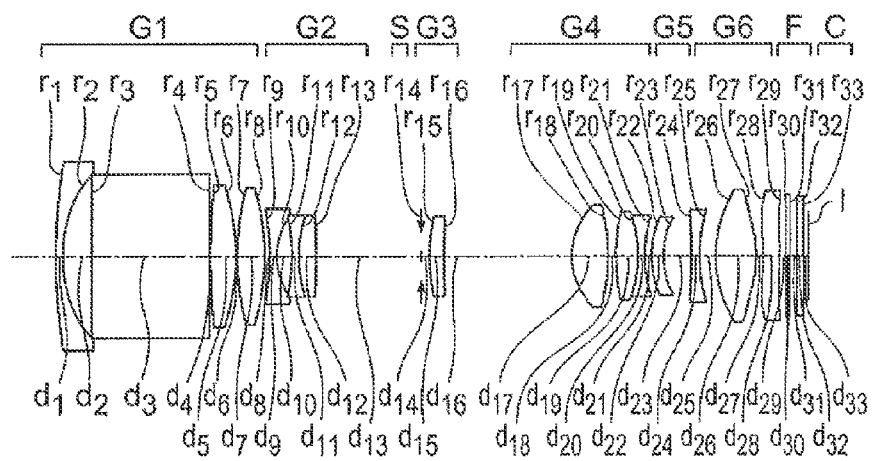
FIG. 8A, FIG. 8B, and FIG. 8C are lens cross-sectional views at a wide angle end (FIG. 8A), in an intermediate focal length state (FIG. 8B), and at a telephoto end (FIG. 8C), at the time of infinite object point focusing of a zoom lens according to an example 8 of the present invention.
Figure 8B:
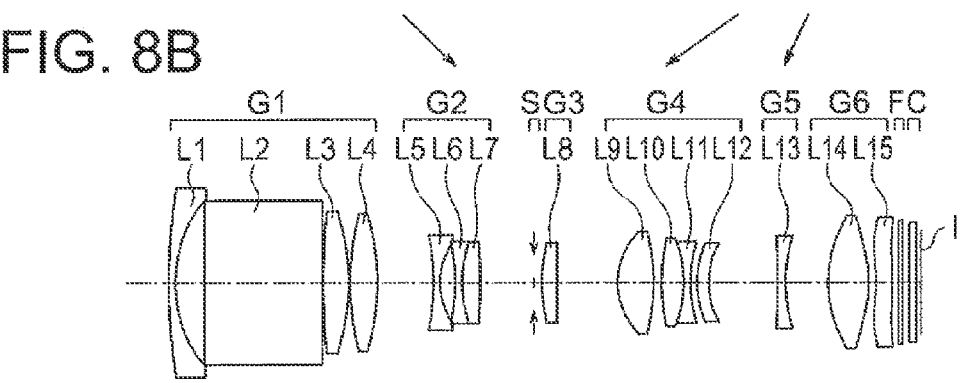
Figure 8C:
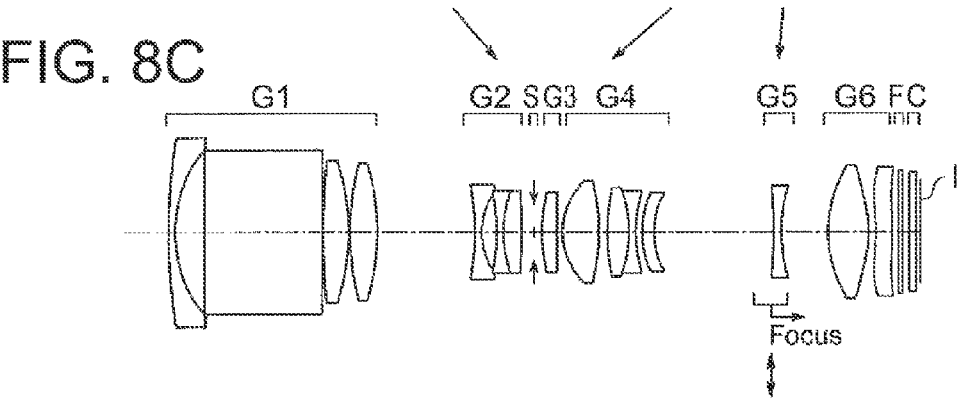
Figures 16A, 16B, 16C, 16D:
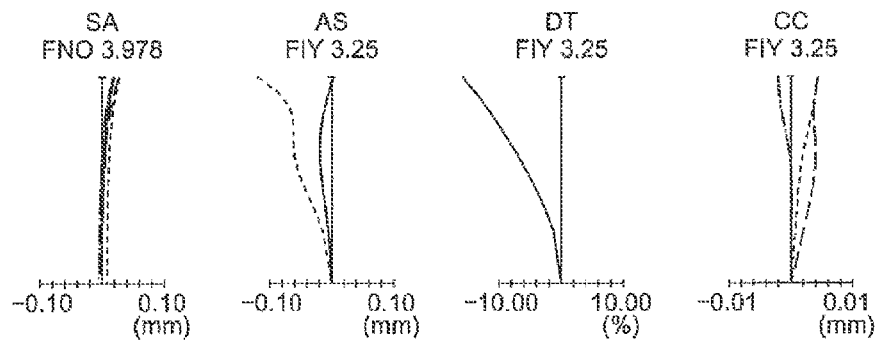
FIG. 16A, FIG. 16B, FIG. 16C, FIG. 16D, FIG. 16E, FIG. 16F, FIG. 16G, FIG. 16H, FIG. 16I, FIG. 16J, and FIG. 16K, and FIG. 16L are aberration diagrams at the time of infinite object point focusing of the example 8.
Figures 16E, 16F, 16G, 16H:
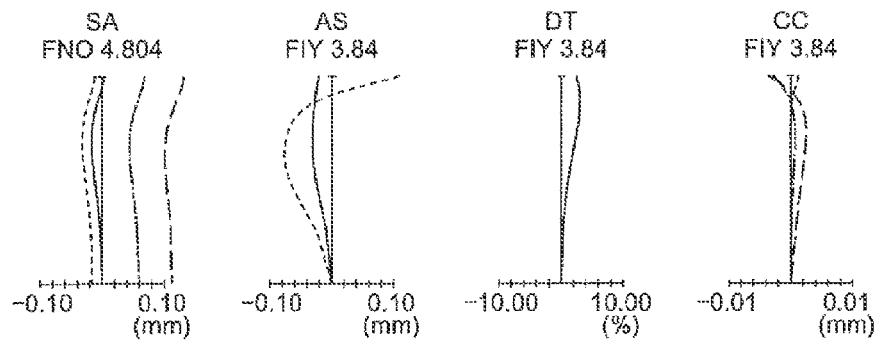
Figures 16I, 16J, 16K, 16L:
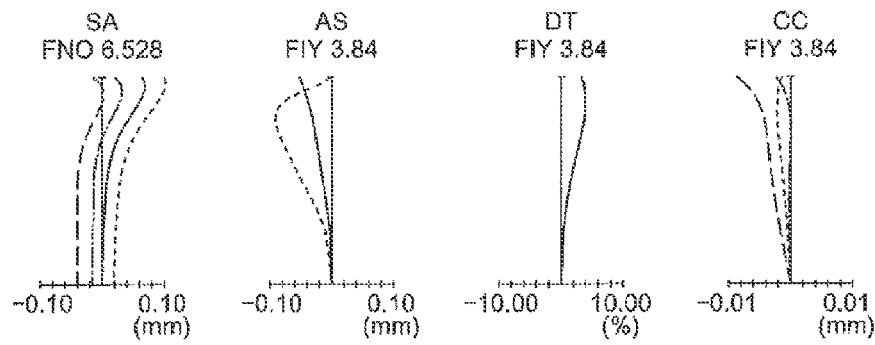

The zoom lens in the example 8, as shown in FIG. 8A, FIG. 8B, and FIG. 8C, includes in order from an object side, a first lens unit G1 (the first positive lens unit) having a positive refractive power, a second lens unit G2 (the first negative lens unit) having a negative refractive power, a third lens unit G3 having a positive refractive power, a fourth lens unit G4 (the second positive lens unit) having a positive refractive power, a fifth lens unit G5 (the second negative lens unit) having a negative refractive power, and a sixth lens unit G6 (the third positive lens unit) having a positive refractive power. An aperture stop (the stop) S is disposed between the second lens unit G2 (the first negative lens unit) and the fourth lens unit G4 (the second positive lens unit).

The first lens unit G1 includes a negative meniscus lens L1 having a convex surface directed toward the object side, a prism. L2, a biconvex positive lens L3, and a biconvex positive lens L4. The second lens unit G2 includes a biconcave negative lens L5, a biconcave negative lens L6, and a biconvex positive lens L7. Here, the biconcave negative lens L6 and the biconvex positive lens L7 are cemented. The third lens unit G3 includes a biconvex positive lens L8. The fourth lens unit G4 includes a biconvex positive lens L9, a biconvex positive lens L10, a biconcave negative lens L11, and a positive meniscus lens L12 having a convex surface directed toward the object side. Here, the biconvex positive lens L10 and the biconcave negative lens L11 are cemented. The fifth lens unit G5 includes a biconcave negative lens L13. The sixth lens unit G6 includes a biconvex positive lens L14 and a negative meniscus lens L15 having a convex surface directed toward an image side.

At the time of zooming from a wide angle end to a telephoto end, the first lens unit G1 is fixed (stationary), the second lens unit G2 moves toward the image side, the aperture stop S is fixed (stationary), the third lens unit G3 is fixed (stationary), the fourth lens unit G4 moves toward the object side, the fifth lens unit G5 moves toward the object side, and the sixth lens unit G6 is fixed (stationary).

An aspheric surface is provided to a total of 15 surfaces namely, an image-side surface of the negative meniscus lens L1, both surfaces of the biconvex positive lens L3, both surfaces of the biconcave negative lens L5, both surfaces of the biconvex positive lens L8, both surfaces of the biconvex positive lens L9, both surfaces of the positive meniscus lens L12, both surfaces of the biconvex positive lens L14, and both surfaces of the negative meniscus lens L15.

At the time of focusing from an object at infinity to an object at an extreme close distance, the biconcave negative lens L13 in the fifth lens unit G5 moves toward the image side along an optical axis. Moreover, at the time of correcting blur, the biconcave negative lens L13 in the fifth lens unit G5 moves in a direction orthogonal to the optical axis.

Numerical data of each example described above is shown below. Apart from symbols described above, r denotes radius of curvature of each lens surface, d denotes a distance between respective lens surfaces, nd denotes a refractive index of each lens for a d-line, vd denotes an Abbe number for each lens and * denotes an aspheric surface. Further, f denotes a focal length of the entire system, FNO. denotes an F number, ω denotes a half angle of view, IH denotes an image height, FB denotes a back focus, Lens total length is a distance from a lens forefront surface up to a lens backmost surface and each of f1, f2 . . . is a focal length of each lens unit. Further, FB (back focus) is a unit which is expressed upon air conversion of a distance from the lens backmost surface to a paraxial image surface. Further, wide denotes a wide angle end, standard denotes an intermediate focal length state, tele denotes a telephoto end.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, in the aspherical surface coefficients, 'e-n' (where, n is an integral number) indicates '$10^{-n}$'. Moreover, these symbols are commonly used in the following numerical data for each example.

Example 1

Unit mm

Surface data

| Surface no. | r | d | nd | νd |
|---|---|---|---|---|
| Object plane | ∞ | ∞ | | |
| 1 | 238.265 | 0.450 | 2.00100 | 29.13 |
| 2 | 9.508 | 2.100 | | |
| 3 | ∞ | 8.200 | 1.92286 | 20.88 |
| 4 | ∞ | 0.200 | | |
| 5* | 10.963 | 3.081 | 1.61881 | 63.85 |
| 6* | −11.397 | Variable | | |
| 7* | −10.792 | 0.550 | 1.74320 | 49.29 |
| 8* | 3.969 | 1.363 | | |
| 9* | 6.263 | 1.448 | 1.63493 | 23.90 |
| 10* | 57.202 | Variable | | |
| 11(stop) | ∞ | Variable | | |
| 12* | 6.607 | 2.538 | 1.49710 | 81.56 |
| 13* | −9.564 | 3.915 | | |
| 14 | 45.669 | 0.400 | 2.00100 | 29.13 |
| 15 | 4.556 | 2.689 | 1.51633 | 64.14 |
| 16 | −9.015 | Variable | | |
| 17* | −18.403 | 0.500 | 1.53071 | 55.69 |
| 18* | 6.294 | Variable | | |
| 19* | 14.650 | 2.800 | 1.53071 | 55.69 |
| 20* | −9.788 | 2.313 | | |
| 21 | ∞ | 0.500 | 1.51633 | 64.14 |
| 22 | ∞ | 0.500 | | |
| 23 | ∞ | 0.500 | 1.51633 | 64.14 |
| 24 | ∞ | 0.370 | | |
| Image plane (Image pickup surface) | ∞ | | | |

Aspherical surface data

5th surface k = 0.0000
A4 = −1.7940e−004, A6 = −2.7777e−006, A8 = 1.8359e−007, A10 = −4.4918e−009

6th surface k = 0.0000
A4 = 1.6063e−004, A6 = −1.7162e−006, A8 = 1.3157e−007, A10 = −3.4031e−009

7th surface k = 0.0000
A4 = 1.3529e−003, A6 = −1.0753e−005, A8 = −5.1649e−006, A10 = 1.9273e−007

8th surface k = 0.0000
A4 = −4.22596e−003, A6 = 3.91276e−004, A8 = −1.83416e−005, A10 = −7.6143e−007

9th surface k = 0.0000
A4 = −4.1562e−003, A6 = 2.0520e−004, A8 = 1.2204e−005, A10 = −5.0493e−007

10th surface k = 0.0000
A4 = −1.8401e−003, A6 = 4.9373e−005, A8 = 5.3126e−006, A10 = 3.1900e−007

12th surface k = 0.0000
A4 = −5.1573e−004, A6 = −7.7361e−006, A8 = −2.1827e−007, A10 = 3.3913e−008

-continued

Unit mm

13th surface k = 0.0000
A4 = 6.8976e−004, A6 = −1.3838e−005, A8 = 2.2019e−007, A10 = 3.1409e−008

17th surface k = 0.0000
A4 = −5.0042e−004, A6 = −9.8884e−005, A8 = 2.8668e−005, A10 = −1.0006e−006

18th surface k = 0.0000
A4 = −1.4882e−004, A6 = −1.6491e−004, A8 = 3.2236e−005, A10 = −1.1164e−006

19th surface k = 0.0000
A4 = 9.7370e−004, A6 = −3.8218e−005, A8 = 2.2176e−006, A10 = −6.0017e−008, A12 = −8.0552e−015

20th surface k = 0.0000
A4 = 1.4500e−003, A6 = −5.2266e−005, A8 = 2.6423e−006, A10 = −7.2667e−008

Zoom data

| | wide | standard | tele |
|---|---|---|---|
| f | 3.830 | 9.801 | 18.385 |
| FNO. | 4.140 | 4.944 | 6.229 |
| 2ω | 90.7 | 42.0 | 23.1 |
| IH | 3.28 | 3.86 | 3.86 |
| FB | 3.8421 | 3.8420 | 3.8420 |
| Lens total length | 53.5593 | 53.5592 | 53.5592 |
| d6 | 0.500 | 4.183 | 7.147 |
| d10 | 7.647 | 3.964 | 1.000 |
| d11 | 8.711 | 3.252 | 0.900 |
| d16 | 1.535 | 3.011 | 4.212 |
| d18 | 1.090 | 5.073 | 6.223 |

Unit focal length f1 = 11.9329   f2 = −7.29442   f3 = 9.81604   f4 = −8.77606
f5 = 11.5138

Example 2

Unit mm

Surface data

| Surface no. | r | d | nd | νd |
|---|---|---|---|---|
| Object plane | ∞ | ∞ | | |
| 1 | 299.953 | 0.450 | 2.00100 | 29.13 |
| 2 | 9.356 | 2.100 | | |
| 3 | ∞ | 8.200 | 1.92286 | 20.88 |
| 4 | ∞ | 0.200 | | |
| 5* | 11.797 | 3.038 | 1.61881 | 63.85 |
| 6* | −11.055 | Variable | | |
| 7* | −16.484 | 0.550 | 1.80610 | 40.88 |
| 8* | 4.847 | 1.897 | | |
| 9* | 7.817 | 1.021 | 2.10205 | 16.77 |
| 10* | 13.465 | Variable | | |
| 11(stop) | ∞ | Variable | | |
| 12* | 6.252 | 2.635 | 1.49710 | 81.56 |
| 13* | −9.244 | 3.869 | | |
| 14 | 67.469 | 0.400 | 2.00100 | 29.13 |
| 15 | 4.556 | 2.616 | 1.49700 | 81.54 |
| 16 | −10.060 | Variable | | |
| 17* | −7.978 | 0.500 | 1.53071 | 55.69 |

-continued

| Unit mm | | | | |
|---|---|---|---|---|
| 18* | 14.265 | Variable | | |
| 19* | 17.022 | 2.800 | 1.53071 | 55.69 |
| 20* | −8.363 | 2.237 | | |
| 21 | ∞ | 0.500 | 1.51633 | 64.14 |
| 22 | ∞ | 0.500 | | |
| 23 | ∞ | 0.500 | 1.51633 | 64.14 |
| 24 | ∞ | 0.370 | | |
| Image plane (Image pickup surface) | ∞ | | | |

Aspherical surface data

5th surface k = 0.0000
A4 = −1.1930e−004, A6 = −6.4148e−006, A8 = 3.4300e−007,
A10 = −7.1474e−009
6th surface k = 0.0000
A4 = 1.8562e−004, A6 = −5.0887e−006, A8 = 2.8382e−007,
A10 = −5.9523e−009
7th surface k = 0.0000
A4 = −1.2476e−004, A6 = 4.1414e−005, A8 = −2.6727e−006,
A10 = 2.6974e−008
8th surface k = 0.0000
A4 = −2.5315e−003, A6 = 1.1490e−004, A8 = 2.9216e−006,
A10 = −6.3305e−007
9th surface k = 0.0000
A4 = −1.8058e−003, A6 = 6.5818e−005, A8 = 4.9540e−006,
A10 = −5.6048e−009
10th surface k = 0.0000
A4 = −1.3992e−003, A6 = 7.2022e−005, A8 = 8.5678e−007,
A10 = 3.4596e−007
12th surface k = 0.0000
A4 = −6.2311e−004, A6 = 1.3964e−005, A8 = −2.7245e−006,
A10 = 1.4025e−007
13th surface k = 0.0000
A4 = 7.3328e−004, A6 = 1.0499e−005, A8 = −2.5966e−006,
A10 = 1.5771e−007
17th surface k = 0.0000
A4 = 9.7391e−003, A6 = −1.5415e−003, A8 = 1.3351e−004,
A10 = −3.9845e−006
18th surface k = 0.0000
A4 = 1.0258e−002, A6 = −1.5018e−003, A8 = 1.2555e−004,
A10 = −3.5394e−006
19th surface k = 0.0000
A4 = 1.2664e−003, A6 = −7.6580e−005, A8 = 2.8783e−006,
A10 = −5.5512e−008, A12 = 2.4683e−012
20th surface k = 0.0000
A4 = 2.1200e−003, A6 = −1.1507e−004, A8 = 3.7223e−006,
A10 = −6.4000e−008

-continued

| Unit mm | | | |
|---|---|---|---|
| Zoom data | | | |
| | wide | standard | tele |
| f | 3.831 | 9.803 | 18.394 |
| FNO. | 4.122 | 4.893 | 6.346 |
| 2ω | 90.4 | 41.7 | 22.8 |
| IH | 3.26 | 3.86 | 3.86 |
| FB | 3.7667 | 3.7665 | 3.7665 |
| Lens total length | 53.5595 | 53.5595 | 53.5595 |
| d6 | 0.501 | 4.366 | 7.238 |
| d10 | 7.743 | 3.878 | 1.007 |
| d11 | 8.798 | 3.478 | 0.899 |
| d16 | 1.369 | 3.204 | 5.264 |
| d18 | 1.107 | 4.592 | 5.110 |

Unit focal length f1 = 12.4801  f2 = −7.46804  f3 = 9.80107  f4 = −9.56653
f5 = 10.987

Example 3

| Unit mm | | | | |
|---|---|---|---|---|
| Surface data | | | | |
| Surface no. | r | d | nd | νd |
| Object plane | ∞ | ∞ | | |
| 1 | 190.460 | 0.450 | 2.00100 | 29.13 |
| 2 | 8.379 | 1.900 | | |
| 3 | ∞ | 7.900 | 1.94595 | 17.98 |
| 4 | ∞ | 0.200 | | |
| 5* | 9.828 | 2.886 | 1.58313 | 59.38 |
| 6* | −10.033 | Variable | | |
| 7* | −16.164 | 0.400 | 1.74320 | 49.29 |
| 8* | 5.018 | 1.542 | | |
| 9* | −17.989 | 0.483 | 1.53071 | 55.69 |
| 10* | 18.009 | 0.200 | | |
| 11* | 6.277 | 1.226 | 1.63493 | 23.90 |
| 12* | 80.645 | Variable | | |
| 13(stop) | ∞ | Variable | | |
| 14* | 6.088 | 2.830 | 1.49710 | 81.56 |
| 15* | −9.916 | 3.226 | | |
| 16 | 30.013 | 0.500 | 1.90366 | 31.32 |
| 17 | 3.933 | 3.400 | 1.49700 | 81.54 |
| 18 | −36.701 | Variable | | |
| 19* | −17.559 | 0.400 | 1.53071 | 55.69 |
| 20* | 8.309 | Variable | | |
| 21* | 17.501 | 3.000 | 1.53071 | 55.69 |
| 22* | −7.269 | 3.003 | | |
| 23 | ∞ | 0.300 | 1.51633 | 64.14 |
| 24 | ∞ | 0.400 | | |
| 25 | ∞ | 0.500 | 1.51633 | 64.14 |
| 26 | ∞ | 0.530 | | |
| Image plane (Image pickup surface) | ∞ | | | |

Aspherical surface data

5th surface k = 0.0000
A4 = −1.2123e−004, A6 = −6.8048e−006, A8 = 1.9457e−007,
A10 = −4.0043e−009
6th surface k = 0.0000
A4 = 3.6670e−004, A6 = −8.1296e−006, A8 = 2.6975e−007,
A10 = −4.6144e−009

-continued

Unit mm

7th surface k = 0.0000
A4 = 1.3789e−003, A6 = 1.7579e−007, A8 = −6.7173e−006,
A10 = 1.8000e−007
8th surface k = 0.0000
A4 = −1.7838e−003, A6 = 2.4973e−004, A8 = −1.6627e−005,
A10 = 5.0074e−008
9th surface k = 0.0000
A4 = −1.6709e−003, A6 = 1.2859e−005, A8 = −9.3211e−007
10th surface k = 0.0000
A4 = −6.7041e−004, A6 = −6.5615e−005, A8 = −2.5436e−006
11th surface k = 0.0000
A4 = −2.69916−003, A6 = 2.4784e−005, A8 = 1.0510e−005,
A10 = −2.4627e−007
12th surface k = 0.0000
A4 = −1.13396−003, A6 = 1.42426−005, A8 = 9.1705e−006,
A10 = −2.5261e−008
14th surface k = 0.0000
A4 = −5.2274e−004, A6 = −7.1323e−007, A8 = −2.6647e−007,
A10 = 3.2462e−009
15th surface k = 0.0000
A4 = 7.7316e−004, A6 = −3.6103e−006, A8 = 4.5740e−010,
A10 = 5.2043e−009
19th surface k = 0.0000
A4 = 1.2767e−003, A6 = −2.7655e−004, A8 = 6.7035e−006,
A10 = 0.0000e+000
20th surface k = 0.0000
A4 = 1.3011e−003, A6 = −2.8551e−004, A8 = 9.5511e−006,
A10 = 0.0000e+000
21st surface k = 0.0000
A4 = 1.1570e−003, A6 = 1.2959e−006, A8 = −1.5301e−006,
A10 = 4.2199e−008, A12 = −7.8798e−010
22nd surface k = 0.0000
A4 = 2.2000e−003, A6 = −1.8821e−005, A8 = −6.4461e−007

Zoom data

|  | wide | standard | tele |
|---|---|---|---|
| f | 3.830 | 9.800 | 18.380 |
| FNO. | 4.182 | 4.707 | 6.329 |
| 2ω | 93.3 | 42.0 | 22.8 |
| IH | 3.39 | 3.86 | 3.86 |
| FB | 4.4610 | 4.4609 | 4.4609 |
| Lens total length | 54.8558 | 54.8558 | 54.8557 |
| d6 | 0.500 | 4.540 | 6.951 |
| d12 | 7.451 | 3.411 | 1.000 |
| d13 | 8.927 | 3.911 | 0.900 |
| d18 | 1.371 | 4.282 | 7.505 |
| d20 | 1.604 | 3.709 | 3.496 |

-continued

Unit mm

Unit focal length f1 = 11.4729   f2 = −7.06543   f3 = 10.2314   f4 = −10.5708
f5 = 10.1009

Example 4

Unit mm

Surface data

| Surface no. | r | d | nd | vd |
|---|---|---|---|---|
| Object plane | ∞ | ∞ | | |
| 1 | 122.224 | 0.400 | 2.00170 | 20.60 |
| 2 | 8.624 | 2.026 | | |
| 3 | ∞ | 7.900 | 1.92286 | 20.88 |
| 4 | ∞ | 0.200 | | |
| 5* | 11.550 | 2.592 | 1.74320 | 49.29 |
| 6* | −12.367 | Variable | | |
| 7* | −9.751 | 0.500 | 1.80610 | 40.88 |
| 8* | 4.956 | 1.327 | | |
| 9 | 11.679 | 2.000 | 1.84666 | 23.78 |
| 10 | −8.453 | 0.705 | | |
| 11 | −5.529 | 0.400 | 1.91082 | 35.25 |
| 12 | −16.191 | Variable | | |
| 13(stop) | ∞ | Variable | | |
| 14* | 6.075 | 2.979 | 1.49710 | 81.56 |
| 15* | −8.479 | 3.491 | | |
| 16 | 236.566 | 0.400 | 2.00100 | 29.13 |
| 17 | 4.428 | 2.527 | 1.49710 | 81.56 |
| 18* | −11.299 | Variable | | |
| 19* | −13.668 | 0.600 | 1.53071 | 55.69 |
| 20* | 9.455 | Variable | | |
| 21* | 12.474 | 3.409 | 1.53071 | 55.69 |
| 22* | −7.809 | 1.884 | | |
| 23 | ∞ | 0.500 | 1.51633 | 64.14 |
| 24 | ∞ | 0.500 | | |
| 25 | ∞ | 0.500 | 1.51633 | 64.14 |
| 26 | ∞ | 0.370 | | |
| Image plane (Image pickup surface) | ∞ | | | |

Aspherical surface data

5th surface k = 0.0000
A4 = −1.5228e−004, A6 = −8.8357e−007, A8 = 7.4493e−008,
A10 = −4.5899e−009, A12 = −1.0472e−020
6th surface k = 0.0000
A4 = 1.6162e−004, A6 = −1.0807e−006, A8 = 4.9184e−008,
A10 = −3.4588e−009, A12 = 1.1864e−020
7th surface k = 0.0000
A4 = 2.4991e−004, A6 = 3.1939e−005, A8 = −2.1248e−006,
A10 = 1.21836-008, A12 = −4.7889e−021
8th surface k = 0.5329
A4 = −3.0224e−003, A6 = −4.4638e−006, A8 = −2.8568e−006,
A10 = −3.7233e−007, A12 = −3.8813e−021
14th surface k = 0.0000
A4 = −5.7955e−004, A6 = −1.3733e−005, A8 = 6.9906e−007,
A10 = −6.3412e−008

-continued

| Unit mm |
|---|

15th surface k = 0.0000
A4 = 9.9957e−004, A6 = −1.6767e−005, A8 = 5.5567e−007,
A10 = −4.7156e−008
18th surface k = 0.0000
A4 = −5.1917e−004, A6 = 2.7281e−005, A8 = −6.3840e−007,
A10 = −2.3625e−008
19th surface k = 0.0000
A4 = −5.9562e−004, A6 = 6.4084e−004, A8 = −8.2563e−005,
A10 = 2.3558e−006, A12 = −1.3765e−022
20th surface k = 0.0000
A4 = −4.9051e−004, A6 = 6.6459e−004, A8 = −8.3212e−005,
A10 = 2.7646e−006, A12 = −7.1137e−023
21st surface k = 0.0000
A4 = 1.3635e−003, A6 = −7.8212e−005, A8 = 1.5954e−006,
A10 = −1.3449e−008, A12 = 4.4192e−012
22nd surface k = 0.0000
A4 = 3.7006e−003, A6 = −2.1949e−004, A8 = 5.5607e−006,
A10 = −5.1000e−008

| Zoom data | | | |
|---|---|---|---|
| | wide | standard | tele |
| f | 3.830 | 10.000 | 18.385 |
| FNO. | 3.978 | 4.500 | 6.528 |
| 2ω | 90.5 | 40.6 | 22.8 |
| IH | 3.30 | 3.86 | 3.86 |
| FB | 3.4138 | 3.4138 | 3.4135 |
| Lens total length | 53.6597 | 53.6596 | 53.6593 |
| d6 | 0.500 | 4.125 | 5.563 |
| d12 | 5.963 | 2.338 | 0.900 |
| d13 | 9.179 | 4.665 | 1.000 |
| d18 | 2.000 | 4.267 | 7.370 |
| d20 | 1.149 | 3.396 | 3.958 |

| Unit focal length | | | |
|---|---|---|---|
| f1 = 9.86365 | f2 = −6.22941 | f3 = 9.90337 | f4 = −10.4369 |
| f5 = 9.60956 | | | |

Example 5

| Unit mm | | | | |
|---|---|---|---|---|
| Surface data | | | | |
| Surface no. | r | d | nd | vd |
| Object plane | ∞ | ∞ | | |
| 1 | 54.422 | 0.500 | 2.00069 | 25.46 |
| 2 | 8.593 | 2.000 | | |
| 3 | ∞ | 7.600 | 2.00100 | 29.13 |
| 4 | ∞ | 0.100 | | |
| 5* | 19.691 | 2.020 | 1.61881 | 63.85 |
| 6 | −20.769 | 0.100 | | |
| 7 | 25.631 | 1.648 | 1.72903 | 54.04 |
| 8* | −36.266 | Variable | | |
| 9* | −16.964 | 0.500 | 1.88202 | 37.22 |
| 10* | 5.451 | 0.822 | | |
| 11 | −15.802 | 0.400 | 1.91082 | 35.25 |
| 12 | 8.428 | 1.199 | 1.94595 | 17.98 |

-continued

| Unit mm | | | | |
|---|---|---|---|---|
| 13 | −27.327 | Variable | | |
| 14* | 10.662 | 1.120 | 1.59201 | 67.02 |
| 15* | −32.557 | 0.200 | | |
| 16(stop) | ∞ | Variable | | |
| 17* | 7.135 | 1.970 | 1.72903 | 54.04 |
| 18 | −77.858 | 0.400 | 1.84666 | 23.78 |
| 19 | 12.710 | 0.500 | | |
| 20 | 10.154 | 1.500 | 1.49700 | 81.61 |
| 21* | −163.820 | Variable | | |
| 22 | −12.802 | 0.500 | 2.00330 | 28.27 |
| 23 | 11.284 | 0.906 | | |
| 24* | 17.205 | 1.705 | 1.52559 | 56.46 |
| 25 | −13.447 | 2.300 | | |
| 26 | 13.106 | 2.370 | 1.51633 | 64.14 |
| 27* | −16.204 | 1.400 | | |
| 28 | ∞ | 0.300 | 1.51633 | 64.14 |
| 29 | ∞ | 0.500 | | |
| 30 | ∞ | 0.500 | 1.51633 | 64.14 |
| 31 | ∞ | 0.340 | | |
| Image plane (Image pickup surface) | ∞ | | | |

| Aspherical surface data |
|---|

5th surface k = 0.0000
A4 = −1.0414e−004, A6 = 4.2873e−008, A8 = 4.3869e−008,
A10 = −3.3516e−010
8th surface k = 0.0000
A4 = −9.0184e−005, A6 = 8.8348e−007, A8 = 4.8897e−009,
A10 = 2.3327e−010
9th surface k = 0.0000
A4 = 2.8625e−004, A6 = −2.0960e−005, A8 = 2.1030e−006,
A10 = −4.2917e−008
10th surface k = 0.0000
A4 = −7.8789e−004, A6 = −5.8896e−005, A8 = 7.2081e−006,
A10 = −2.9409e−007
14th surface k = 0.0000
A4 = −3.3808e−005, A6 = −8.6158e−005, A8 = 1.6278e−005,
A10 = −1.0033e−006
15th surface k = 0.0000
A4 = 1.9302e−004, A6 = −8.2796e−005, A8 = 1.5729e−005,
A10 = −1.0027e−006
17th surface k = 0.0000
A4 = 1.6857e−004, A6 = 3.6653e−006, A8 = 3.6076e−007,
A10 = 2.7391e−010
21st surface k = 0.0000
A4 = 1.3951e−003, A6 = 3.0788e−005, A8 = −1.2324e−007,
A10 = 1.4999e−007
24th surface k = 0.0000
A4 = −2.9042e−004, A6 = −7.2332e−006, A8 = −8.0015e−007,
A10 = 3.8664e−008
27th surface k = 0.0000
A4 = 4.1414e−004, A6 = −1.6985e−005, A8 = −3.7638e−007,
A10 = 9.8110e−009

-continued

| Unit mm | | |
|---|---|---|
| Zoom data | | |
| | wide | standard | tele |
| f | 4.004 | 8.776 | 19.235 |
| FNO. | 3.802 | 4.168 | 5.801 |
| 2ω | 88.1 | 46.9 | 21.8 |
| IH | 3.30 | 3.86 | 3.86 |
| FB | 2.7675 | 2.7670 | 2.7656 |
| Lens total length | 54.5274 | 54.5270 | 54.5257 |
| d8 | 0.335 | 5.176 | 7.625 |
| d13 | 7.590 | 2.750 | 0.300 |
| d16 | 10.487 | 6.874 | 2.000 |
| d21 | 2.986 | 6.599 | 11.473 |

Unit focal length f1 = 12.7093   f2 = −4.34336   f3 = 13.6989   f4 = 11.5141
f5 = 36.8947

Example 6

| Unit mm | | | | |
|---|---|---|---|---|
| Surface data | | | | |
| Surface no. | r | d | nd | vd |
| Object plane | ∞ | ∞ | | |
| 1 | 117.473 | 0.450 | 2.00069 | 25.46 |
| 2 | 9.320 | 2.200 | | |
| 3 | ∞ | 8.200 | 1.92286 | 20.88 |
| 4 | ∞ | 0.200 | | |
| 5* | 10.695 | 2.970 | 1.61881 | 63.85 |
| 6* | −11.446 | Variable | | |
| 7* | −10.644 | 0.550 | 1.75501 | 51.16 |
| 8* | 3.633 | 0.922 | | |
| 9* | 6.947 | 1.693 | 1.63493 | 23.90 |
| 10* | −47.491 | Variable | | |
| 11(stop) | ∞ | Variable | | |
| 12* | 5.812 | 2.634 | 1.49710 | 81.56 |
| 13* | −10.800 | 2.129 | | |
| 14 | 76.902 | 0.400 | 1.88300 | 40.76 |
| 15 | 4.556 | 2.914 | 1.49700 | 81.61 |
| 16 | −9.015 | Variable | | |
| 17* | −23.315 | 0.500 | 1.83441 | 37.28 |
| 18* | 9.144 | Variable | | |
| 19* | 30.760 | 2.997 | 1.53071 | 55.69 |
| 20* | −6.197 | 0.400 | | |
| 21 | −18.000 | 0.700 | 1.94595 | 17.98 |
| 22 | −44.062 | 1.378 | | |
| 23 | ∞ | 0.500 | 1.51633 | 64.14 |
| 24 | ∞ | 0.500 | | |
| 25 | ∞ | 0.500 | 1.51633 | 64.14 |
| 26 | ∞ | 0.370 | | |
| Image plane (Image pickup surface) | ∞ | | | |

Aspherical surface data

5th surface k = 0.0000
A4 = −1.7949e−004, A6 = −2.3810e−006, A8 = 9.4545e−008,
A10 = −1.7142e−009

6th surface k = 0.0000
A4 = 1.7739e−004, A6 = −2.1285e−006, A8 = 9.6717e−008,
A10 = −1.5927e−009

-continued

| Unit mm |
|---|

7th surface k = 0.0000
A4 = −3.2747e−004, A6 = 2.1026e−004, A8 = −1.8754e−005,
A10 = 4.9287e−007

8th surface k = 0.0000
A4 = −6.2319e−003, A6 = 2.2049e−004, A8 = 2.3247e−005,
A10 = −3.2134e−006

9th surface k = 0.0000
A4 = −3.6001e−003, A6 = −1.3364e−004, A8 = 3.8108e−005,
A10 = −9.4058e−007

10th surface k = 0.0000
A4 = −1.5782e−003, A6 = −1.0797e−004, A8 = 6.8834e−006,
A10 = 4.4505e−008

12th surface k = 0.0000
A4 = −5.8267e−004, A6 = −3.6553e−006, A8 = −1.1809e−006,
A10 = 5.0980e−008

13th surface k = 0.0000
A4 = 7.8329e−004, A6 = −8.7977e−006, A8 = −7.6279e−007,
A10 = 5.9016e−008

17th surface k = 0.0000
A4 = 1.3864e−003, A6 = −5.1010e−004, A8 = 4.4734e−005

18th surface k = 0.0000
A4 = 2.1483e−003, A6 = −5.2642e−004, A8 = 4.6063e−005

19th surface k = 0.0000
A4 = 9.5064e−004, A6 = −2.0628e−005, A8 = 2.5883e−006,
A10 = −8.7695e−008

20th surface k = 0.0000
A4 = 2.3070e−003, A6 = −8.7741e−005, A8 = 6.6826e−006,
A10 = −1.7500e−007

| Zoom data | | |
|---|---|---|
| | wide | standard | tele |
| f | 3.830 | 10.060 | 25.739 |
| FNO. | 4.116 | 4.964 | 6.253 |
| 2ω | 90.5 | 40.8 | 16.6 |
| IH | 3.28 | 3.86 | 3.86 |
| FB | 2.9072 | 2.9068 | 2.9042 |
| Lens total length | 55.1576 | 55.1572 | 55.1546 |
| d6 | 0.500 | 3.918 | 8.700 |
| d10 | 8.900 | 5.482 | 0.700 |
| d11 | 8.650 | 3.037 | 0.700 |
| d16 | 3.284 | 4.370 | 4.547 |
| d18 | 1.058 | 5.584 | 7.745 |

Unit focal length f1 = 11.5037   f2 = −6.82253   f3 = 9.44836   f4 = −7.81657
f5 = 14.1217

Example 7

| Unit mm | | | | |
|---|---|---|---|---|
| Surface data | | | | |
| Surface no. | r | d | nd | vd |
| Object plane | ∞ | ∞ | | |
| 1 | 51.974 | 0.500 | 2.00069 | 25.46 |
| 2 | 8.715 | 1.889 | | |
| 3 | ∞ | 7.600 | 2.00100 | 29.13 |
| 4 | ∞ | 0.100 | | |
| 5* | 18.943 | 2.021 | 1.61881 | 63.85 |
| 6 | −24.261 | 0.100 | | |
| 7 | 24.076 | 1.741 | 1.72903 | 54.04 |
| 8* | −30.540 | Variable | | |
| 9* | −13.970 | 0.500 | 1.88202 | 37.22 |
| 10* | 6.000 | 0.766 | | |
| 11 | −12.404 | 0.400 | 1.91082 | 35.25 |
| 12 | 9.891 | 1.176 | 1.94595 | 17.98 |
| 13 | −20.677 | Variable | | |
| 14* | 11.671 | 1.133 | 1.59201 | 67.02 |
| 15* | −26.983 | 0.200 | | |
| 16(stop) | ∞ | Variable | | |
| 17* | 7.202 | 1.947 | 1.72903 | 54.04 |
| 18 | −149.117 | 0.400 | 1.84666 | 23.78 |
| 19 | 12.340 | 0.500 | | |
| 20 | 10.346 | 1.500 | 1.49700 | 81.61 |
| 21* | −160.930 | Variable | | |
| 22 | −11.662 | 0.500 | 2.00330 | 28.27 |
| 23 | 13.896 | 1.401 | | |
| 24* | 45.174 | 1.779 | 1.52559 | 56.46 |
| 25 | −9.670 | 2.300 | | |
| 26 | 14.908 | 2.278 | 1.51633 | 64.14 |
| 27* | −17.442 | 1.400 | | |
| 28 | ∞ | 0.300 | 1.51633 | 64.14 |
| 29 | ∞ | 0.500 | | |
| 30 | ∞ | 0.500 | 1.51633 | 64.14 |
| 31 | ∞ | 0.340 | | |
| Image plane (Image pickup surface) | ∞ | | | |

Aspherical surface data

5th surface k = 0.0000
A4 = −6.0732e−005, A6 = 1.1830e−007, A8 = 4.6125e−008,
A10 = −3.2493e−010

8th surface k = 0.0000
A4 = −3.8247e−005, A6 = 6.5393e−007, A8 = 2.0848e−008,
A10 = 4.6391e−011

9th surface k = 0.0000
A4 = 2.1874e−004, A6 = −1.6383e−005, A8 = 1.2370e−006,
A10 = 4.0204e−008

10th surface k = 0.0000
A4 = −7.0155e−004, A6 = −3.9893e−005, A8 = 2.4528e−006,
A10 = 1.7584e−007

14th surface k = 0.0000
A4 = 7.2264e−005, A6 = −7.7639e−005, A8 = 1.3825e−005,
A10 = −8.1474e−007

15th surface k = 0.0000
A4 = 2.6138e−004, A6 = −7.4701e−005, A8 = 1.3628e−005,
A10 = −8.2796e−007

17th surface k = 0.0000
A4 = 1.9170e−004, A6 = 4.1483e−006, A8 = 3.0040e−007,
A10 = 4.3650e−009

21st surface k = 0.0000
A4 = 1.4060e−003, A6 = 3.5662e−005, A8 = −9.3980e−007,
A10 = 2.0156e−007

24th surface k = 0.0000
A4 = −1.3448e−004, A6 = −3.1280e−005, A8 = 1.9014e−006,
A10 = −6.3030e−008

27th surface k = 0.0000
A4 = 3.9939e−004, A6 = −2.6108e−005, A8 = 1.8907e−007

| Zoom data | | | |
|---|---|---|---|
| | wide | standard | tele |
| f | 4.368 | 9.574 | 20.984 |
| FNO. | 3.866 | 4.294 | 5.800 |
| 2ω | 86.1 | 43.2 | 20.0 |
| IH | 3.44 | 3.86 | 3.86 |
| FB | 2.7675 | 2.7671 | 2.7660 |
| Lens total length | 54.7275 | 54.7272 | 54.7260 |
| d8 | 0.359 | 4.969 | 7.522 |
| d13 | 7.463 | 2.853 | 0.300 |
| d16 | 10.000 | 6.507 | 2.000 |
| d21 | 3.407 | 6.900 | 11.407 |

| Unit focal length | | | |
|---|---|---|---|
| f1 = 12.21 | f2 = −4.35086 | f3 = 13.9138 | f4 = 11.8901 |
| f5 = 30.1073 | | | |

Example 8

| Unit mm | | | | |
|---|---|---|---|---|
| Surface data | | | | |
| Surface no. | r | d | nd | vd |
| Object plane | ∞ | ∞ | | |
| 1 | 44.255 | 0.500 | 2.01960 | 21.45 |
| 2* | 11.124 | 2.100 | | |
| 3 | ∞ | 8.700 | 2.00100 | 29.13 |
| 4 | ∞ | 0.100 | | |
| 5* | 68.309 | 1.887 | 1.49700 | 81.61 |
| 6* | −15.912 | 0.100 | | |
| 7 | 20.738 | 2.011 | 1.66672 | 48.32 |
| 8 | −17.957 | Variable | | |
| 9* | −15.952 | 0.500 | 1.80610 | 40.92 |
| 10* | 5.021 | 1.119 | | |
| 11 | −14.083 | 0.500 | 1.75700 | 47.82 |
| 12 | 9.445 | 1.304 | 1.92286 | 18.90 |
| 13 | −50.130 | Variable | | |
| 14(stop) | ∞ | 0.600 | | |
| 15* | 10.821 | 1.100 | 1.69350 | 53.21 |
| 16* | 58.207 | Variable | | |
| 17* | 5.057 | 2.692 | 1.49700 | 81.61 |
| 18* | −13.956 | 0.596 | | |
| 19 | 15.180 | 1.621 | 1.49700 | 81.61 |
| 20 | −9.196 | 0.500 | 2.00100 | 29.13 |
| 21 | 9.874 | 0.500 | | |
| 22* | 7.087 | 0.897 | 1.80610 | 40.92 |
| 23* | 7.687 | Variable | | |
| 24 | −56.204 | 0.600 | 1.85400 | 40.39 |

-continued

Unit mm

| | | | | |
|---|---|---|---|---|
| 25 | 11.919 | Variable | | |
| 26* | 8.501 | 3.000 | 1.52542 | 55.78 |
| 27* | −8.341 | 0.501 | | |
| 28* | −17.648 | 1.200 | 1.52542 | 55.78 |
| 29* | −46.515 | 0.503 | | |
| 30 | ∞ | 0.300 | 1.51633 | 64.14 |
| 31 | ∞ | 0.500 | | |
| 32 | ∞ | 0.500 | 1.51633 | 64.14 |
| 33 | ∞ | 0.340 | | |
| Image plane (Image pickup surface) | ∞ | | | |

Aspherical surface data

2nd surface k = −5.6167
A4 = 6.1272e−004, A6 = −4.3248e−006, A8 = 6.4816e−008,
A10 = 4.8246e−010, A12 = 2.3001e−012

5th surface k = 0.0000
A4 = 9.5417e−006, A6 = 1.9207e−006, A8 = −2.2134e−007,
A10 = 6.4215e−009

6th surface k = 0.0000
A4 = 9.2147e−005, A6 = 1.4110e−006, A8 = −1.8628e−007,
A10 = 5.4837e−009

9th surface k = 0.0000
A4 = 4.8001e−004, A6 = 3.4290e−005, A8 = −4.4099e−006,
A10 = 9.2819e−008

10th surface k = 0.0000
A4 = −8.6735e−004, A6 = 5.0386e−005, A8 = −5.5413e−006,
A10 = −4.4436e−007

15th surface k = −3.2013
A4 = −1.3000e−004, A6 = −1.6000e−005, A8 = −5.0023e−006,
A10 = 1.2000e−007

16th surface k = 0.0000
A4 = −2.7078e−004, A6 = −2.3671e−005, A8 = −3.2807e−006,
A10 = 1.0596e−008

17th surface k = −0.7336
A4 = 2.6724e−004, A6 = −6.1446e−006, A8 = 1.7917e−006,
A10 = −4.1315e−008

18th surface k = 0.0000
A4 = −2.0113e−004, A6 = 5.4985e−005, A8 = −1.0602e−006,
A10 = −2.8781e−008

22nd surface k = 0.0000
A4 = −3.0000e−003, A6 = 5.2642e−004, A8 = −9.9538e−006,
A10 = −1.7124e−006

23rd surface k = 0.0000
A4 = −9.4604e−004, A6 = 6.5300e−004, A8 = −1.4217e−006,
A10 = −2.2236e−006

26th surface k = 0.0000
A4 = −1.1500e−003, A6 = 8.5000e−005, A8 = −2.2194e−006,
A10 = 4.9178e−009, A12 = −1.8557e−010

-continued

Unit mm

27th surface k = 0.0000
A4 = 7.8091e−004, A6 = 7.0706e−005, A8 = −2.5061e−006

28th surface k = 0.0000
A4 = 1.9738e−003, A6 = −1.0641e−005, A8 = −3.0890e−007

29th surface k = 0.0000
A4 = 5.0000e−004, A6 = 1.8483e−005, A8 = 2.1215e−006,
A10 = −2.1774e−007, A12 = 4.2000e−009

Zoom data

| | wide | standard | tele |
|---|---|---|---|
| f | 3.900 | 10.132 | 26.433 |
| FNO. | 3.978 | 4.804 | 6.528 |
| 2ω | 89.6 | 40.7 | 16.0 |
| IH | 3.25 | 3.84 | 3.84 |
| FB | 1.8705 | 1.8778 | 1.8706 |
| Lens total length | 55.2273 | 55.2271 | 55.2272 |
| d8 | 0.400 | 4.155 | 7.213 |
| d13 | 7.713 | 3.951 | 0.900 |
| d16 | 9.397 | 4.443 | 0.400 |
| d23 | 2.033 | 5.063 | 8.787 |
| d25 | 1.183 | 3.108 | 3.426 |

Unit focal length f1 = 10.7767    f2 = −4.35701    f3 = 18.9854    f4 = 13.3013
f5 = −11.4681   f6 = 9.88428

Aberration diagrams of the aforementioned examples from the example 1 to the example 8 are shown in diagrams from FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L to FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L. Each of the abovementioned diagrams is an aberration diagram when focused to an object at infinity. Moreover, in each aberration diagram, 'FIY' denotes the maximum image height.

In these aberration diagrams, FIG. 9A, FIG. 10A, FIG. 11A, FIG. 12A, FIG. 13A, FIG. 14A, FIG. 15A, and FIG. 16A show spherical aberration (SA), FIG. 9B, FIG. 10B, FIG. 11B, FIG. 12B, FIG. 13B, FIG. 14B, FIG. 15B, and FIG. 16B show astigmatism (AS), FIG. 9C, FIG. 10C, FIG. 11C, FIG. 12C, FIG. 13C, FIG. 14C, FIG. 15C, and FIG. 16C show distortion (DT), and FIG. 9D, FIG. 10D, FIG. 11D, FIG. 12D, FIG. 13D, FIG. 14D, FIG. 15D, and FIG. 16D show chromatic aberration of magnification (CC). These are aberration diagrams at the wide angle end.

Moreover, FIG. 9E, FIG. 10E, FIG. 11E, FIG. 12E, FIG. 13E, FIG. 14E, FIG. 15E, and FIG. 16E show spherical aberration (SA), FIG. 9F, FIG. 10F, FIG. 11F, FIG. 12F, FIG. 13F, FIG. 14F, FIG. 15F, and FIG. 16F show astigmatism (AS), FIG. 9G, FIG. 10G, FIG. 11G, FIG. 12G, FIG. 13G, FIG. 14G, FIG. 15G, and FIG. 16G show distortion (DT), and FIG. 9H, FIG. 10H, FIG. 11H, FIG. 12H, FIG. 13H, FIG. 14H, FIG. 15H, and FIG. 16H show chromatic aberration of magnification (CC). These are aberration diagrams in the intermediate focal length state.

Moreover, FIG. 9I, FIG. 10I, FIG. 11I, FIG. 12I, FIG. 13I, FIG. 14I, FIG. 15I, and FIG. 16I show spherical aberration (SA), FIG. 9J, FIG. 10J, FIG. 11J, FIG. 12J, FIG. 13J, FIG. 14J, FIG. 15J, and FIG. 16J show astigmatism (AS), FIG. 9K, FIG. 10K, FIG. 11K, FIG. 12K, FIG. 13K, FIG. 14K, FIG. 15K, and FIG. 16K show distortion (DT), and FIG. 9L, FIG. 10L, FIG. 11L, FIG. 12L, FIG. 13L, FIG. 14L, FIG. 15L, and FIG. 16L show chromatic aberration of magnification (CC). These are aberration diagrams at the telephoto end.

Next, values of conditional expressions from conditional expression (1) to conditional expression (20) in the examples will be shown.

|  | Example 1 | Example 2 | Example 3 |
|---|---|---|---|
| (1) $\|f_{1Po}\| \times f_{1Pi}/IH_t^2$ | 6.687 | 6.821 | 5.742 |
| (2) $\tan\omega_w - (L_{pri}/L_w)$ | 0.852 | 0.852 | 0.914 |
| (3) $DT/(f_{1Po}/IH_t)$ | 7.425 | 7.442 | 9.750 |
| (4) $\|(f_{1Po}/IH_t) \times (f_{1P}/IH_t)/\tan\omega_w\|$ | 8.306 | 8.696 | 6.903 |
| (5) $\|(f_{1Po}/f_w) \times (f_{1P}/f_w)\|$ | 8.057 | 8.209 | 6.857 |
| (6) $\|(f_{1Po}/IH_t)/(\tan\omega_w)^2\|$ | 2.595 | 2.565 | 2.102 |
| (7) $(L_{pri}/IH_t) \times (f_w/IH_t)/\tan\omega_w$ | 2.207 | 2.267 | 2.077 |
| (8) $\|f_1/IH_t\|$ | 3.176 | 3.365 | 3.096 |
| (8) $\|f_2/IH_t\|$ | 1.941 | 2.014 | 1.906 |
| (8) $\|f_3/IH_t\|$ | 2.613 | 2.643 | 2.761 |
| (8) $\|f_4/IH_t\|$ | 2.336 | 2.580 | 2.852 |
| (8) $\|f_5/IH_t\|$ | 3.064 | 2.963 | 2.726 |
| (9) $\|f_{1Po}/IH_t\|$ | 2.636 | 2.603 | 2.366 |
| (10) $\|f_{1Po}/f_w\|$ | 2.586 | 2.520 | 2.289 |
| (11) $ASP_{1NP}$ | −0.199 | −0.104 | −0.163 |
| (12) $vd_{2N}$ | 55.690 | 55.690 | 55.690 |
| (13) $L_w/\|f_{1Po}\|$ | 5.310 | 5.447 | 6.139 |
| (14) $L_{1Nair}/IH_t$ | 0.363 | 0.511 | 0.416 |
| (15) $\|f_{1P}/f_{1Po}\|$ | 1.205 | 1.293 | 1.309 |
| (16) $f_{1N}/f_{1Po}$ | 0.737 | 0.774 | 0.806 |
| (17) DT | −19.571 | −19.376 | −23.064 |
| (18) $f_w/r_{1F}$ | 0.016 | 0.013 | 0.020 |
| (19) $nd_{1PN}$ | 2.001 | 2.001 | 2.001 |
| (20) $vd_{pri}$ | 20.880 | 20.880 | 17.980 |
| (21) $nd_{pri}$ | 1.923 | 1.923 | 1.946 |
| (22) $\tan\omega_w/(L_{pri}/L_w)$ | 6.464 | 6.461 | 7.227 |
| (23) $(\tau 420)^4$ | 0.779 | 0.779 | 0.570 |
| (24) $(\tau 400)^4$ | 0.448 | 0.448 | 0.128 |
| (25) $f_{1Pi} \times f_w/IH_t^2$ | 2.586 | 2.707 | 2.508 |

|  | Example 4 | Example 5 | Example 6 |
|---|---|---|---|
| (1) $\|f_{1Po}\| \times f_{1Pi}/IH_t^2$ | 5.689 | 7.135 | 6.771 |
| (2) $\tan\omega_w - (L_{pri}/L_w)$ | 0.857 | 0.821 | 0.858 |
| (3) $DT/(f_{1Po}/IH_t)$ | 8.757 | 7.225 | 7.376 |
| (4) $\|(f_{1Po}/IH_t) \times (f_{1P}/IH_t)/\tan\omega_w\|$ | 6.609 | 9.853 | 8.207 |
| (5) $\|(f_{1Po}/f_w) \times (f_{1P}/f_w)\|$ | 6.239 | 8.128 | 7.950 |
| (6) $\|(f_{1Po}/IH_t)/(\tan\omega_w)^2\|$ | 2.465 | 2.979 | 2.658 |
| (7) $(L_{pri}/IH_t) \times (f_w/IH_t)/\tan\omega_w$ | 2.185 | 2.301 | 2.210 |
| (8) $\|f_1/IH_t\|$ | 2.661 | 3.431 | 3.064 |
| (8) $\|f_2/IH_t\|$ | 1.680 | 1.173 | 1.817 |
| (8) $\|f_3/IH_t\|$ | 2.671 | 3.698 | 2.516 |
| (8) $\|f_4/IH_t\|$ | 2.815 | 3.108 | 2.082 |
| (8) $\|f_5/IH_t\|$ | 2.592 | — | 3.761 |
| (9) $\|f_{1Po}/IH_t\|$ | 2.503 | 2.768 | 2.700 |
| (10) $\|f_{1Po}/f_w\|$ | 2.423 | 2.561 | 2.647 |
| (11) $ASP_{1NP}$ | — | — | −0.393 |
| (12) $vd_{2N}$ | 55.690 | — | 37.280 |
| (13) $L_w/\|f_{1Po}\|$ | 5.655 | 5.182 | 5.408 |
| (14) $L_{1Nair}/IH_t$ | 0.358 | 0.222 | 0.246 |
| (15) $\|f_{1P}/f_{1Po}\|$ | 1.063 | 1.240 | 1.135 |
| (16) $f_{1N}/f_{1Po}$ | 0.671 | 0.424 | 0.673 |
| (17) DT | −21.921 | −19.999 | −19.912 |
| (18) $f_w/r_{1F}$ | 0.031 | 0.074 | 0.033 |
| (19) $nd_{1PN}$ | 2.002 | 2.001 | 2.001 |
| (20) $vd_{pri}$ | 20.880 | 29.130 | 20.880 |
| (21) $nd_{pri}$ | 1.923 | 2.001 | 1.923 |
| (22) $\tan\omega_w/(L_{pri}/L_w)$ | 6.695 | 6.739 | 6.737 |
| (23) $(\tau 420)^4$ | 0.786 | 0.900 | 0.779 |
| (24) $(\tau 400)^4$ | 0.462 | — | 0.448 |
| (25) $f_{1Pi} \times f_w/IH_t^2$ | 2.348 | 2.786 | 2.558 |

|  | Example 7 | Example 8 |
|---|---|---|
| (1) $\|f_{1Po}\| \times f_{1Pi}/IH_t^2$ | 7.205 | — |
| (2) $\tan\omega_w - (L_{pri}/L_w)$ | 0.788 | 0.831 |
| (3) $DT/(f_{1Po}/IH_t)$ | 7.031 | 5.645 |
| (4) $\|(f_{1Po}/IH_t) \times (f_{1P}/IH_t)/\tan\omega_w\|$ | 10.090 | 11.535 |
| (5) $\|(f_{1Po}/f_w) \times (f_{1P}/f_w)\|$ | 6.735 | 10.404 |
| (6) $\|(f_{1Po}/IH_t)/(\tan\omega_w)^2\|$ | 3.287 | — |
| (7) $(L_{pri}/IH_t) \times (f_w/IH_t)/\tan\omega_w$ | 2.607 | 2.473 |
| (8) $\|f_1/IH_t\|$ | 3.300 | 2.899 |
| (8) $\|f_2/IH_t\|$ | 1.176 | 1.172 |
| (8) $\|f_3/IH_t\|$ | 3.760 | — |
| (8) $\|f_4/IH_t\|$ | 3.214 | 3.579 |
| (8) $\|f_5/IH_t\|$ | — | 3.085 |
| (8) $\|f_6/IH_t\|$ | — | 2.659 |
| (9) $\|f_{1Po}/IH_t\|$ | 2.844 | — |
| (10) $\|f_{1Po}/f_w\|$ | 2.409 | — |
| (11) $ASP_{1NP}$ | −0.393 | — |
| (12) $vd_{2N}$ | — | 40.390 |
| (13) $L_w/\|f_{1Po}\|$ | 5.068 | — |
| (14) $L_{1Nair}/IH_t$ | — | — |
| (15) $\|f_{1P}/f_{1Po}\|$ | 1.160 | — |
| (16) $f_{1N}/f_{1Po}$ | 0.413 | — |
| (17) DT | −19.999 | −22.304 |
| (18) $f_w/r_{1F}$ | 0.084 | — |
| (19) $nd_{1PN}$ | 2.001 | 2.020 |
| (20) $vd_{pri}$ | 29.130 | 29.130 |
| (21) $nd_{pri}$ | 2.001 | 2.001 |
| (22) $\tan\omega_w/(L_{pri}/L_w)$ | 6.529 | 6.138 |
| (23) $(\tau 420)^4$ | 0.900 | 0.886 |
| (24) $(\tau 400)^4$ | — | — |
| (25) $f_{1Pi} \times f_w/IH_t^2$ | 2.990 | 2.728 |

Figure 23:
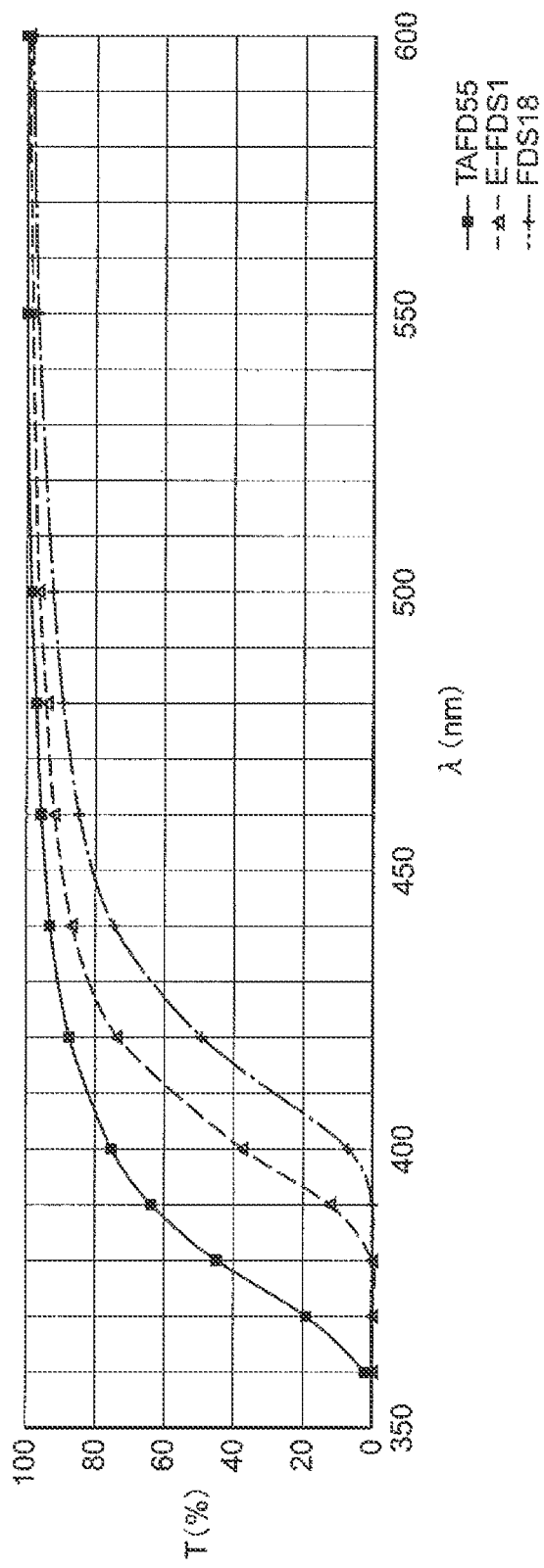
FIG. 23 is a graph showing an internal transmittance of a material which is to be used for a prism.

A name of material for the prism (manufactured by HOYA CORPORATION) in each example is given below. The internal transmittance of each material is shown in FIG. 23. Here, the internal transmittance is a transmittance through a thickness of 10 mm. Moreover, T denotes the internal transmittance (%) and A denotes the wavelength (nm).

|  | Example 1 | Example 2 | Example 3 | Example 4 |
|---|---|---|---|---|
| Material name | E-FDS1 | E-FDS1 | FDS18 | E-FDS1 |

|  | Example 5 | Example 6 | Example 7 | Example 8 |
|---|---|---|---|---|
| Material name | TAFD55 | E-FDS1 | TAFD55 | TAFD55 |

(Correction of Distortion)

Incidentally, when the zoom lens system of the present invention is used, a digital correction of distortion of an image is carried out electrically. A basic concept for the digital correction of the distortion of an image will be described below.

Figure 18:
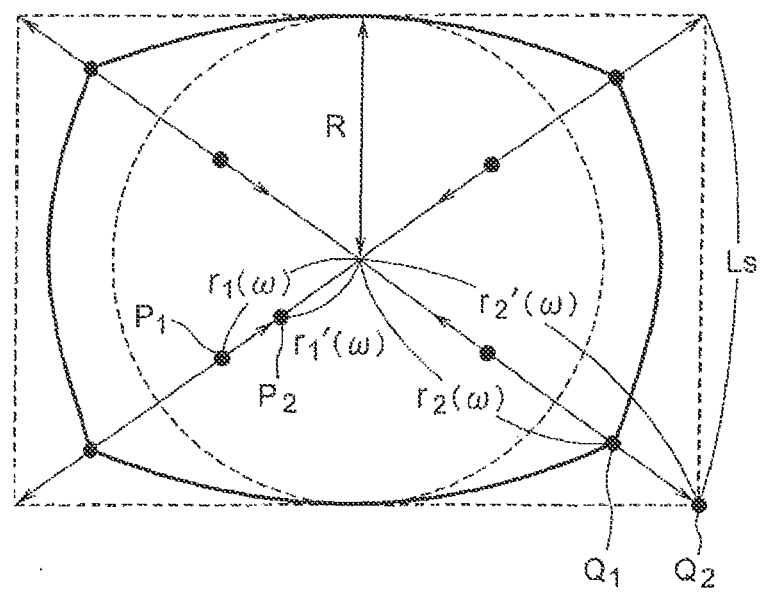
FIG. 18 is a diagram explaining correction of distortion.

For example, as shown in FIG. 18, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, the correction is carried out by moving each point on a circumference (image height) of an arbitrary radius r(ω) other than the radius R in a substantial direction of radiation. More concretely, each point on a circumference is moved so that the arbitrary radius r(ω) becomes radius r'(ω).

For example, in FIG. 18, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, r'(ω) can be expressed as follows.

$$r'(\omega) = \alpha \cdot f \tan \omega$$

where,

ω is a half angle of view of an object, f is a focal length of an imaging optical system (the zoom lens in the present invention), and $$0 \leq \alpha \leq 1.$$

Here, when an ideal image height corresponding to a circle (image height) of radius R is let to be Y, then $$\alpha = R/Y = R/(f \tan \omega).$$

Since the optical system, ideally, is rotationally symmetric with respect to an optical axis, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

However, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, such method is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half angle of field and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3 Ls \leq R \leq 0.6 Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \tan \omega$$

near a telephoto end in the focal point zones which are divided.

Here, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half angle of field) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Optical Path Bending Digital Camera)

Further, the zoom lens of the present invention described above could be applied to an electrical image pick up apparatus, especially a digital camera, video camera etc, in which the image formed by the above-mentioned zoom lens is photographed by receiving the image on an electrical image pickup element such as CCD etc. Such embodiment will be described below.

Figure 19:
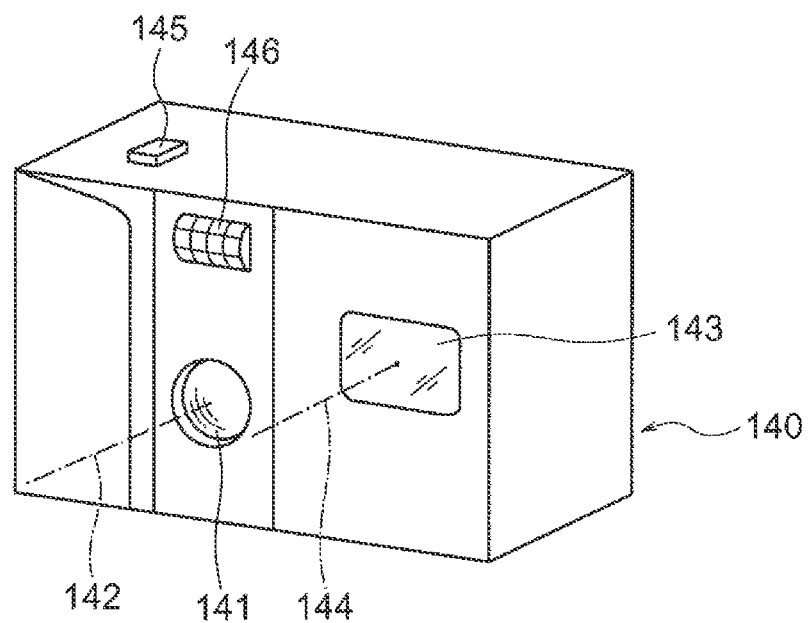
FIG. 19 is a front perspective view showing an overview of a digital camera in which, a zoom lens according to the present invention is incorporated.
Figure 20:
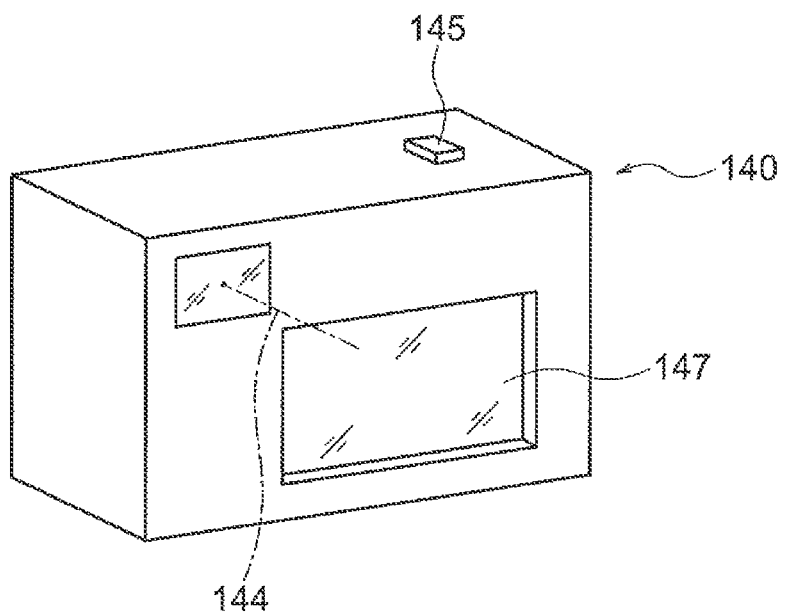
FIG. 20 is a rear perspective view of the digital camera.
Figure 21:
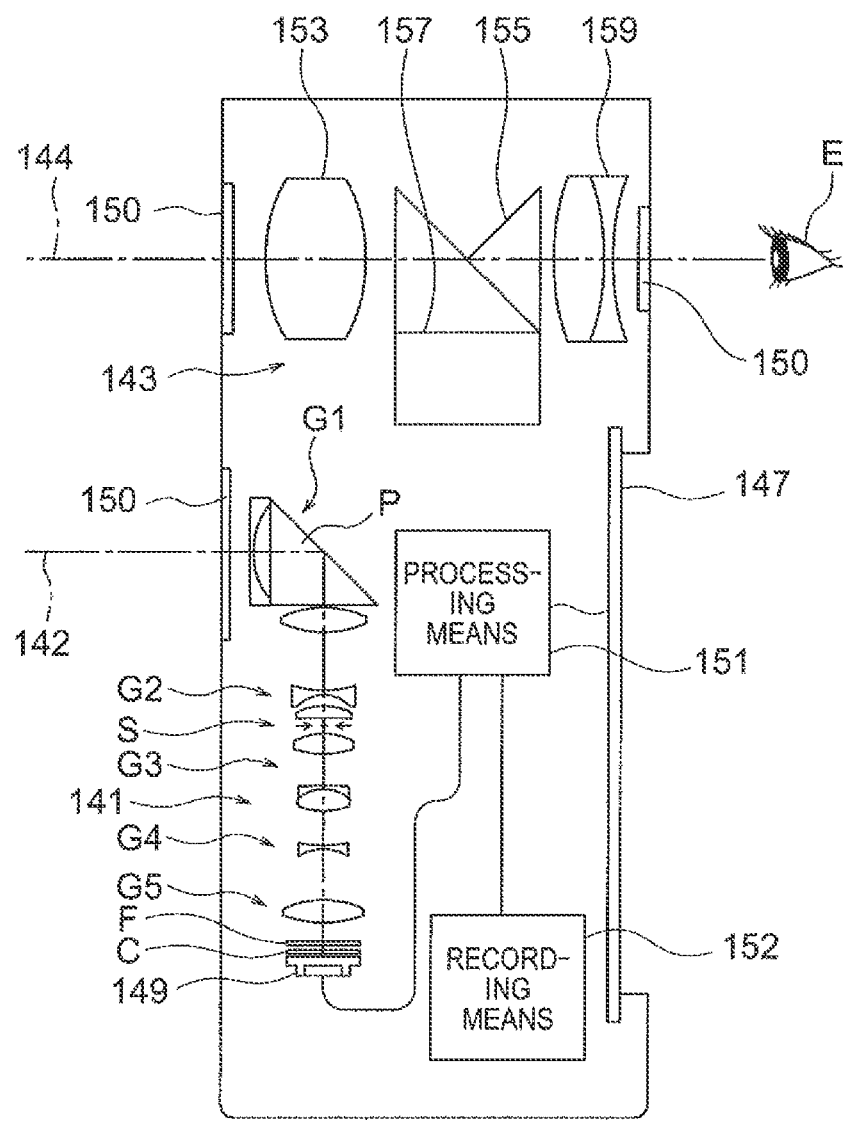
FIG. 21 is a cross-sectional view of the digital camera.

FIG. 19 to FIG. 21 are conceptual diagrams of a structure of a digital camera according to the present invention in which a zoom lens system described above is incorporated in a taking optical system 141. FIG. 19 is a front perspective view showing an appearance of a digital camera 140, FIG. 20 is a rear perspective view of the same, and FIG. 21 is a schematic cross-sectional view showing a structure of the digital camera 140.

The digital camera 140, in a case of this example, includes the taking optical system 141 having a taking optical path 142, a finder optical system 143 having a finder optical path 144, a shutter button 145, a flash 146, a liquid-crystal display monitor 147 etc. When the shutter button 145 disposed on an upper portion of the digital camera 140 is pressed, in synchronization with the pressing of the shutter button 145, a photograph is taken by the taking optical system 141 such as the optical path bending zoom lens in the first embodiment. An object image formed by the taking optical system 141 is formed on an image pickup surface of a CCD 149 via a cover glass C and a low pass filter on which a wavelength region restricting coating is applied.

An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. An object image formed by the finder objective optical system 153 is formed on a field frame 157 of a Porro prism 155 which is an image erecting member. On a rear side of the Porro prism 155, an eyepiece optical system 159 which guides an erected image to a viewer's eyeball, is disposed. A cover member 150 is disposed on an emergence side of the eyepiece optical system 159.

In the digital camera 140 structured in such manner, since the taking optical system 141 has a high zoom ratio and wide angle of view at the wide angle end, it is possible to realize the inexpensive digital camera in which the optical performance is high and the depth is extremely thin.

Further, the example shown in FIG. 21, a plane parallel plate is disposed as the cover member 150. However, the cover member 150 could be omitted.

(Internal Circuit Structure)

Figure 22:
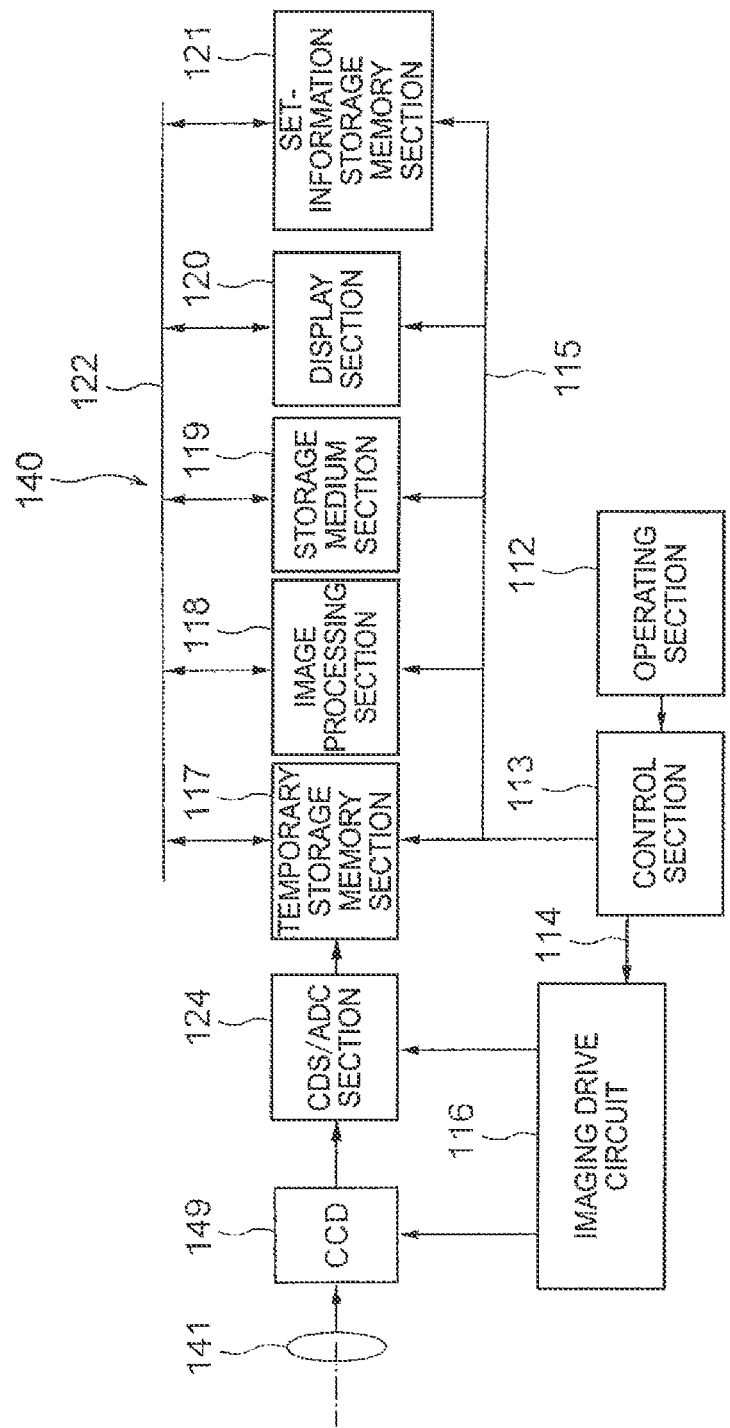
FIG. 22 is a structural block diagram of an internal circuit of main components of the digital camera.

FIG. 22 is a structural block diagram of an internal circuit of main components of the digital camera 140. In the following description, the processing means 151 described above includes for instance, a CDS/ADC section 124, a temporary storage memory 117, and an image processing section 118, and a storage means 152 includes a storage medium section 119.

As shown in FIG. 22, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and informs the control section of an event information which is input from outside (by a user of the digital camera) via these input buttons and switches. The control section 113 is a central processing unit (CPU) for example, and has a built-in computer program memory which is not shown in the diagram. The control section 113 controls the entire digital camera 140 according to a computer program stored in this computer program memory.

The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (Bayer data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 records and maintains the RAW data transferred from the temporary storage memory 117 and image data subjected to image processing in the image processing section 118 in the card flash memory and the stick flash memory.

The display section 120 includes the liquid-crystal display monitor 147, and displays images and operation menu on the liquid-crystal display monitor 147. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

As it has been described heretofore, the image pickup apparatus according to the present invention is suitable for an image pickup apparatus which includes a zoom lens in which, both, the widening of angle of view and high zooming ratio are achieved, and various aberrations are corrected favorably.

What is claimed is:

1. An image pickup apparatus comprising in order from an object side:
   a zoom lens; and
   an image pickup element, wherein
   the zoom lens comprises
   a first positive lens unit having a positive refractive power,
   a first negative lens unit having a negative refractive power,
   a stop, and
   a second positive lens unit having a positive refractive power, and
   the first positive lens unit and the first negative lens unit are disposed in order of the first positive lens unit and the first negative lens unit from the object side to an image side, and
   the second positive lens unit is disposed on the image side of the first negative lens unit, and
   the stop is disposed between the first negative lens unit and the second positive lens unit, and
   at the time of zooming from a wide angle end to a telephoto end, a movement of each lens unit is as follows,
   the first positive lens unit is stationary,
   the first negative lens unit moves toward the image side, and
   the second positive lens unit moves toward the object side, and
   a position at the telephoto end of the first negative lens unit is on the image side of a position at the wide angle end of the first negative lens unit, and
   a position at the telephoto end of the second positive lens unit is on the object side of a position at the wide angle end of the second positive lens unit, and
   at the time of focusing, the first positive lens unit is stationary, and
   the first positive lens unit comprises
   a reflecting member having a reflecting surface which bends an optical path,
   a first positive lens unit object-side system, and
   a first positive lens unit image-side system, and
   the first positive lens unit object-side system is positioned on the object side of the reflecting surface, and has a negative refractive power, and
   the first positive lens unit image-side system is positioned on the image side of the reflecting surface, and has a positive refractive power, and
   a following conditional expression (1) is satisfied;

$$4.5 \leq |f_{1Po}| \times f_{1Pi}/IH_t^2 \leq 7.5 \quad (1)$$

where,
   $f_{1Po}$ denotes a focal length of the first positive lens unit object-side system,
   $f_{1Pi}$ denotes a focal length of the first positive lens unit image-side system, and
   $IH_t$ denotes the maximum image height when focused on an object at infinity at the telephoto end.

2. An image pickup apparatus comprising in order from an object side:
   a zoom lens; and
   an image pickup element, wherein
   the zoom lens comprises
   a first positive lens unit having a positive refractive power,
   a first negative lens unit having a negative refractive power,
   a stop, and
   a second positive lens unit having a positive refractive power, and
   the first positive lens unit and the first negative lens unit are disposed in order of the first positive lens unit and the first negative lens unit from the object side to an image side, and
   the second positive lens unit is disposed on the image side of the first negative lens unit, and
   the stop is disposed between the first negative lens unit and the second positive lens unit, and
   at the time of zooming from a wide angle end to a telephoto end, a movement of each lens unit is as follows,
   the first positive lens unit is stationary,
   the first negative lens unit moves toward the image side, and
   the second positive lens unit moves toward the object side, and
   a position at the telephoto end of the first negative lens unit is on the image side of a position at the wide angle end of the first negative lens unit, and
   a position at the telephoto end of the second positive lens unit is on the object side of a position at the wide angle end of the second positive lens unit, and
   at the time of focusing, the first positive lens unit is stationary, and
   the first positive lens unit comprises
   a reflecting member having a reflecting surface which bends an optical path,
   a first positive lens unit object-side system, and
   a first positive lens unit image-side system, and
   the first positive lens unit object-side system is positioned on the object side of the reflecting surface, and has a negative refractive power, and
   the first positive lens unit image-side system is positioned on the image side of the reflecting surface, and has a positive refractive power, and
   the reflecting member is a prism, and
   following conditional expressions (2) and (3) are satisfied;

$$0.7 \leq \tan \omega_w - (L_{pri}/L_w) \leq 1.3 \quad (2)$$

$$3.5 \leq DT/(f_{1Po}/IH_t) \leq 16 \quad (3)$$

where,
   $\omega_w$ denotes the maximum half angle of view when focused to an object at infinity at the wide angle end,
   $L_{pri}$ denotes a total length along an optical axis of the prism, and the total length is a distance from an optical surface on the object side of the reflecting surface up to an optical surface on the image side of the reflecting surface, from among optical surfaces which form the prism,
   $L_w$ denotes a distance which is obtained by adding a back focus length which is converted in length in the air, to a total length along an optical axis of the overall zoom lens system, and the distance is a distance when focused to an object at infinity at the wide angle end, and the total length is a distance from a lens surface nearest to the object side of the zoom lens up to a lens surface nearest to the image side of the zoom lens,
   $f_{1Po}$ denotes a focal length of the first positive lens unit object-side system,
   $IH_t$ denotes the maximum image height when focused to an object at infinity at the telephoto end,
   $DT$ is $DT=(IH_w-f_w \times \tan \omega_w)/(f_w \times \tan \omega_w) \times 100$ (unit is %),
   $IH_w$ denotes the maximum image height when focused to an object at infinity at the wide angle end, and
   $f_w$ denotes a focal length of the overall zoom lens system when focused to an object at infinity at the wide angle end.

3. An image pickup apparatus comprising in order from an object side:
a zoom lens; and
an image pickup element, wherein
the zoom lens comprises
a first positive lens unit having a positive refractive power,
a first negative lens unit having a negative refractive power,
a stop, and
a second positive lens unit having a positive refractive power, and
the first positive lens unit and the first negative lens unit are disposed in order of the first positive lens unit and the first negative lens unit from the object side to an image side, and
the second positive lens unit is disposed on the image side of the first negative lens unit, and
the stop is disposed between the first negative lens unit and the second positive lens unit, and
at the time of zooming from a wide angle end to a telephoto end, a movement of each lens unit is as follows
the first positive lens unit is stationary,
the first negative lens unit moves toward the image side, and
the second positive lens unit moves toward the object side, and
a position at the telephoto end of the first negative lens unit is on the image side of a position at the wide angle end of the first negative lens unit, and
a position at the telephoto end of the second positive lens unit is on the object side of a position at the wide angle end of the second positive lens unit, and
at the time of focusing, the first positive lens unit is stationary, and
the first positive lens unit comprises
a reflecting member having a reflecting surface which bends an optical path,
a first positive lens unit object-side system, and
a first positive lens unit image-side system, and
the first positive lens unit object-side system is positioned on the object side of the reflecting surface, and has a negative refractive power, and
the first positive lens unit image-side system is positioned on the image side of the reflecting surface, and has a positive refractive power, and
following conditional expressions (4) and (5-1) are satisfied;

$$4.2 \le |(f_{1Po}/IH_t) \times (f_{1P}/IH_t)/\tan \omega_w| \le 11.6 \quad (4)$$

$$5.6 \le |(f_{1Po}/f_w) \times (f_{1P}/f_w)| \le 11.0 \quad (5\text{-}1)$$

where,
$f_{1Po}$ denotes a focal length of the first positive lens unit object-side system,
$f_{1P}$ denotes a focal length of the first positive lens unit,
$IH_t$ denotes the maximum image height when focused to an object at infinity at the telephoto end,
$\omega_w$ denotes the maximum half angle of view when focused to an object at infinity at the wide angle end, and
$f_w$ denotes a focal length of the overall zoom lens system when focused to an object at infinity at the wide angle end.

4. An image pickup apparatus comprising in order from an object side:
a zoom lens; and
an image pickup element, wherein
the zoom lens comprises
a first positive lens unit having a positive refractive power,
a first negative lens unit having a negative refractive power,
a stop, and
a second positive lens unit having a positive refractive power, and
the first positive lens unit and the first negative lens unit are disposed in order of the first positive lens unit and the first negative lens unit from the object side to an image side, and
the second positive lens unit is disposed on the image side of the first negative lens unit, and
the stop is disposed between the first negative lens unit and the second positive lens unit, and
at the time of zooming from a wide angle end to a telephoto end, a movement of each lens unit is as follows,
the first positive lens unit is stationary,
the first negative lens unit moves toward the image side, and
the second positive lens unit moves toward the object side, and
a position at the telephoto end of the first negative lens unit is on the image side of a position at the wide angle end of the first negative lens unit, and
a position at the telephoto end of the second positive lens unit is on the object side of a position at the wide angle end of the second positive lens unit, and
at the time of focusing, the first positive lens unit is stationary, and
the first positive lens unit comprises
a reflecting member having a reflecting surface which bends an optical path,
a first positive lens unit object-side system, and
a first positive lens unit image-side system, and
the first positive lens unit object-side system is positioned on the object side of the reflecting surface, and has a negative refractive power, and
the first positive lens unit image-side system is positioned on the image side of the reflecting surface, and has a positive refractive power, and
a following conditional expression (6) is satisfied;

$$1.0 \le |(f_{1Po}/IH_t)/(\tan \omega_w)^2| \le 3.7 \quad (6)$$

where,
$f_{1Po}$ denotes a focal length of the first positive lens unit object-side system,
$IH_t$ denotes the maximum image height when focused to an object at infinity at the telephoto end, and
$\omega_w$ denotes the maximum half angle of view when focused to an object at infinity at the wide angle end.

5. An image pickup apparatus comprising in order from an object side:
a zoom lens; and
an image pickup element, wherein
the zoom lens comprises
a first positive lens unit having a positive refractive power,
a first negative lens unit having a negative refractive power,
a stop, and
a second positive lens unit having a positive refractive power, and
the first positive lens unit and the first negative lens unit are disposed in order of the first positive lens unit and the first negative lens unit from the object side to an image side, and
the second positive lens unit is disposed on the image side of the first negative lens unit, and
the stop is disposed between the first negative lens unit and the second positive lens unit, and at the time of zooming from a wide angle end to a telephoto end, a movement of each lens unit is as follows,
the first positive lens unit is stationary,
the first negative lens unit moves toward the image side, and
the second positive lens unit moves toward the object side, and
a position at the telephoto end of the first negative lens unit is on the image side of a position at the wide angle end of the first negative lens unit, and
a position at the telephoto end of the second positive lens unit is on the object side of a position at the wide angle end of the second positive lens unit, and
at the time of focusing, the first positive lens unit is stationary, and
the first positive lens unit comprises
a reflecting member having a reflecting surface which bends an optical path,
a first positive lens unit object-side system, and
a first positive lens unit image-side system, and
the first positive lens unit object-side system is positioned on the object side of the reflecting surface, and has a negative refractive power, and
the first positive lens unit image-side system is positioned on the image side of the reflecting surface, and has a positive refractive power, and
the reflecting member is a prism, and
following conditional expressions (5) and (7) are satisfied;

$$5.6 \leq |(f_{1Po}/f_w) \times (f_{1P}/f_w)| \leq 11.5 \quad (5)$$

$$1.5 \leq (L_{pri}/\text{IH}_t) \times (f_w/\text{IH}_t)/\tan \omega_w \leq 2.8 \quad (7)$$

where,
$f_{1Po}$ denotes a focal length of the first positive lens unit object-side system,
$f_{1P}$ denotes a focal length of the first positive lens unit,
$f_w$ denotes a focal length of the overall zoom lens system when focused to an object at infinity at the wide angle end,
$L_{pri}$ denotes a total length along an optical axis of the prism, and the total length is a distance from an optical surface on the object side of the reflecting surface up to an optical surface on the image side of the reflecting surface, from among optical surfaces which form the prism,
$\text{IH}_t$ denotes the maximum image height when focused to an object at infinity at the telephoto end, and
$\omega_w$ denotes the maximum half angle of view when focused to an object at infinity at the wide angle end.

6. An image pickup apparatus comprising in order from an object side:
a zoom lens; and
an image pickup element, wherein
the zoom lens comprises
a first positive lens unit having a positive refractive power,
a first negative lens unit having a negative refractive power,
a stop, and
a second positive lens unit having a positive refractive power, and
the first positive lens unit and the first negative lens unit are disposed in order of the first positive lens unit and the first negative lens unit from the object side to an image side, and
the second positive lens unit is disposed on the image side of the first negative lens unit, and
the stop is disposed between the first negative lens unit and the second positive lens unit, and
at the time of zooming from a wide angle end to a telephoto end, a movement of each lens unit is as follows,
the first positive lens unit is stationary,
the first negative lens unit moves toward the image side, and
the second positive lens unit moves toward the object side, and
a position at a telephoto end of the first negative lens unit is on the image side of a position at the wide angle end of the first negative lens unit, and
a position at the telephoto end of the second positive lens unit is on the object side of a position at the wide angle end of the second positive lens unit, and
at the time of focusing, the first positive lens unit is stationary, and
the first positive lens unit comprises
a reflecting member having a reflecting surface which bends an optical path,
a first positive lens unit object-side system, and
a first positive lens unit image-side system, and
the first positive lens unit object-side system is positioned on the object side of the reflecting surface, and has a negative refractive power, and
the first positive lens unit image-side system is positioned on the image side of the reflecting surface, and has a positive refractive power, and
following conditional expressions (5-1), (8), and (9) are satisfied;

$$5.6 \leq |(f_{1Po}/f_w) \times (f_{1P}/f_w)| \leq 11.0 \quad (5\text{-}1)$$

$$0.7 \leq |f_n/\text{IH}_t| \leq 4.0 \quad (8)$$

$$1.2 \leq |f_{1Po}/\text{IH}_t| \leq 3.6 \quad (9)$$

where,
$f_{1Po}$ denotes a focal length of the first positive lens unit object-side system,
$f_{1P}$ denotes a focal length of the first positive lens unit,
$f_w$ denotes a focal length of the overall zoom lens system when focused to an object at infinity at the wide angle end,
$f_n$ denotes a focal length of each lens unit in the zoom lens, and is specified for each lens unit by a movement or by being stationary at the time of zooming, and
$\text{IH}_t$ denotes the maximum image height when focused to an object at infinity at the telephoto end.

7. An image pickup apparatus comprising in order from an object side:
a zoom lens; and
an image pickup element, wherein
the zoom lens comprises
a first positive lens unit having a positive refractive power,
a first negative lens unit having a negative refractive power,
a stop, and
a second positive lens unit having a positive refractive power, and
the first positive lens unit and the first negative lens unit are disposed in order of the first positive lens unit and the first negative lens unit from the object side to an image side, and
the second positive lens unit is disposed on the image side of the first negative lens unit, and
the stop is disposed between the first negative lens unit and the second positive lens unit, and
at the time of zooming from a wide angle end to a telephoto end, a movement of each lens unit is as follows,
the first positive lens unit is stationary, the first negative lens unit moves toward the image side, and the second positive lens unit moves toward the object side, and a position at the telephoto end of the first negative lens unit is on the image side of a position at the wide angle end of the first negative lens unit, and a position at the telephoto end of the second positive lens unit is on the object side of a position at the wide angle end of the second positive lens unit, and at the time of focusing, the first positive lens unit is stationary, and the first positive lens unit comprises a reflecting member having a reflecting surface which bends an optical path, a first positive lens unit object-side system, and a first positive lens unit image-side system, and the first positive lens unit object-side system is positioned on the object side of the reflecting surface, and has a negative refractive power, and the first positive lens unit image-side system is positioned on the image side of the reflecting surface, and has a positive refractive power, and the reflecting member is a prism, and following conditional expressions (2) and (10) are satisfied;

$$0.7 \leq \tan \omega_w - (L_{pri}/L_w) \leq 1.3 \quad (2)$$

$$1.2 \leq |f_{1Po}/f_w| \leq 2.9 \quad (10)$$

where, $\omega_w$ denotes the maximum half angle of view when focused to an object at infinity at the wide angle end, $L_{pri}$ denotes a total length along an optical axis of the prism, and the total length is a distance from an optical surface on the object side of the reflecting surface up to an optical surface on the image side of the reflecting surface, from among optical surfaces which form the prism, $L_w$ denotes a distance which is obtained by adding a back focus length which is converted in length in the air, to a total length along an optical axis of the overall zoom lens system, and the distance is a distance when focused to an object at infinity at the wide angle end, and the total length is a distance from a lens surface nearest to the object side of the zoom lens up to a lens surface nearest to the image side of the zoom lens, $f_{1Po}$ denotes a focal length of the first positive lens unit object-side system, and $f_w$ denotes a focal length of the overall zoom lens system when focused to an object at infinity at the wide angle end.

8. An image pickup apparatus comprising in order from an object side:

a zoom lens; and an image pickup element, wherein the zoom lens comprises a first positive lens unit having a positive refractive power, a first negative lens unit having a negative refractive power, a stop, and a second positive lens unit having a positive refractive power, and the first positive lens unit and the first negative lens unit are disposed in order of the first positive lens unit and the first negative lens unit from the object side to an image side, and the second positive lens unit is disposed on the image side of the first negative lens unit, and the stop is disposed between the first negative lens unit and the second positive lens unit, and at the time of zooming from a wide angle end to a telephoto end, a movement of each lens unit is as follows the first positive lens unit is stationary, the first negative lens unit moves toward the image side, and the second positive lens unit moves toward the object side, and a position at the telephoto end of the first negative lens unit is on the image side of a position at the wide angle end of the first negative lens unit, and a position at the telephoto end of the second positive lens unit is on the object side of a position at the wide angle end of the second positive lens unit, and at the time of focusing, the first positive lens unit is stationary, and the first positive lens unit comprises a reflecting member having a reflecting surface which bends the optical path, a first positive lens unit object-side system, and a first positive lens unit image-side system, and the first positive lens unit object-side system is positioned on the object side of the reflecting surface, and has a negative refractive power, and a first positive lens unit image-side system is positioned on the image side of the reflecting surface, and has a positive refractive power, and $\omega_w \geq 42$, and a following conditional expression (3) is satisfied;

$$3.5 \leq DT/(f_{1Po}/IH_t) \leq 16 \quad (3)$$

where, $\omega_w$ denotes the maximum half angle of view when focused to an object at infinity at the wide angle end, $f_{1Po}$ denotes a focal length of the first positive lens unit object-side system, $IH_t$ denotes the maximum image height when focused to an object at infinity at the telephoto end, $DT$ is $DT = (IH_w - f_w \times \tan \omega_w)/(f_w \times \tan \omega_w) \times 100$ (unit is %), $IH_w$ denotes the maximum image height when focused to an object at infinity at the wide angle end, and $f_w$ denotes a focal length of the overall zoom lens system when focused to an object at infinity at the wide angle end.

9. The image pickup apparatus according to claim 1, wherein a second negative lens unit having a negative refractive power is disposed on the image side of the second positive lens unit, and a third positive lens unit having a positive refractive power is disposed on the image side of the second negative lens unit, and the first negative lens unit and the second positive lens unit, at the telephoto end, are positioned near the stop, and at the time of zooming, each distance between the adjacent lens units, changes.

10. The image pickup apparatus according to claim 9, wherein at the time of focusing, any lens in the second negative lens unit and the third positive lens unit moves in a direction along an optical axis.

11. The image pickup apparatus according to claim 9, wherein at the time of correcting blur, any lens in the second negative lens unit and the third positive lens unit undergoes decentered movement in a direction of cancelling an image blur.

12. The image pickup apparatus according to claim 9, wherein
the second negative lens unit consists one negative lens, and
a following conditional expression (12) is satisfied;

$$35 \leq vd_{2N} \leq 96 \quad (12)$$

where,
$vd_{2N}$ denotes Abbe's number with reference to a d-line of the negative lens in the second negative lens unit.

13. The image pickup apparatus according to claim 9, wherein the first negative lens unit and the second positive lens unit are disposed such that no lens is sandwiched between the first negative lens unit and the second positive lens unit.

14. The image pickup apparatus according to claim 9, wherein there is a lens unit apart from the first negative lens unit and the second positive lens unit, which moves at the time of zooming.

15. The image pickup apparatus according to claim 1, wherein
a third positive lens unit having a positive refractive power is disposed on the image side of the second positive lens unit, and
the third positive lens unit consists in order from the object side,
an object-side sub unit having a negative refractive power, and
an image-side sub unit having a positive refractive power, and
the object-side sub unit and the image-side sub unit are disposed sandwiching the longest air space in the third positive lens unit, and
the first negative lens unit and the second positive lens unit, at the telephoto end, are positioned near the stop, and
at the time of zooming, each distance between the adjacent lens units, changes.

16. The image pickup apparatus according to claim 15, wherein at the time of zooming, any lens in the third positive lens unit moves in a direction along an optical axis.

17. The image pickup apparatus according to claim 15, wherein at the time of correcting blur, any lens in the third positive lens unit undergoes decentered movement in a direction of cancelling an image blur.

18. The image pickup apparatus according to claim 1, wherein at the time of focusing, the second positive lens unit moves in a direction along an optical axis.

19. The image pickup apparatus according to claim 1, wherein
the first negative lens unit comprises
a first negative lens having a negative refractive power, and
a first positive lens having a positive refractive power, and
the first negative lens is disposed nearest to the object side, and
the first positive lens is disposed to be isolated by a predetermined distance, on the image side of the first negative lens, and
each of the first negative lens and the first positive lens has an aspheric surface, and
each of the first negative lens and the first positive lens satisfies the following conditional expression (11);

$$-0.45 \leq ASP_{1NP} \leq -0.08 \quad (11)$$

where, $ASP_{1NP} = ASP_{1NPo} + ASP_{1NPi}$, $ASP_{1NPo}$ denotes an amount of aspherical deviation of a lens surface on the object side of the first positive lens,
$ASP_{1NPi}$ denotes an amount of aspherical deviation of a lens surface on the image side of the first positive lens, and
the amount of aspherical deviation is a distance from a reference spherical surface up to the lens surface, at a height from an optical axis, same as the maximum height of incidence of a light ray of an aperture stop at the telephoto end, with a direction toward the image side let to have a positive sign, and
the reference surface is a spherical surface having a same vertex as a vertex of the lens surface, and a paraxial radius of curvature of the lens surface as a radius of curvature.

20. The image pickup apparatus according to claim 1, wherein the following conditional expression (13) is satisfied;

$$4.0 \leq L_w/|f_{1Po}| \leq 7.5 \quad (13)$$

where,
$f_{1Po}$ denotes the focal length of the first positive lens unit object-side system, and
$L_w$ denotes a distance which is obtained by adding a back focus length which is converted in length in the air, to a total length along an optical axis of the overall zoom lens system, and the distance is a distance when focused to an object at infinity at the wide angle end, and the total length is a distance from a lens surface nearest to the object side of the zoom lens up to a lens surface nearest to the image side of the zoom lens.

21. The image pickup apparatus according to claim 1, wherein at the time of zooming and at the time of focusing, a distance from the first positive lens unit up to the image pickup element is constant all the time.

22. The image pickup apparatus according to claim 1, wherein
the first negative lens unit includes
a first negative lens having a negative refractive power, and
a second lens, and
the first negative lens is disposed nearest to the object side, and
the second lens is disposed at a predetermined distance, on the image side of the first negative lens, and
a following conditional expression (14) is satisfied;

$$0.15 \leq L_{1Nair}/IH_t \leq 0.7 \quad (14)$$

where,
$L_{1Nair}$ denotes an air space along an optical axis from the first negative lens up to the second lens, and
$IH_t$ denotes the maximum image height when focused to an object at infinity at the telephoto end.

23. The image pickup apparatus according to claim 1, wherein a following conditional expression (15) is satisfied;

$$0.75 \leq |f_{1P}/f_{1Po}| \leq 1.8 \quad (15)$$

where,
$f_{1P}$ denotes a focal length of the first positive lens unit, and
$f_{1Po}$ denotes the focal length of the first positive lens unit object-side system.

24. The image pickup apparatus according to claim 1, wherein a following conditional expression (9-1) is satisfied;

$$1.5 \leq |f_{1Po}/IH_t| \leq 3.6 \quad (9\text{-}1)$$

where, $f_{1Po}$ denotes the focal length of the first positive lens unit object-side system, and $IH_t$ denotes the maximum height when focused to an object at infinity at the telephoto end.

25. The image pickup apparatus according to claim 1, wherein a following conditional expression (16) is satisfied;

$$0.37 \leq f_{1N}/f_{1Po} \leq 0.9 \tag{16}$$

where, $f_{1N}$ denotes a focal length of the first negative lens unit, and
$f_{1Po}$ denotes the focal length of the first positive lens unit object-side system.

26. The image pickup apparatus according to claim 1, wherein a following conditional expression (17) is satisfied;

$$-28 \leq DT \leq -13 \tag{17}$$

where, $DT$ is $DT=(IH_w - f_w \times \tan \omega_w)/(f_w \times \tan \omega_w) \times 100$ (unit is %), $IH_w$ denotes the maximum image height when focused to an object at infinity at the wide angle end, $f_w$ denotes a focal length of the overall zoom lens system when focused to an object at infinity at the wide angle end, and $\omega_w$ denotes the maximum half angle of view when focused to an object at infinity at the wide angle end.

27. The image pickup apparatus according to claim 1, wherein a following conditional expression (18) is satisfied;

$$-0.05 \leq f_w/r_{1F} \leq 0.085 \tag{18}$$

where, $f_w$ denotes a focal length of the overall zoom lens system when focused to an object at infinity at the wide angle end, and $r_{1F}$ denotes a paraxial radius of curvature of an object-side surface of the lens nearest to the object side in the first positive lens unit object-side system.

28. The image pickup apparatus according to claim 1, wherein the first positive lens unit includes one negative lens on the object side of the reflecting member, and the total number of lenses on the object side of the reflecting member is one.

29. The image pickup apparatus according to claim 1, wherein the first positive lens unit includes a negative lens made of glass, on the object side of the reflecting member, and the negative lens satisfies the following conditional expression (19);

$$1.9 \leq nd_{1PN} \leq 2.4 \tag{19}$$

where, $nd_{1PN}$ denotes a refractive index for a d-line of the negative lens made of glass.

30. The image pickup apparatus according to claim 1, wherein the reflecting member is a prism.

31. The image pickup apparatus according to claim 30, wherein following conditional expressions (20) and (21) are satisfied;

$$15 \leq vd_{pri} \leq 30 \tag{20}$$

$$1.8 \leq nd_{pri} \leq 2.3 \tag{21}$$

where, $vd_{pri}$ denotes Abbe's number with reference to a d-line, of the prism, and $nd_{pri}$ denotes a refractive index for the d-line, of the prism.

32. The image pickup apparatus according to claim 1, wherein at the time of zooming and at the time of focusing, the stop is stationary.

33. The image pickup apparatus according to claim 1, wherein a positive lens is disposed between the first negative lens unit and the second positive lens unit, and at the time of zooming and at the time of focusing, the stop and the positive lens are stationary.

34. The image pickup apparatus according to claim 1, wherein the reflecting member is a powerless prism, and a following conditional expression (22) is satisfied;

$$5.6 \leq \tan \omega_w/(L_{pri}/L_w) \leq 9.5 \tag{22}$$

where, $\omega_w$ denotes the maximum half angle of view when focused to an object at infinity at the wide angle end, $L_{pri}$ denotes a total length along an optical axis of the prism, and the total length is a distance from an optical surface on the object side of the reflecting surface up to an optical surface on the image side of the reflecting surface, from among optical surfaces which form the prism, and $L_w$ denotes a distance which is obtained by adding a back focus length which is converted in length in the air, to a total length along an optical axis of the overall zoom lens system, and the distance is a distance when focused to an object at infinity at the wide angle end, and the total length is a distance from a lens surface nearest to the object side of the zoom lens up to a lens surface nearest to the image side of the zoom lens.

35. The image pickup apparatus according to claim 1, wherein $\omega_w \geq 42$ degrees, and the reflecting member is a prism, and following conditional expressions (23) and (24) are satisfied;

$$0.55 \leq (\tau 420)^A \tag{23}$$

$$0.47 \geq (\tau 400)^A \tag{24}$$

where, $\tau 420$ denotes an internal transmittance of light of wavelength 420 nm through 10 mm thickness of a material forming the prism, $\tau 400$ denotes an internal transmittance of light of wavelength 400 through 10 mm thickness of a material forming the prism, $A=Pd/10$ mm, and $L_{pri}$ denotes a total length along an optical axis of the prism, and the total length is a distance from an optical surface on the object side of the reflecting surface up to an optical surface on the image side of the reflecting surface, from among optical surfaces which form the prism.

36. The image pickup apparatus according to claim 1, wherein a following conditional expression (25) is satisfied;

$$2.0 \leq f_{1Pi} \times f_w/IH_t^2 \leq 3.0 \tag{25}$$

where, $f_{1Pi}$ denotes the focal length of the first positive lens unit image-side system, $f_w$ denotes a focal length of the overall zoom lens system when focused on an object at infinity at the wide angle end, and $IH_t$ denotes the maximum image height when focused on an object at infinity at the telephoto end.

* * * * *